(12) United States Patent
Rosen et al.

(10) Patent No.: US 7,805,382 B2
(45) Date of Patent: Sep. 28, 2010

(54) MATCH-BASED EMPLOYMENT SYSTEM AND METHOD

(75) Inventors: Howard Rosen, Vienna, VA (US); Robert J. McGovern, Potomac, MD (US); Leslie Ferry, Vienna, VA (US); Erik Anderson, Olney, MD (US); Pam Koczara, Sterling, VA (US); Brent Smith, Oak Hill, VA (US); Brian Farmer, Reston, VA (US); Andrew Evans, Alderson, WV (US)

(73) Assignee: MKT10, Inc., Vienna, VA (US)

( * ) Notice: Subject to any disclaimer, the term of this patent is extended or adjusted under 35 U.S.C. 154(b) by 1466 days.

(21) Appl. No.: 11/104,142

(22) Filed: Apr. 11, 2005

(65) Prior Publication Data

US 2006/0229896 A1 Oct. 12, 2006

(51) Int. Cl.
*G06Q 99/00* (2006.01)
(52) U.S. Cl. ..................................... 705/321
(58) Field of Classification Search ............... 705/1, 705/321
See application file for complete search history.

(56) References Cited

U.S. PATENT DOCUMENTS

| | | | | |
|---|---|---|---|---|
| 5,681,046 A | * | 10/1997 | Lawrence | 273/459 |
| 5,832,497 A | | 11/1998 | Taylor | |
| 6,052,122 A | | 4/2000 | Sutcliffe et al. | |
| 6,144,964 A | * | 11/2000 | Breese et al. | 707/10 |
| 6,272,467 B1 | * | 8/2001 | Durand et al. | 705/1 |
| 6,289,340 B1 | * | 9/2001 | Puram et al. | 707/5 |
| 6,301,579 B1 | * | 10/2001 | Becker | 707/102 |
| 6,370,510 B1 | | 4/2002 | McGovern et al. | |
| 6,385,620 B1 | | 5/2002 | Kurzius et al. | |
| 6,662,194 B1 | | 12/2003 | Joao | |
| 7,212,985 B2 | * | 5/2007 | Sciuk | 705/8 |
| 7,505,919 B2 | * | 3/2009 | Richardson | 705/8 |
| 2002/0002479 A1 | * | 1/2002 | Almog et al. | 705/8 |
| 2002/0007305 A1 | * | 1/2002 | Fukuda et al. | 705/11 |
| 2002/0040310 A1 | * | 4/2002 | Lieben et al. | 705/7 |
| 2002/0055870 A1 | * | 5/2002 | Thomas | 705/10 |
| 2002/0095320 A1 | * | 7/2002 | Pavone et al. | 705/7 |
| 2004/0243588 A1 | * | 12/2004 | Tanner et al. | 707/100 |

OTHER PUBLICATIONS www.staffcv.com, Retrieved with WayBack Machine, Web Archive, <www.archive.org>, Feb. 4, 2004.*

* cited by examiner

*Primary Examiner*—Jonathan Ouellette
(74) *Attorney, Agent, or Firm*—K&L Gates LLP

(57) ABSTRACT

In one embodiment of the present invention, a match-based employment system and method of operation are provided. The match-based employment system collects a plurality of employer seeker and employee seeker profiles, bi-directionally matches the employer seeker and said employee seeker profiles and displays at least a portion of the results to an employer seeker or an employee seeker. The match-based employment system can also order the bi-directional matching results based on a bi-directional match score and display the bi-directional matching results according to the ordering. The match-based employment system can also perform the matching such that approximately 70% of a matching score depends upon the quality of the match between employee seeker desires and employment seeker attributes and approximately 30% of the matching score depends upon the quality of the match between employment seeker desires and employee seeker attributes.

27 Claims, 18 Drawing Sheets

MATCH-BASED EMPLOYMENT SYSTEM AND METHOD

FIELD OF THE INVENTION

The present invention relates to a match-based employment system and method. More specifically, the present invention relates to an employment system in which job seekers and potential employers are matched without the use of traditional resumes.

BACKGROUND OF THE INVENTION

An employment system is any electronic system which facilitates those looking for a position (i.e., employment seekers, or job seekers) in finding a position and/or which facilitates those seeking to fill a position (i.e., employee seekers, or employers) in finding someone to fill the position. Typical employment systems enable employers to post available positions, and further enable job seekers to search available positions for positions that meet some search criteria. Some employment systems enable job seekers to post a resume, and further enable employers to search for resumes that contain certain keywords. However, traditional employment systems are inefficient for many reasons.

Employers have difficulty finding desirable candidates for positions by searching resumes on an employment site because information is not necessarily presented in a uniform manner for each resume. Typically, an employer enters one or more keywords and the database of job seeker resumes are searched to determine which resumes contain the keywords. Similarly, job seekers enter keywords upon which the database of available jobs are searched. Thus, if an ideal job seeker leaves pertinent information (e.g., language experience, a certification, security clearance level, etc.) out of a resume or even puts the information into the resume without using the keywords searched upon (e.g., using synonyms or containing a typo), the employer may never find the ideal job seeker's resume. Boolean searches (searches using keywords and/or strings that can be resolved to truth values in addition to Boolean operators such as AND, OR and NOT) may provide improved search results, but still suffers from the same problem. Further, a keyword and/or Boolean search may generate many false-positive results because the keyword is present in a resume but not in the correct context. Such false-positive results waste the potential employer's time.

Further, if a potential employer finds a resume that appears ideal, the first indication the employer may receive that information in the resume is inaccurate is when the employer contacts or interviews the job seeker, or even after the job seeker is hired. By the time the potential employer discovers the inaccuracy, considerable time and effort has been wasted.

In employment systems in which potential employers post available positions, potential employers are often inundated with resumes from unqualified job seekers. Some job seekers submit their resume to any position they find desirable, regardless of whether they meet any specified required qualifications on the hope that they will either be the most qualified applicant or that they will be qualified enough to get an interview and perhaps gain employment as a result.

Because unqualified job seekers submit their resumes, potential employers must sift through the submitted resumes to find the qualified applicants, which is an inefficient use of their time. Further, if the ratio of resumes from qualified applications to resumes from unqualified applicants becomes small, the potential employer may disregard all resumes from the employment system and discontinue further use of the employment system.

Another inefficiency of many employment systems is that they do not offer guidance to both job seekers and potential employers on improving their use of the employment system. As a result, an employer may be unaware that a much broader pool of qualified job seekers may be available if some conditions of the position were altered. Similarly, a job seeker may be unaware that a broader pool of positions may be available if they alter the conditions of their job search.

SUMMARY OF THE INVENTION

In one embodiment of the present invention, a match-based employment system and method of operation are provided. The match-based employment system collects a plurality of employer seeker and employee seeker profiles, bi-directionally matches the employer seeker and said employee seeker profiles and displays at least a portion of the results to an employer seeker or an employee seeker. The match-based employment system can also order the bi-directional matching results based on a bi-directional match score and display the bi-directional matching results according to the ordering. The match-based employment system can also perform the matching such that approximately 70% of a matching score depends upon the quality of the match between employee seeker desires and employment seeker attributes and approximately 30% of the matching score depends upon the quality of the match between employment seeker desires and employee seeker attributes.

In another embodiment, an employment system is provided. The employment system enables a user to specify a first comparison condition and determines a first group from a plurality of entities, wherein the first group satisfies the first comparison condition. The employment system also determines a second comparison condition, wherein the second comparison condition is the result of modifying a comparison condition field of the first comparison condition and determines a second group of entities, wherein the second group satisfies the second comparison condition, wherein at least one member of the second group is not also in the first group. Further, the employment system displays information about the first and second groups at least partly concurrently.

Additional features and advantages of the present invention are described in, and will be apparent from, the following Detailed Description of the Invention and the figures.

DETAILED DESCRIPTION OF THE INVENTION

Match-Based Employment System Overview

Figure 1:
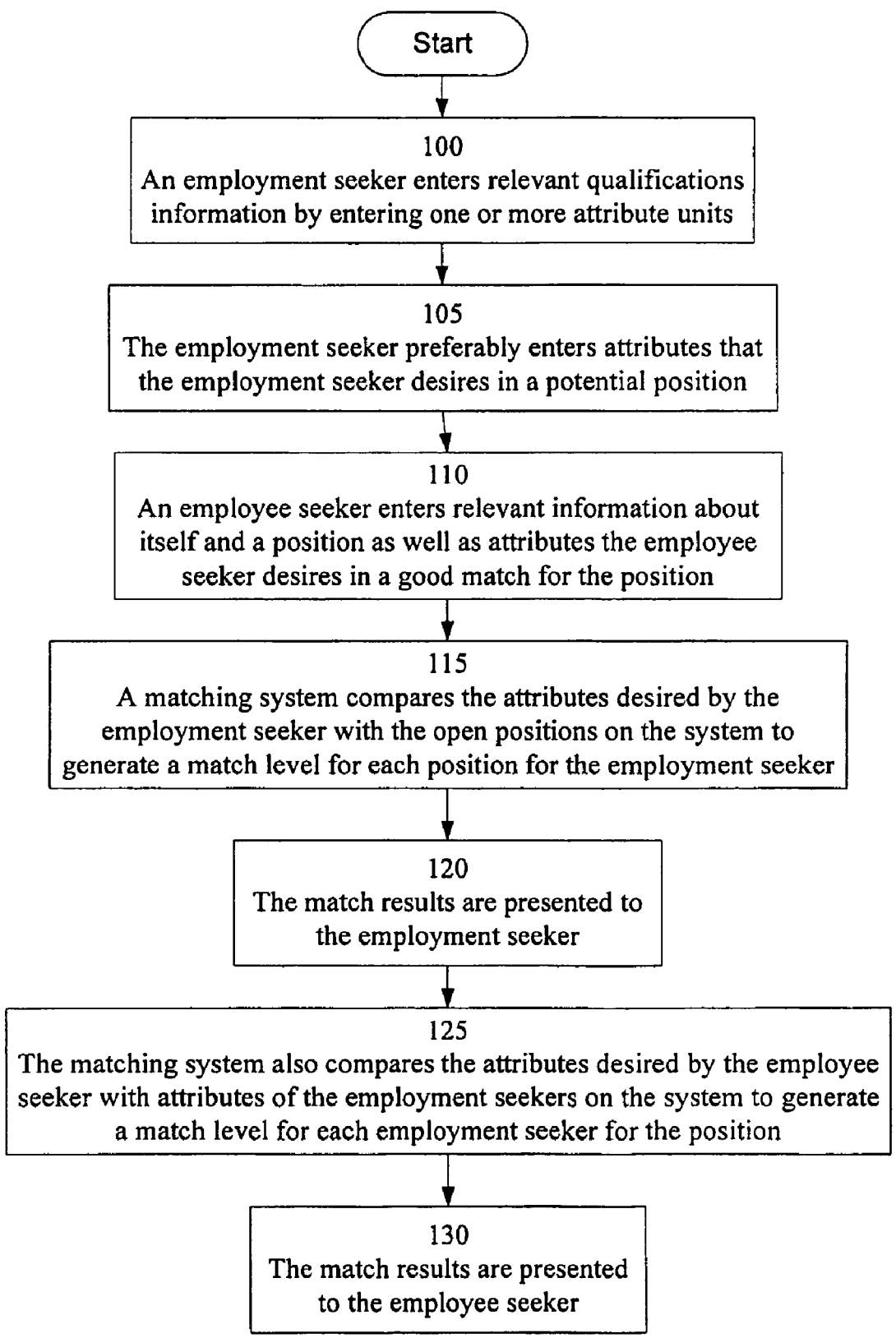
FIG. 1 is a flow diagram of a preferred process for matching employment seekers with positions in accordance with one embodiment of the present invention.

Referring now to FIGS. 1-18, in one embodiment of the present invention, a match-based employment system is provided. FIG. 1 shows a preferred process for matching employment seekers with positions. Preferably, at step 100, an employment seeker (i.e., a system user searching for a full or part time job, independent contractor position, volunteer position, etc.) enters relevant qualifications information (e.g., skills, experience, education, etc.) by entering one or more attribute units; however relevant qualifications information can be entered into fields in any suitable manner. Similarly, at step 105, the employment seeker preferably enters attributes that the employment seeker desires in a potential position. It should be noted that steps 100 and 105 can be performed in any order, including simultaneously.

At step 110, an employee seeker (i.e., a system user searching for an employment seeker to fill a job/position) enters relevant information about itself and a position as well as attributes the employee seeker desires in a good match for the position. Then, at step 115, a matching system compares the attributes desired by the employment seeker with the open positions on the system to generate a match level for each position for the employment seeker.

Next, at step 120, the match results are presented to the employment seeker. Preferably, only positions with a match level that satisfies a threshold condition are presented to the employment seeker. Alternatively, a specified number of positions are presented to the employment seeker at one time, ranked by match level and with the highest ranking positions being presented first. It should be noted that matching results can be presented to the employment seeker in any suitable manner.

At step 125, the matching system also compares the attributes desired by the employee seeker with attributes of the employment seekers on the system to generate a match level for each employment seeker for the position. Preferably, the comparison of steps 115 and 125 are performed simultaneously and return the same value to both the employment seeker and the employee seeker for a pairing of employment seeker and job opening (i.e., two-way matching); however, the comparisons can be performed in any suitable order and the results from one comparison can be used to modify the results of the other comparison.

Then, at step 130, the match results are presented to the employee seeker. Preferably, only employment seekers with a match level that satisfies a threshold condition are presented to the employee seeker. Alternatively, a specified number of employment seekers are presented to the employee seeker at one time, ranked by match level and with the highest ranking employment seekers being presented first. It should be noted that matching results can be presented to the employee seeker in any suitable manner.

Figure 2:
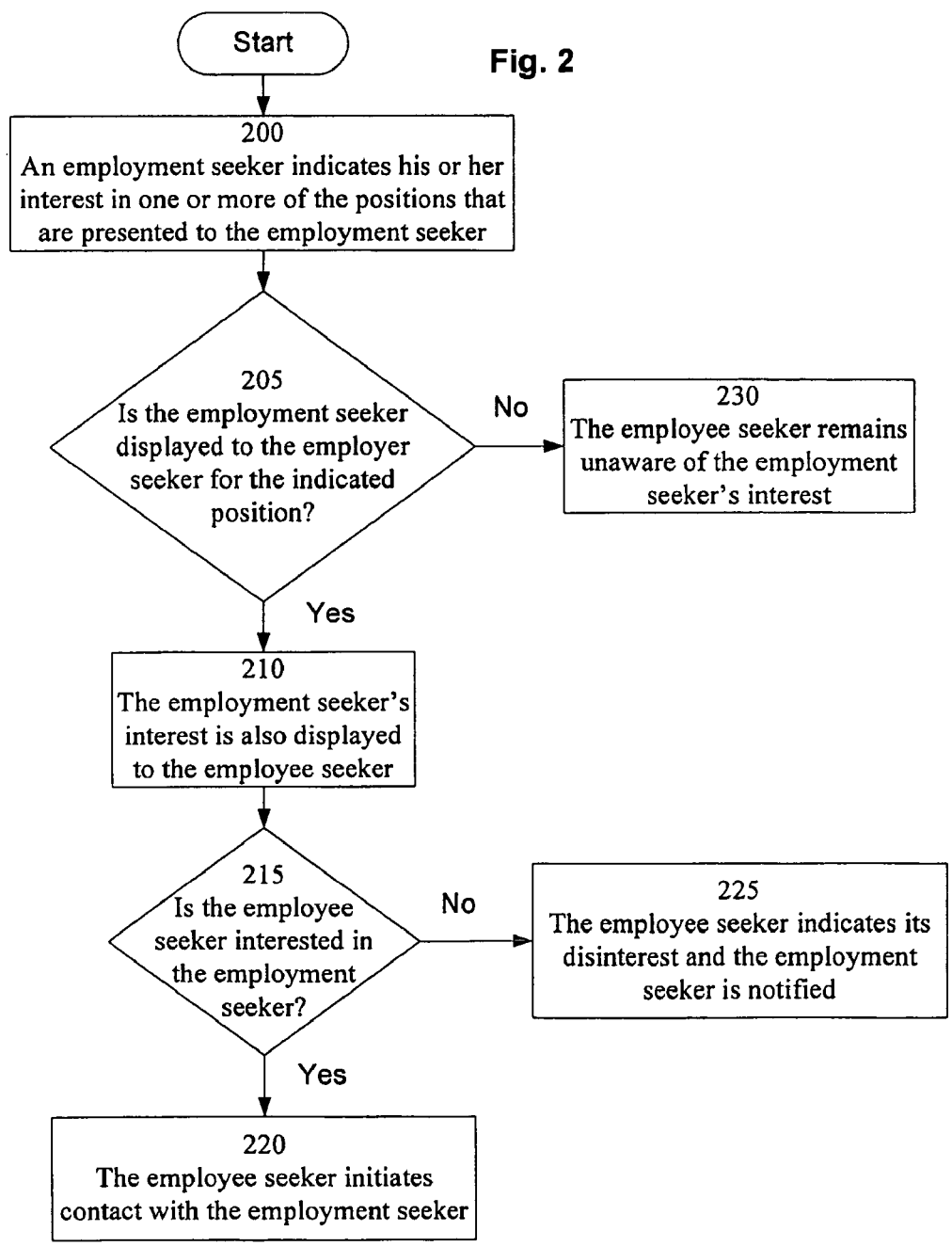
FIG. 2 is a flow diagram of a preferred process for an employment seeker to seek to fill a position in accordance with one embodiment of the present invention.

FIG. 2 shows a preferred process for an employment seeker to seek to fill a position; however other suitable processes can be followed. Instead of submitting a resume when interested in a position as is common in traditional employment systems, employment seekers can indicate their interest in positions presented to them. After matching results are presented to an employment seeker, at step 200, an employment seeker indicates his or her interest in one or more of the positions that are presented to the employment seeker (e.g., the match results of step 120. At step 205, it is determined whether the employment seeker is displayed to the employer seeker for the indicated position. Preferably, the employment seeker is displayed to the employee seeker if the employment seeker is one of the top matches for a position and the match is strong enough to satisfy the threshold condition; however the employment seeker can be displayed to the employee seeker under any other suitable conditions. Similarly, the employment seeker is preferably not displayed to the employee seeker if the employment seeker is not one of the top matches, the match is not strong enough to satisfy a threshold condition, or any other suitable reason for the employment seeker to not be displayed.

If the employment seeker is displayed, at step 210, the employment seeker's interest is also displayed to the employee seeker. Then, the employee seeker determines whether it is interested in the employment seeker at step 215. It should be noted that the employment seeker's interest is not necessarily displayed to the employee seeker before step 215 or at any other time. If the employee seeker is interested in the employment seeker, preferably the employee seeker initiates contact with the employment seeker at step 220; however any suitable process for initiating contact (e.g., the employee seeker indicating interest, paying a fee and then being put into contact with the employment seeker or any other suitable process) can be followed. If the employee seeker is not interested in the employment system, preferably, at step 225, the employee seeker indicates its disinterest and the employment seeker is notified; however, it is not necessary for the employee seeker to indicate disinterest or for the employment seeker to be notified. The employee seeker can remove an employment seeker from its display, ignore the employment seeker, fill the position without reviewing the employment seeker, or take any other suitable action. Further, the employment seeker may be notified that a position is filled, notified when an amount of time following his or her indication of interest has passed, notified of changes in the position, provided with no notice at all, or provided any other suitable notice.

If the employment seeker is not displayed to the employer seeker, at step 230, the employee seeker remains unaware of the employment seeker's interest. Thus, unqualified employment seekers (e.g., those whose match scores rank low and/or do not match strongly enough to satisfy a threshold condition) are not displayed to employee seekers, and the employee seeker's time and effort is not spent weeding out interested, but unqualified, employment seekers.

Preferably, changes to an employment seeker's attributes and/or a position are not tracked; however, such changes can be tracked, if desired. In an example embodiment, changes to an employment seeker's attributes are recorded, and when an employment seeker is displayed to an employee seeker for a position, the employee seeker is also able to view changes the employment seeker made to his or her attributes. Since an employment seeker can be tempted to exaggerate attributes when few employee seekers are interested, the tracked changes can provide employee seekers with an indication that some attributes may be inaccurate or exaggerated. Similarly, in another example embodiment, changes to a position are recorded and presented to an employment seeker when the employment seeker views the position.

Preferably, the recency of attributes (e.g., work or skill experience) is taken into consideration during matching without the need for an employee seeker or employment seeker to specify a desired recency value; however, the recency of attributes can be taken into consideration during matching or excluded from consideration in any suitable manner. In one embodiment, matching calculations automatically account for recency by weighing more recent attributes differently than older attributes. For example, a year's experience of C++ programming may be weighted 100% if it was during the past year, 90% if it was a year old, 80% if two years old, 70% if three years old, and so on. The relationship between the weight of an attribute and the attribute's recency can be expressed by any suitable function and preferably will not result in any recency value being associated with a negative weight (e.g., in the progression described above, anything over nine years old would still be weighted 10% or 0% or any other suitable non-negative percentage); however the relationship between recency and weight can be any suitable continuous or discontinuous function.

Figure 3:
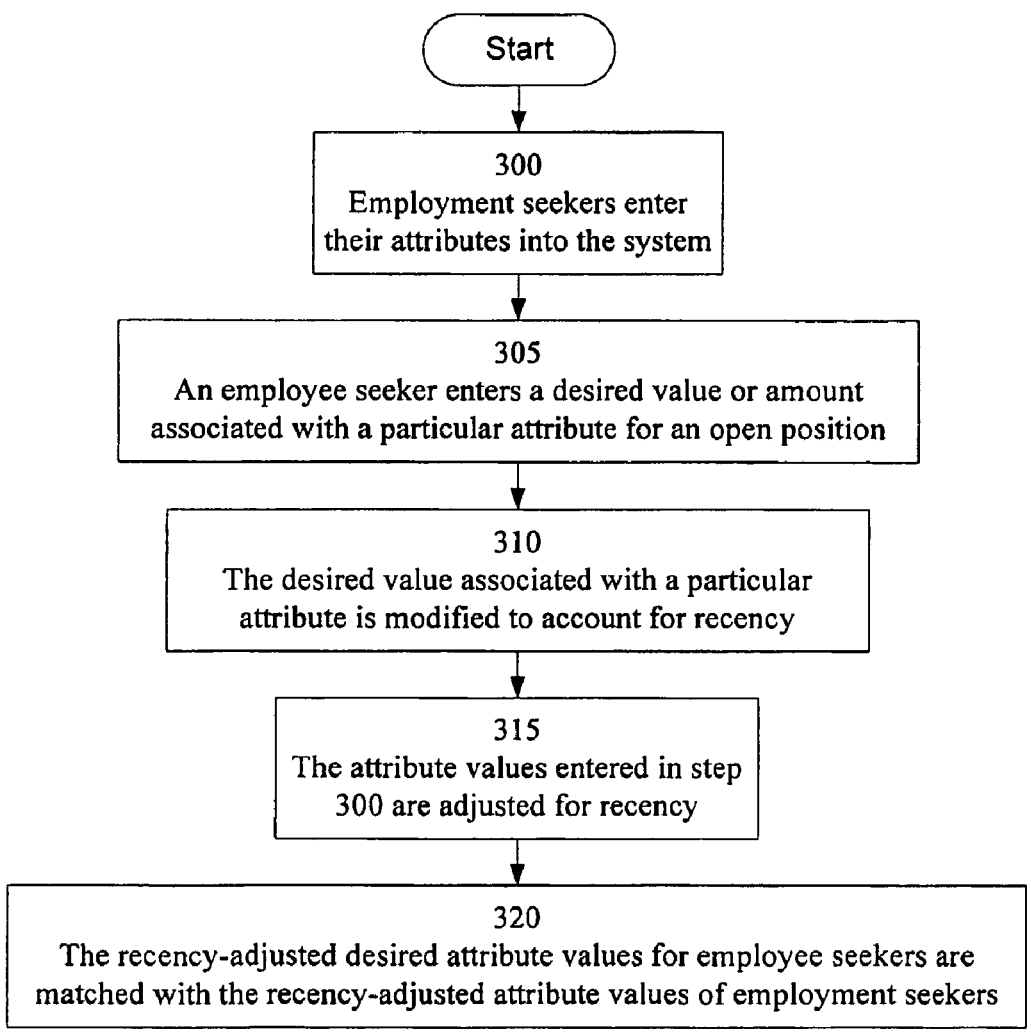
FIG. 3 is a flow diagram of a preferred process for factoring attribute recency when matching in an employment system in accordance with one embodiment of the present invention.

FIG. 3 shows a preferred process for factoring attribute recency when matching in an employment system; however, any suitable process can be used. At step 300, employment seekers enter their attributes into the system. The attributes are associated with one or more fixed times or time periods. For example, some employment seeker may have experience programming in Perl from June of 1997 to December of 2003 and from November of 2004 to January of 2005. At step 305, an employee seeker enters a desired value or amount associated with a particular attribute for an open position. For example, the employee seeker can specify that 5 years of experience programming in Perl is desired for a Senior Perl Programmer position. It should be noted that steps 300 and 305 can occur in any order or simultaneously and can be repeated.

At step 310, the desired value associated with a particular attribute is modified to account for recency. Preferably, the resulting modified value is equal to the value derived by adjusting the attributes of a hypothetical employment seeker who has the desired amount of that attribute continuously up to the current date for recency; however, any suitable modification can be made. For example, a hypothetical employment seeker who has programmed Perl for the most recent five years would have the most recent year counted as 1 year of experience, the year before that as 0.9 years of experience, and 0.8, 0.7 and 0.6 years of experience for the three years before that, respectively. Thus, the total recency-adjusted value of the hypothetical employment seeker's Perl programming experience is 1+0.9+0.8+0.7+0.6, or 4.0 years of Perl programming experience. As a result, when the employee seeker's desire for 5 years of Perl programming experience is modified to account for recency, it becomes 4 years of Perl programming experience.

At step 315, the attribute values entered in step 300 are adjusted for recency. For example, in the case of the employment seeker discussed above who had experience programming in Perl from June of 1997 to December of 2003 and from November of 2004 to January of 2005, assuming it is now March of 2005, the November 2004 to January 2005 experience counts as 0.25 years. The March 2003 to December 2003 experience counts as 0.675 years (i.e., 90% of 0.75 years). Similarly, March 2002 to February 2003 counts as 0.8 years, March 2001 to February 2002 counts as 0.7 years, March 2000 to February 2001 counts as 0.6 years, March of 1999 to February 2000 counts as 0.5 years, March 1998 to February 1999 counts as 0.4 years and June 1997 to February 1998 counts as 0.225 years (i.e., 30% of 0.75 years). As a result, the employment seeker has 0.25+0.675+0.8+0.7+0.6+0.5+0.4+0.225=4.15 years of recency-adjusted Perl programming experience.

At step 320, the recency-adjusted desired attribute values for employee seekers are matched with the recency-adjusted attribute values of employment seekers. Continuing the examples above, the employee seeker's recency-adjusted desired Perl programming experience value of four years would be satisfied by the employment seeker's recency-adjusted Perl programming experience of 4.15 years. However, the effect of recency becomes clearer when observing that had the employment seeker not programmed in Perl from November 2004 to January 2005, the employment seeker's Perl programming experience would not be sufficient to satisfy the employee seeker's experience desires even though the employment seeker had over five years of Perl programming experience earlier in his or her career. The recency adjustments of the above examples are for illustrative purposes, and it should be noted that any other suitable adjustments can be made.

Preferably, an employee seeker and/or employment seeker does not need to specify any recency value or calculation and recency is automatically factored into matches; however, in various embodiments an employee seeker and/or employment seeker can specify a recency value or calculation or manually cause recency to be factored into matches in any suitable manner, or recency can not be factored into matches. In one embodiment, an employee seeker can specify a desired attribute and a desired recency for the attribute. For example, an employee seeker may specify that a good candidate for a position will have at least three years of C++ experience within the last 7 years. Similarly, in another embodiment, an employment seeker may specify a recency condition for a desired position. For example, an employment seeker may desire that the position be with a relatively new company and could specify that the company be one that started within the past three years. Alternatively, the employment seeker may desire a company with a mature casual dress code and could require that the initiation of the casual dress code be no more recent than the last 5 years.

Preferably, the match-based employment system does not make individually determined recommendations for changes to employee seeker, position and/or employment seeker attributes; however, an alternative match-based employment system can provide individually determined change recommendations to employee seeker, position and/or employment seeker attributes or any other suitable user-controlled data. For example, the alternative match-based employment system can periodically and/or occasionally prompt a seeker to provide additional and/or alternative information, thus improving the seeker's use of the system. Specifically, for an employee seeker that has failed to provide dress code information for a position and is offering $50,000 in compensation, the match-based employment system can prompt the employee seeker to enter dress code information to potentially improve match scores. The alternative match-based employment system can also determine that employment seekers (who possess the attributes desired by the employee seeker) specify an average desired compensation of $100,000 and/or that employment seekers with the specified skills have accepted positions offering an average of $80,000 in desired compensation. The information is provided to the employee seeker, and the employee seeker is given the opportunity to alter his or her match profile for the position.

Similarly, for an employment seeker who has entered several programming-related skills, but not some others that the system has determined are frequently associated with one or more of the entered skills and who is seeking $80,000 in compensation, the alternative match-based employment system can prompt the employment seeker to provide the missing associated skills to potentially improve match scores. The alternative match-based employment system can also determine that recently filled positions that possess the attributes desired by the employment seeker had a compensation level of only $65,000. The information is provided to the employment seeker, and the employment seeker is given the opportunity to alter his or her match profile.

Figure 4:
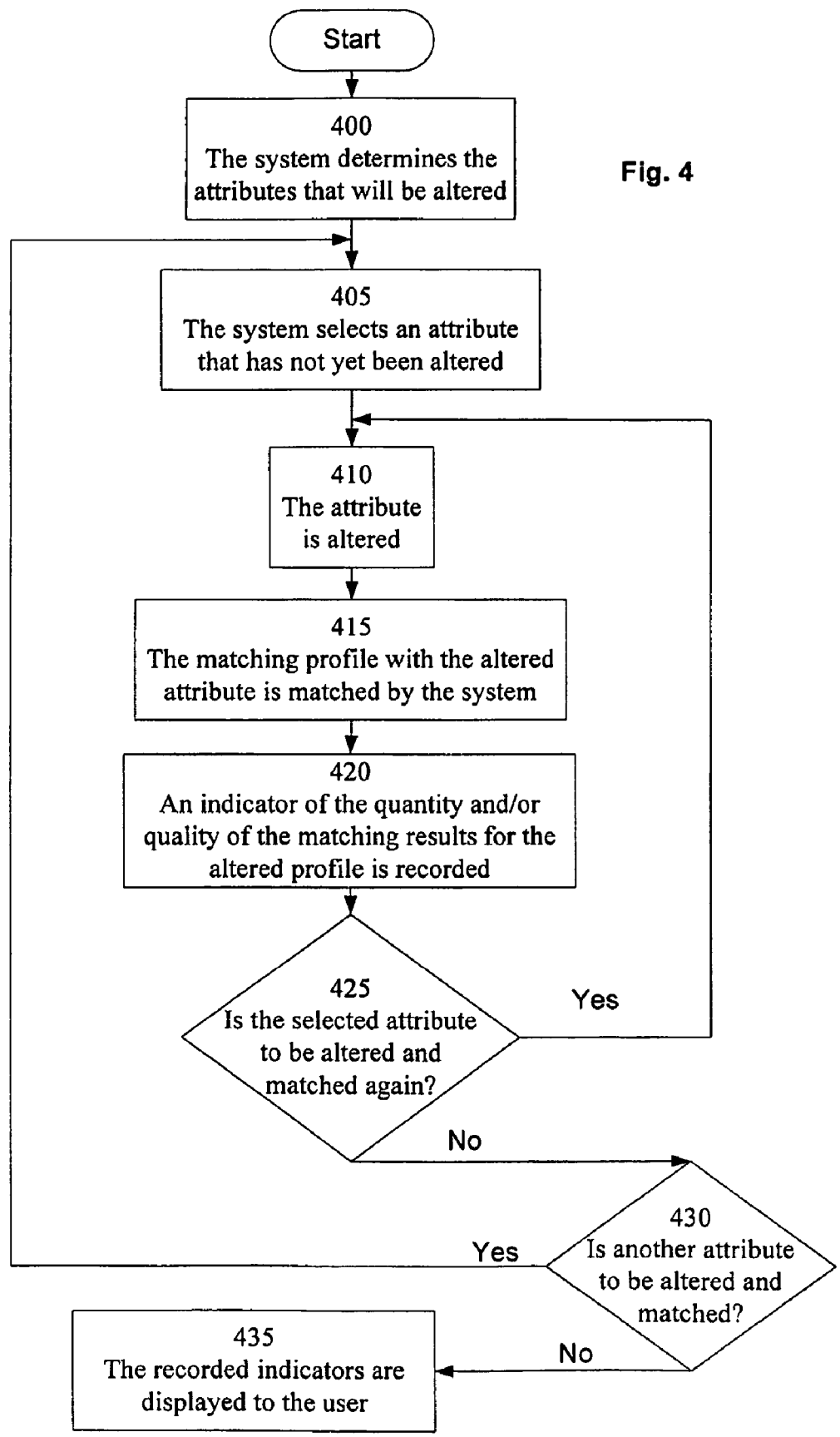
FIG. 4 is a flow diagram of a preferred process of providing feedback to system users in accordance with one embodiment of the present invention.

Preferably, the match-based employment system supplies feedback to users to provide them with information on how their matching results would change if they changed their own attributes and/or their desired attributes; however, the match-based employment system can provide other suitable kinds of feedback or no feedback at all. FIG. 4 shows a preferred process of providing feedback to system users; however, feedback can be provided by any other suitable process. The system alters one or more attributes of the matching profile for a user and generates alternative matching results for the altered profile. At step 400, the system determines the attributes that will be altered. It is preferred that the system determine the attributes to be altered at one time; however, the system can determine the attributes individually and at any suitable time during the feedback process or in any other suitable manner.

At step 405, the system selects an attribute that has not yet been altered. At step 410, the attribute is altered. The attribute can be altered by adding or subtracting a value, multiplying or dividing by a value, applying a function, selecting fixed points on a scale of possible values for that attribute, entirely or partly randomly or pseudo-randomly, or in any other suitable manner. At step 415, the matching profile with the altered attribute is matched by the system. At step 420, an indicator of the quantity and/or quality of the matching results for the altered profile is recorded. Preferably, the indicator is the number of results that have a matching value greater than a threshold value; however, the indicator can be any suitable indication of match result quantity and/or quality.

At step 425, it is determined whether the selected attribute is to be altered and matched again. If the selected attribute is to be altered and matched again, the process repeats at step 410. If not, at step 430, it is determined whether another attribute is to be altered and matched. If another attribute is to be altered and matched, the process repeats at step 405. If not, at step 435, the recorded indicators are displayed to the user.

Figure 5:
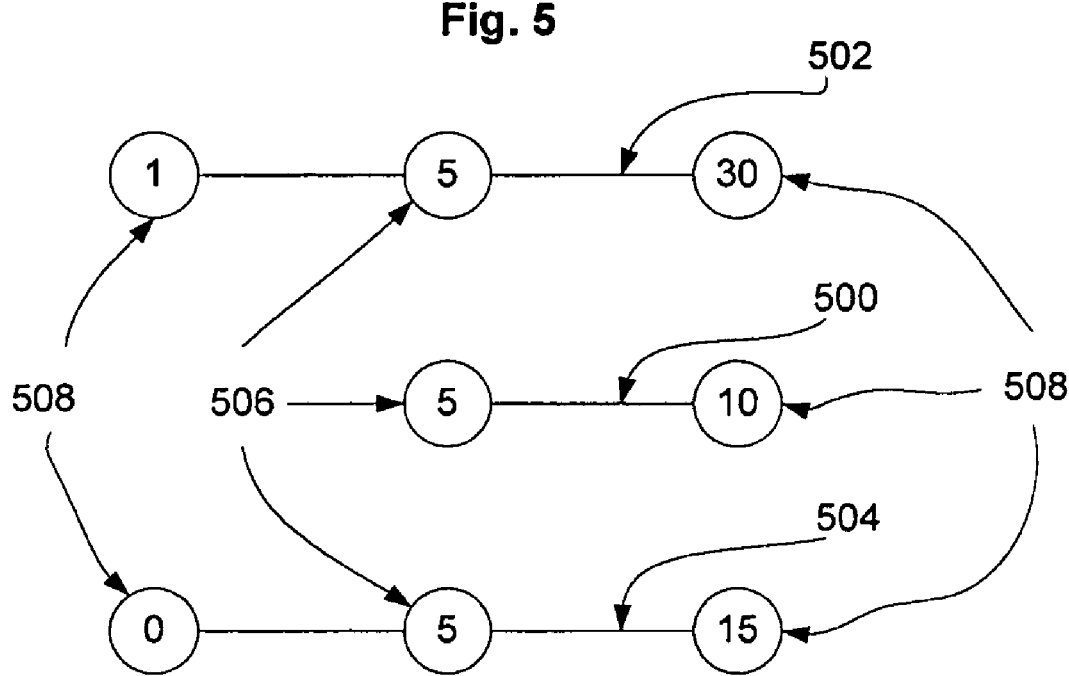
FIG. 5 is a diagram of different search results, such as the results generated by the process of FIG. 4, displayed in parallel lines in accordance with one embodiment of the present invention.
Figure 6:
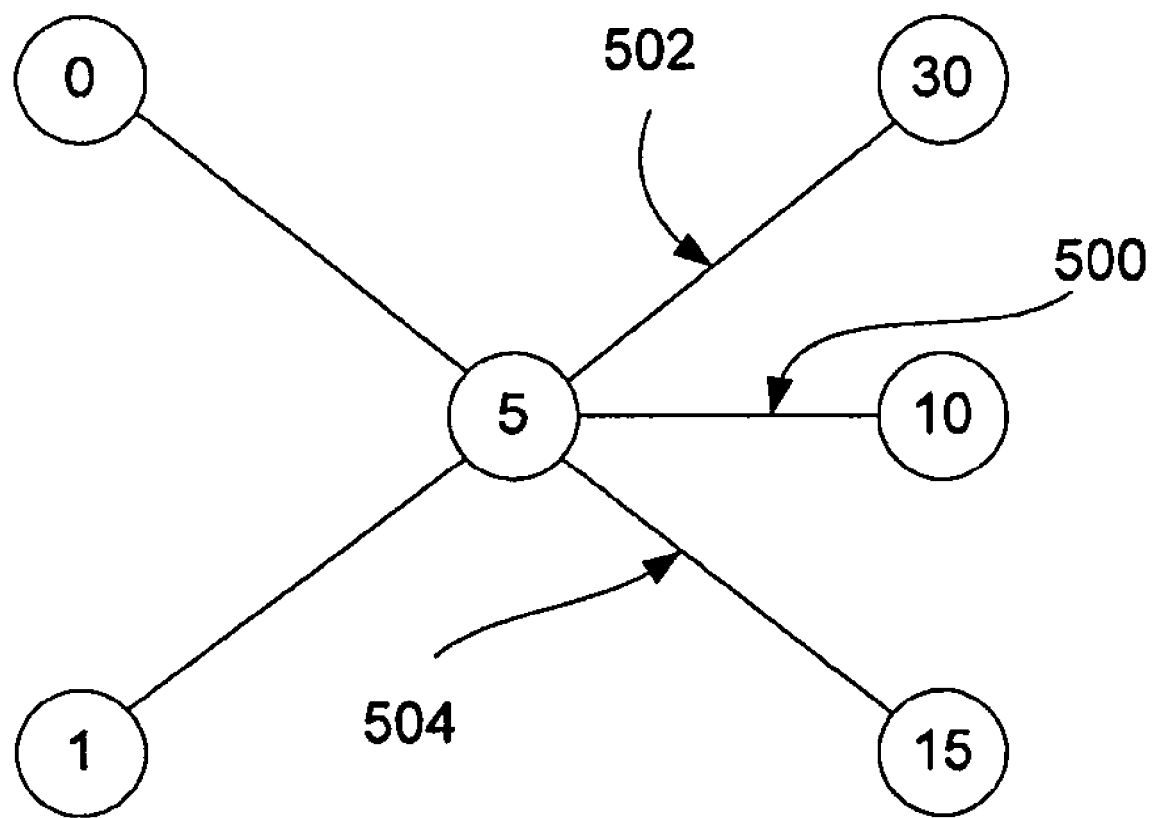
FIG. 6 is a diagram of different search results, such as the results generated by the process of FIG. 4, displayed in intersecting lines in accordance with one embodiment of the present invention.

FIGS. 5 and 6 show preferred display configurations of feedback provided by the process of FIG. 4; however, the feedback can be displayed in any suitable configuration. The displays are based on a hypothetical employment seeker who, in addition to having other attributes, desires a casual work environment within twenty miles of his home that pays $100,000 a year. Based upon those attributes, the system in the hypothetical example generates five results that satisfy a threshold matching level. The system then generates an alternative matching profile in which all attributes are the same except that the work environment is casual only on Fridays. That alternative matching profile results in ten matches that satisfy the threshold. Similarly, a matching for which the desired distance is five miles yields one match, and when the desired distance is forty miles, the system yields thirty matches. Further, a desired compensation level of $75,000 yields fifteen matches, and a desired compensation level of $150,000 yields zero matches. As shown in FIGS. 5 and 6, Each of these alternative matching profile results are presented to the employment seeker by displaying the attribute alteration (i.e., the difference between the matching profile entered by the employment seeker and the alternative matching profile) and the number of matches the alternative matching profile would generate.

In FIG. 5, the user entered a matching profile and two alternative matching profiles generated by altering the same attribute are displayed co-linearly, and a separate, non-intersecting line is displayed for each altered attribute. Thus, line 500 displays the results of modifying the work attire attribute, line 502 displays the results of modifying the distance attribute and line 504 displays the results of modifying the desired contribution level attribute. The indication of results for the unaltered matching profile 506 is displayed on line 500, line 502 and line 504. Similarly, indications of results for altered matching profiles 508 are also displayed on line 500, line 502 and line 504.

As shown in FIG. 6, when multiple attributes are modified to produce multiple alternative matching profiles, alternative matching profiles based upon the same attribute being modified can be displayed co-linearly, such that the user entered matching profile is a common intersection point for the different co-linearly displayed matching profiles. Thus, line 500, line 502 and line 504 are arranged such that they intersect at the results indication for the unaltered matching profile 506, creating a star or asterisk shaped display. The display of FIG. 6 can have the advantage over the display of FIG. 5 of being more compact; however, the display of FIG. 5 may be easier to read when a large number of attributes are altered. It should be noted that feedback can also be displayed using a combination of the displays of FIGS. 5 and 6 or any other suitable display configuration.

In one alternative embodiment, human resources information is determined or mined from the employment system's activity and/or a database of transactions or other suitable data based on the employment system's activity (e.g., positions being filled by employment seekers, position and employment seeker match profiles, etc.) and made available to the employment system's users. For example, system users can determine which employee seekers, or which type of employee seekers (e.g., web-based programming consultant firms, Fortune 500 companies, Pharmaceutical companies, political consultants, etc.), are hiring, which regions (e.g., Southern States, Chicago-area, Alaska, etc.) or fields (e.g., JAVA programming, truck driving, security, toxic mold litigation, etc.) are hiring, what compensation rates are being offered, the common attributes of employment seekers that are being hired (e.g., education level, certificates held, age, experience level, desired compensation level, etc.), the common attributes of employee seekers and/or positions that are generating interest (e.g., benefits, work environment, compensation level, type of work, etc.), the compensation level being sought by employment seekers with particular skills, or any other suitable information. System users can use the human resources information when generating their own matching profiles, when deciding whether to modify their matching profile, when just investigating the marketplace, or for any other suitable reason. Users can mine or query the human resources information by constructing custom database queries (e.g., an SQL query), using standard, system-provided queries, using query wizards or in any other suitable manner. If desired, the queries can be read-only; thus, preventing a user from altering the information stored in the database.

Figure 7:
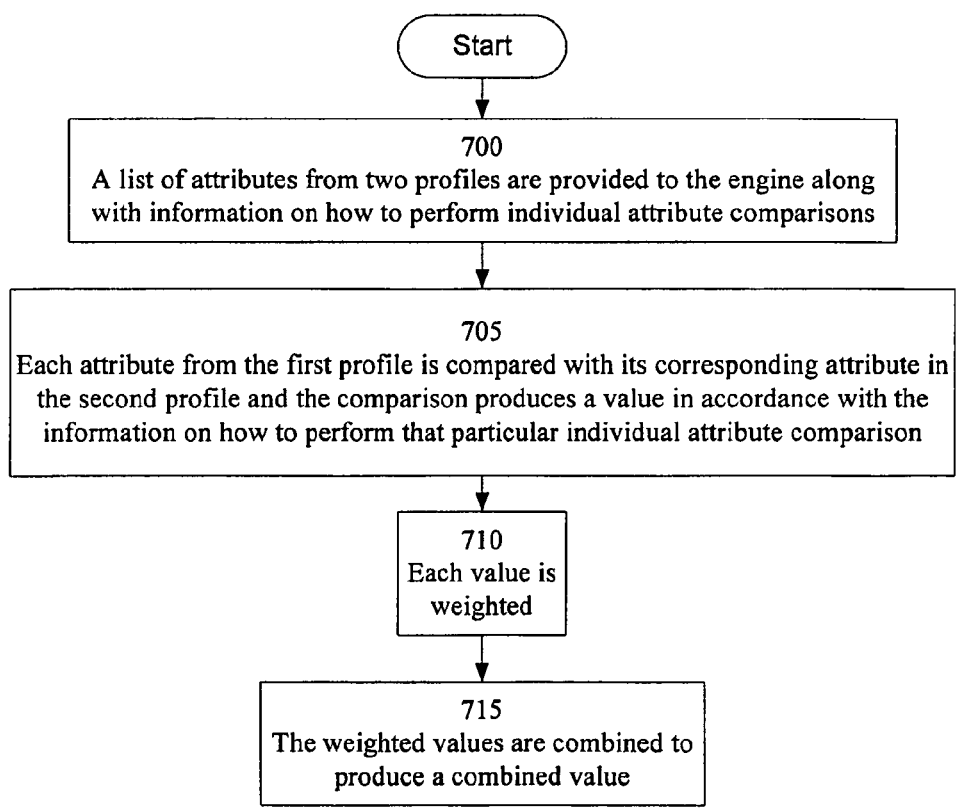
FIG. 7 is a flow diagram of a preferred matching process in accordance with one embodiment of the present invention.

Preferably, matching is performed by a matching engine on one or more servers; however, matching can be performed by any suitable custom matching engine, suitable commercially available matching engine, or by any other suitable mechanism. As shown in FIG. 7, a matching engine compares matching profiles, attribute/field by attribute/field to determine a matching value for the profiles. Each attribute or field of a profile is compared with a corresponding attribute or field in another to determine how well the two match. Using compensation level as an example, the compensation level specified by an employment seeker could be $100,000 while the compensation level specified by the position is $50,000. When comparing the two, the match engine can assign a value of 0 to indicate it is not an exact match (returning 1 only when the values match exactly or within some threshold error). Alternatively, the matching engine can not assign values in an all-or-nothing manner and assign a value of 0.5 to indicate that the offered compensation is only half of the desired compensation. Similarly, if the position offered $135,000, the matching engine can assign a value of 1 to indicate the offer meets or exceeds the desire, 1.35 to indicate by how much the offer exceeds the desire, or any other suitable value assignment.

The determination process can be the same for each attribute pair; however the determination process can also vary from one pair of attributes to another pair. For example, the matching engine may assign values in an all-or-nothing manner for work attire preferences, but assign values in a percentage satisfaction manner for salary and distance from a location. In the matching process shown in FIG. 7, the matching engine is supplied with not just attribute values, but also information on how to perform comparisons. At step 700, a list of attributes from two profiles are provided to the engine along with information on how to perform individual attribute comparisons. It should be noted that the information on how to perform individual attribute comparisons could alternatively be programmed into the engine, provided at a different time than profile information, or provided in any other suitable manner. At step 705, each attribute from the first profile is compared with its corresponding attribute in the second profile and the comparison produces a value in accordance with the information on how to perform that particular individual attribute comparison. Preferably, if an attribute is not provided, the comparison produces a value of zero; however, the matching engine can produce any suitable value.

At step 710, each value is weighted. Preferably, each attribute is associated with a weight value that is multiplied by the value generated in step 705; however, weighting can be accomplished by any other suitable weighting process or formula. At step 715, the weighted values are combined to produce a combined value. Preferably, the weighted values are combined by summing all of the weighted values; however, the weighted values can be combined by multiplying the weighted values together or any other suitable process or formula. Preferably, the combined value is scaled to a range of 0 to 100% to produce a match score or value, with 100% being an ideal match on each attribute; however, the combined value can be scaled to any suitable range, including ranges with maxima in excess of 100%. Further, the combined value can be the match score or value without scaling, or any other suitable operation can be performed on the combined value to produce the matching score or value.

Employment seeker Match Profile Collection and Management

In one embodiment, an employment seeker match profile comprises an employment seeker background profile and an employment seeker preference profile. Preferably, the match-based employment system enables the collection of background profile information and one preference profile; however, an alternative match-based employment system can enable collection of more than one preference profile, more than one background profile, or any other suitable information. In such an alternative match-based employment system, a template for generating additional profiles can be based upon an existing preference profile.

Preferably, the match-based employment system enables editing and/or deletion of existing preference profiles and/or background profiles; however, editing or deletion of preference profiles or background profiled can be disallowed, if desired. An audit trail (e.g., which element was changed, old value, date changed) is preferably not generated or stored; however, an audit trail for background data changes or preference data changes can be generated, stored and made available to employee seekers viewing the employment seeker's details. The audit trail can provide an indication to employee seekers when an employment seeker may be exaggerating about his or her background. If desired, no audit trail is maintained when missing data is supplied, under the assumption that such data is less likely to be exaggerated.

Preferably, the match-based employment system prompts a user to enter a majority or substantially all of the user's information before any matching results are presented to the user; however, an alternative match-based employment system can present initial matching results to a user after the user enters only a subset of the user's information or at any other suitable point in the information gathering process. The alternative system can prompt the user to enter missing criteria throughout the remainder of the user experience.

Figure 8:
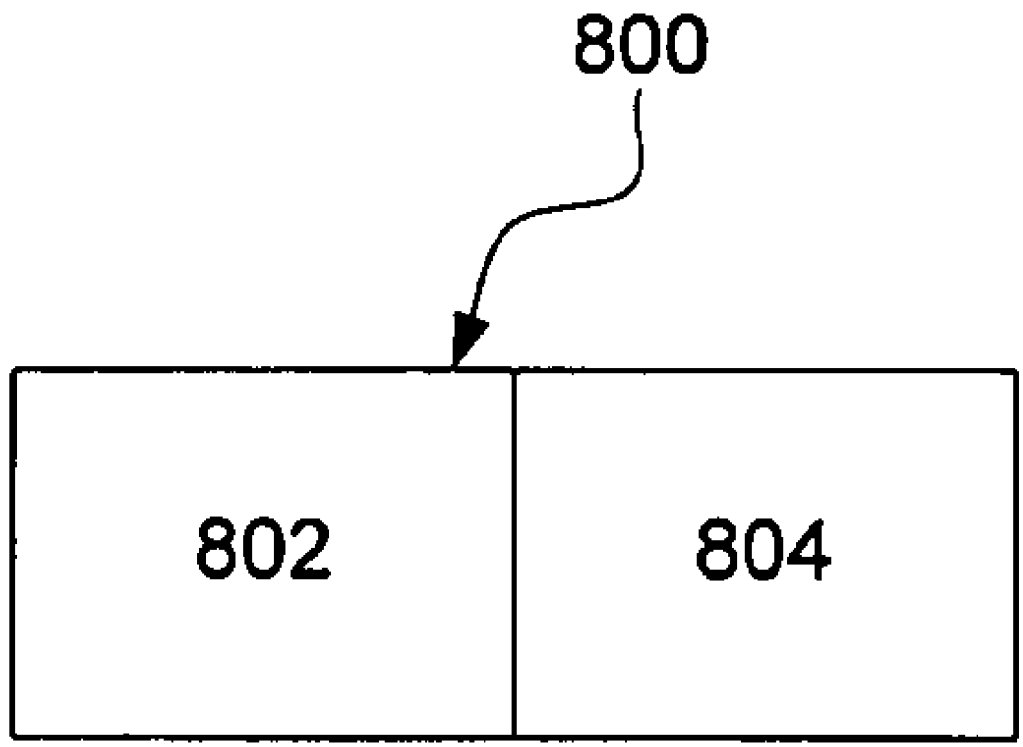
FIG. 8 is a block diagram of an attribute unit in accordance with one embodiment of the present invention.

Preferably, one or more attributes included in the matching criteria are provided by entering an attribute unit; however, attributes can be provided in any suitable manner. As depicted in FIG. 8, an attribute unit 800 is comprised of a duration 802 and one or more attributes 804 associated with that duration 802. It should be noted that the graphical representation of an attribute unit 800 in FIG. 8 is intended only to illustrate the concept and that attribute unit 800 can be represented virtually using a table, a structure, an array, an object, a class, or any other suitable virtual representation. An attribute associated with a duration may be associated with a portion of the duration (e.g., 10%) or the entire duration.

Types of attribute unit include, but are not limited to, work units or employment attribute units (e.g., employment skill units and/or employment exposure skill units), educational background units and status units.

In one embodiment, employment seekers enter their work experience in work units (i.e., blocks of time that represent a particular job or assignment wherein the employment seeker applied a set of skills and held a particular title and had a particular set of responsibilities). For example, an employment seeker who worked as a sales representative for four years at IBM and then worked as a manager at IBM for four more years may enter two work units, one for the sales representative experience and one for the manager position experience. Within each work unit, employment seekers apportion how much of their time at the position represented by the work unit that they spent on each skill therein (i.e., C++ 90%, Java 10%, Internet applications 45%, game platforms 68%, operating systems 5%, PDA applications 15%, etc.).

Figure 9:
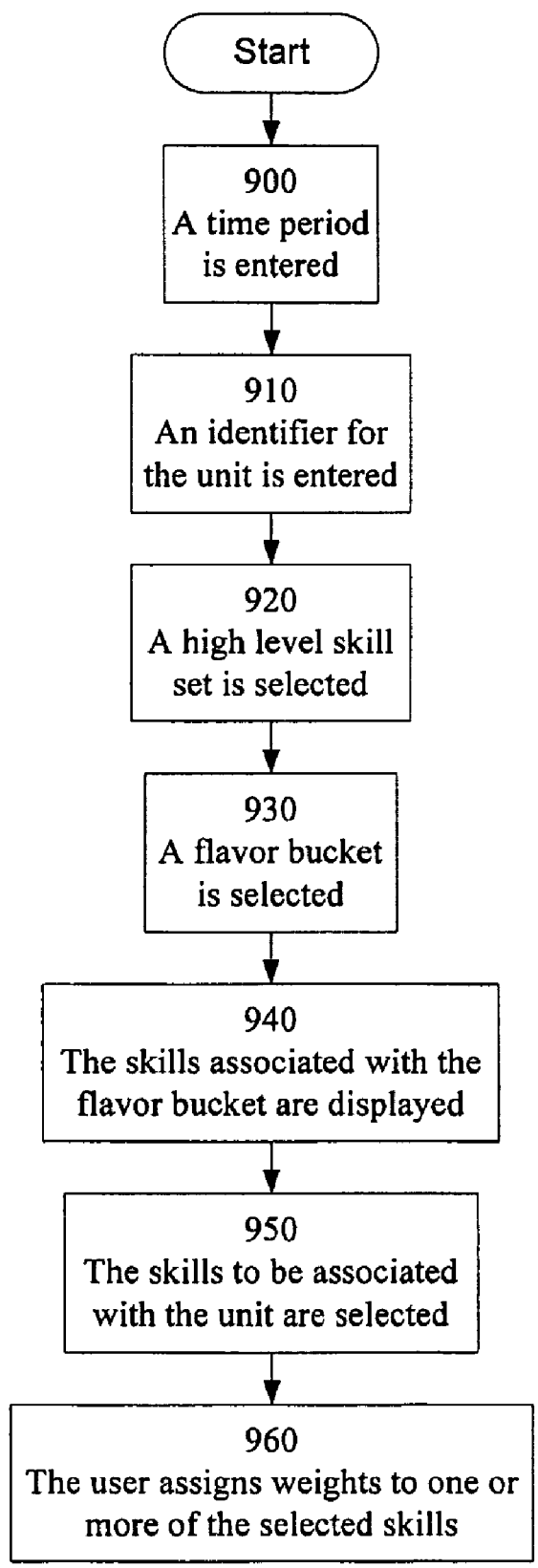
FIG. 9 is a preferred process for entering an attribute unit, in particular a work unit, in accordance with the present invention.

A preferred process for entering an attribute unit, in particular a work unit, is shown in FIG. 9; however, an attribute unit can be entered in any suitable manner. At step 900, a time period is entered. The time period is preferably entered by specifying a beginning point (e.g., a specific date, a year and month, etc.) and an ending point (e.g., specific date, year and month, current/present, etc.); however, the time period can be entered in any suitable manner. At step 910, an identifier for the unit is entered. Preferably, the identifier is a combination of an organization (e.g., an employer) and a descriptor (e.g., a job title); however, the identifier can be any suitable identifier for distinguishing the unit from other units. Preferably, an indication of whether the unit involved management activities and, if so, an indication of the quantity, quality or character of the management activities are also entered; however, it is not necessary to enable entry of this information.

At step 920, a high level skill set is selected. Preferably, the high level skill sets are categorized by industry, wherein the skills in a high level skill set are the skills associated with that industry; however, the high level skill sets can be categorized in any other suitable manner. Preferably, the high level skill sets include one or more skills; however, the high level skill set can also, or instead, include a trait of the unit (e.g., the industry to which the unit relates). Also, when the high level skill sets include one or more skills, those skills are preferably organized hierarchically; however, the skills can be organized in non-hierarchically or in any other suitable manner.

At step 930, a flavor bucket is selected. Preferably, the flavor bucket is part of the top level of a hierarchy of skills in the high level skill set; however, the flavor bucket could be any suitable set of skills. Also, the flavor bucket is preferably associated with a profession, wherein the skills associated with that profession are included in the flavor bucket; however, the flavor bucket can be associated with any other suitable categorization of skills.

At step 940, the skills associated with the flavor bucket are displayed. Preferably, the skills are organized hierarchically; however, the skills can be organized non-hierarchically or in any other suitable manner. At step 950, the skills to be associated with the unit are selected. If the skills are organized hierarchically, it is beneficial for the user to enter as specific of skills (i.e., low on the hierarchy) as possible because when matching is performed, if the unit's skill is included in the hierarchy below the desired skill, preferably, the desired skill is met. However, if the unit's skill is above the desired skill in the hierarchy, the desired skill is preferably not met. However, the effect of the hierarchy on matching can follow any suitable protocol.

Preferably, a user can search for a skill to associate with the unit outside of the high level skill set and/or flavor bucket; however, employment systems can disable searching for skills outside of the high level skill set and/or flavor bucket. Thus, if a user misjudges the hierarchy, he or she can still find the appropriate skill for the unit if it is available.

At step 960, the user assigns weights to one or more of the selected skills. Preferably, the user has a limited number of points (e.g., 10) to apportion between the skills; however, the weights can be assigned in any other suitable manner. If the user does not apportion any points to a skill, that skill is preferably not considered in the matching calculations, but is still visible to potential matches viewing the user's profile. However, skills that are not apportioned any points can be included in the matching calculations in any suitable manner.

Preferably, the user can also associate other information (e.g., text) with the unit that is not used in the matching calculations; however, employment systems are not required to enable users to associate such information with the unit.

A work unit may be independent of any particular position. For example, an employment seeker who worked as a programmer for four years, but who spent two years of that time devoted to one project, one month in an intensive training program, and the remainder of the time working on various different projects may enter one work unit for the two year project, one work unit for the training month, and one or more work units for the remainder of the time.

Preferably, the recency of an attribute is figured into the match calculation in the manner described above; however, recency can be figured into the match calculation in any suitable manner. For example, a duration can be recorded for a attribute unit (e.g., a work unit) as part of the attribute unit's creation. A duration can be entered indirectly by specifying a beginning and ending date. Alternatively, a duration can be entered directly and may be accompanied by either a beginning or ending date. The recency of a skill can be determined by comparing the time period of an attribute unit with another duration that ends at the present time. For example, an attribute unit having a duration of two years beginning five years ago and ending three years ago would be counted as recent in its entirety if a recency requirement is "within five years." However, only the most recent one year of the same attribute unit would be counted as recent if the recency requirement is "within four years."

Preferably, employment seekers are not able to specify an importance level for their attributes; however, if desired, an employment system can enable employment seekers to specify an importance level for their attributes. Such an importance level can be used when associating employment seekers and employee seekers to enable an employment seeker to emphasis or de-emphasis any of their attributes. Thus, a programmer who has five years of Cobol experience but does not wish to use Cobol in any new position can specify a low importance level to the Cobol experience. As a result, that programmer will match better to open jobs that require some Cobol experience than if the programmer left that experience out of his profile. At the same time, that experience will be de-emphasized so that his match results are not dominated by his Cobol experience. Similarly, an attorney with experience in patent interference matters and who is more interested in positions that involve that area of the law than any other area can specify a high importance level to the patent interference experience.

Preferably, employment seekers are not able to enter and/or match upon exposure skills (i.e., skills seekers have picked up over time but have not applied seriously in a professional capacity); however, if desired, and employment system can enable employment seekers to enter exposure skills in employment exposure skills units. For matching purposes the duration of an employment exposure skill unit is a time period less than or equal to the smallest granularity for job-related work units. Thus, the weighing of employment exposure skills tend to be small when associating employment seekers and employee seekers. The recency of these exposure skills can vary or can be assigned a fixed value (e.g., now or current).

Preferably, employment seekers enter their education history in the form of a list of one or more degrees/diplomas received. For each entry, employment seekers can preferably specify the type of diploma, the issuing institution, the date received and/or a description of the educational experience; however, if desired the employment system can enable employment seekers to specify any other suitable information. Preferably, the description of the educational experience is not used to associate employment seekers with employee seekers; however, the educational experience can be part of the matching calculation in any suitable manner. Preferably, the description is displayed to employee seekers who match with the employment seeker. Preferably, educational degrees/diplomas/certificates are ordered, and the highest ordered educational entry for an employment seeker is used as the "highest degree attained" education attribute when associating employment seekers and employee seekers; however, education history information need not be ordered and can be figured into the match calculation in any suitable manner.

Alternatively, employment seekers can enter their education history using educational background units in a manner similar to entry of employment history in work units. Educational history units can correspond to the duration of a degree program, a semester or quarter of a degree program, individual courses, and/or units of courses. Attributes included in educational background units can include subjects or skills taught, project types, degrees or certificates earned, evaluation of performances, etc.

Preferably, a brokerage of user background details and preference profile is maintained (e.g., as part of one or more match-based employment systems or as a separate, dedicated system). As employment seekers or employee seekers move from one match-based employment system site to another, it is determined (e.g., via cookie, etc.) whether they have background data and/or matching profiles available in the brokerage. If such data is present in the brokerage, the seeker is able to transfer their information to the new site. Thus, seekers are spared the need to re-enter data. Preferably, the transfer is automatic; however, the transfer could require the user to acknowledge the transfer or be performed in any other suitable manner. Preferably, changes to background data and/or other seeker information on any site is propagated to all sites.

Figure 10:
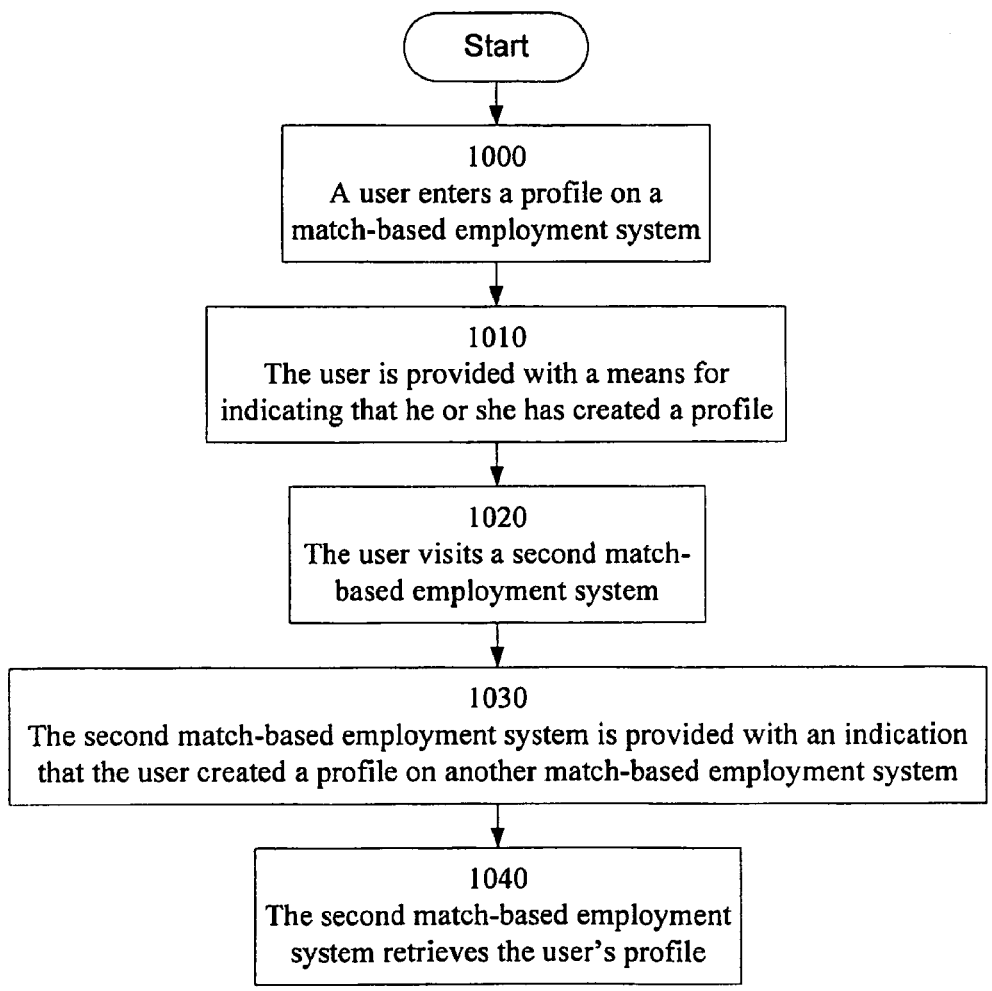
FIG. 10 is the process of brokering user profile in accordance with one embodiment of the present invention.

FIG. 10 shows the process of brokering user profile in accordance with one embodiment of the present invention. At step 1000, a user enters a profile (i.e., background/attribute information and preferences) on a match-based employment system. At step 1010, the user is provided with a means for indicating that he or she has created a profile. Preferably, the means is a cookie that includes information about upon which match-based employment system the profile was created; however, the means can be a user identifier, a match-based employment system identifier or any other suitable means. At step 1020, the user visits a second match-based employment system. At step 1030, the second match-based employment system is provided with an indication that the user created a profile on another match-based employment system. At step 1040, the second match-based employment system retrieves the user's profile.

Alternatively, match-based employment systems can interact to perform the function of the brokerage without the need for a separate, dedicated brokerage. For example, when a user visits a site for the first time, there may be an indication (e.g., a cookie or input from the user) that the user has a profile at another match-based site. The profile can then be retrieved from that site. Alternatively, after the site collects sufficient identifying information, it can query other match-based sites to determine whether any of them contain a profile for the user. Preferably, both background information (e.g., attribute units) and preference profiles (i.e., attributes of a desired position, employer or employee) are brokered; however, if desired, only one or the other can be brokered.

Preferably, a seeker is prompted to enter a substantial amount of information before any matching occurs; however, matching can be performed after the seeker enters a minimal amount of data or at any other suitable time. For example, a seeker's (either employment seeker or employee seeker) profile (i.e., background and preferences) can be entered and/or edited iteratively. After matching is performed, the seeker can be prompted to provide additional information or alter existing information in response to various conditions. For example, an employment seeker may not match well with any position displayed to him or her, causing the system to prompt the user to enter missing attributes that might improve the employment seeker's match level for the positions. Alternatively, an employment seeker may match well with a position, but the position is not displayed to the employment seeker because of his or her preferences, causing the system to prompt the employment seeker to augment or modify his or her preferences. Answering iterative data collection questions causes the search/match results to be quickly updated to reflect the new match criteria.

Preferably, seekers (employee seekers or employment seekers) can specify an importance level only for the preferences that they enter (i.e., what they desire in a match; not their own attributes); however, if desired, an employment system can enable seekers to specify an importance level to any match criteria that they enter. The importance level may default to a some value (e.g., a neutral value), thus making it unnecessary for a seeker to enter the importance level for every match criteria. However, if a seeker wishes to raise or lower the relative importance of any criterion in the match, he or she may do so. Preferably, seekers are able to specify importance levels using five levels of granularity for importance; however, any suitable granularity can be used. For example, the granularity of the importance scale can be limited only by the granularity to which the system can differentiate values.

Preferably, the importance weighting acts to adjust the relative importance of the criteria. As a result, marking each criteria as having the highest importance will have the same effect on the match scores as marking each criteria as having the lowest importance. However, if desired, the importance weighting can have an absolute effect on the matching scores (i.e., marking all criteria as having the highest importance will have a different effect on the match scores than marking each criteria as having the lowest importance).

Preferably, an employment seeker is not able to weigh positions by which company is offering the job; however, if desired, an employment system can enable an employment seeker to weigh positions by what company is offering the job. In such a system, if an employment seeker has a strong desire to work for a specific company, that company can be specified as part of the preference information with a high importance weighting. Alternatively, if an employment seeker has a strong desire to not work for a specific company, the company can be specified as part of the preference information with a "not" indication and/or a strongly negative/adverse/anchoring importance level. A hierarchy of company information can be maintained to track which companies are related by being subsidiaries, affiliates, divisions, parents, etc.

Seeker Match Execution and Results

Preferably, employment seeker can have only one preference profile and employee seekers can have only one preference profile for each position being offered; however, if desired, seekers (employee seekers or employment seekers) can have more than one preference profile (i.e., the set of attributes they are seeking). In such systems, when a seeker who has more than one profile views matches, the system displays the match results for the current profile. However, seekers may view match results for any of their preference profiles. Similarly, when an employee seeker views a matching employment seeker who has multiple preference profiles, the matching employment seeker is only displayed once in the result set (e.g., for the best matching score for that employment seeker's profiles).

For employment seekers, match results can contain the company name (perhaps being the most prominently displayed element), the position location, position title, the match element contributing the most to the overall score and/or any other suitable information. In embodiments in which the match-based employment system is controlled by or contains only one employee seeker, the results can emphasize an element other than the company name (e.g., department or job title).

In one embodiment, whenever search/match results are visible on the screen, the match criteria used to produce the results are also displayed; however, the match-based employment systems are not required to enable display of match criteria simultaneously with match results. The match criteria can be arranged to indicate whether they are background or preference profile information. Alternatively, the matching criteria can be arranged to indicate whether they are company or current position profile information.

Preferably, for each match result displayed, the match-based employment system displays a score that reflects the quality/strength of the bi-directional match between the employment seeker and the position; however, a score reflecting a uni-directional match or any other suitable score can be displayed or the system can display no score, as desired. Preferably, the bi-directional match score is calculated such that how well the employment seeker meets the job's desires accounts for 70% of the score and how well the job meets the employment seeker's desires accounts for 30% of the score; however, the score calculation can use any suitable weighting of uni-directional matches. Preferably, the score is expressed as a percentage; however, the score can be expressed in any suitable manner.

Preferably, the match score is computed on the basis of all employee seeker criteria, regardless of whether the employment seeker has supplied answers/attributes specified by the employee seeker's preference criteria. Similarly, the match score is preferably computed on the basis of all employment seeker criteria, regardless of whether the employee seeker has supplied answers/attributes specified by the employment seeker's preference criteria. Preferably, such missing elements/attributes are scored as 0; however, the missing elements can be accounted for or left out of the matching calculation in any suitable manner.

In an alternative embodiment, seekers are able to provide feed back for a matching score. For example, a mechanism (e.g., a link, a button, etc.) is provided in the user interface of the match results listing to enable seekers to indicate that they disagree with the match score for a given listing. If a seeker believes that a match score is out of place (e.g., above or below what the seeker believes is a better candidate, or 100% when the match is not what the seeker envisioned, etc.), then the seeker can enter a dialog with the match-based employment system about the perceived mismatch.

The seeker is presented with a number of common reasons for the perceived mismatch (e.g., signal strength, in which case the system begins iterative data collection; or importance/recency weighting, in which case the system queries the seeker about which skills/attributes seem out of proportion and then collects appropriate weighting; or inappropriate expectations, in which case the system automatically performs additional matches based on alterations of the current matching criteria and provide information about the results and/or suggestions based on the additional matches to the seeker). In this manner, seekers can be prompted to enter importance/recency weighting when the seeker was not forced to enter it initially and/or without presenting the seeker with a large matrix of settings, etc.

Further, signal strength can be used in determining the priority of iterative data collection questions. For example, missing criteria/attributes that would likely have the greatest impact on the results (e.g., the match element question whose weight has the biggest potential sway on the match) can be asked first. Weights can be based on the seeker's industry.

Preferably, the user interface indicates the general quality of the match result set with visual cues; however, the interface is not required to indicate the quality of match results or can indicate the general quality in any suitable manner. For example, results with scores including and over a certain threshold (e.g., 90%) are bolded and/or highlighted, scores including and over another threshold (e.g., 60%) but below the higher threshold are in a normal style, and scores below that are grayed out or otherwise visually deemphasized.

Seeker Match Feedback

In an alternative embodiment, a visual indication is provided (e.g., on the match results display where the profile summary is displayed) of the completeness (i.e., signal strength) of the profile criteria. A separate indicator can be provided for the background and preference portions of the match profile. Alternatively, a separate indicator can be provided for the company and position portions of the match profile. The indicator indicates to the seeker that the current state of the match profile may be inadequate to provide accurate matches. Thus, poor scores may indicate incomplete data rather than a lack of good matches in the database. The weights used in the signal strength calculation can be based on the seeker's industry.

As described above and shown in FIGS. 4-6, a seeker is preferably able to view indications of the quality and/or quantity of match results for modifications of the specified match criteria. However, feedback of the quality and/or quantity of match results can be provided in any suitable manner. For example, the match-based employment system can provide a visual indication (e.g., a histogram, etc.) of how much of the candidate pool (i.e., possible matches) falls within reasonable matching bounds (e.g., within the current match profile or within some acceptable error/alterations of the current match profile) given the current match profile data. Thus, a seeker receives an indication of whether the current matching criteria are effectively limiting (i.e., neither too limiting nor insufficiently limiting) the result set.

Preferably, the match-based employment system queues and delivers messages and alerts to seekers; however, employment systems are not required to deliver such feedback. The messages and alerts are preferably accessible from the initial screen the seeker is provided upon logging into the system (e.g., via a web interface); however, the messages and alerts can be accessible in any suitable manner. Alerts can inform seekers of changes that occurred since the seeker's last login (e.g., new matches available, status of employer/seeker contact attempts, etc.). Further, new incoming alerts delivered to a seeker during a session can be revealed to the seeker no matter what page he or she is currently viewing.

Figure 11:
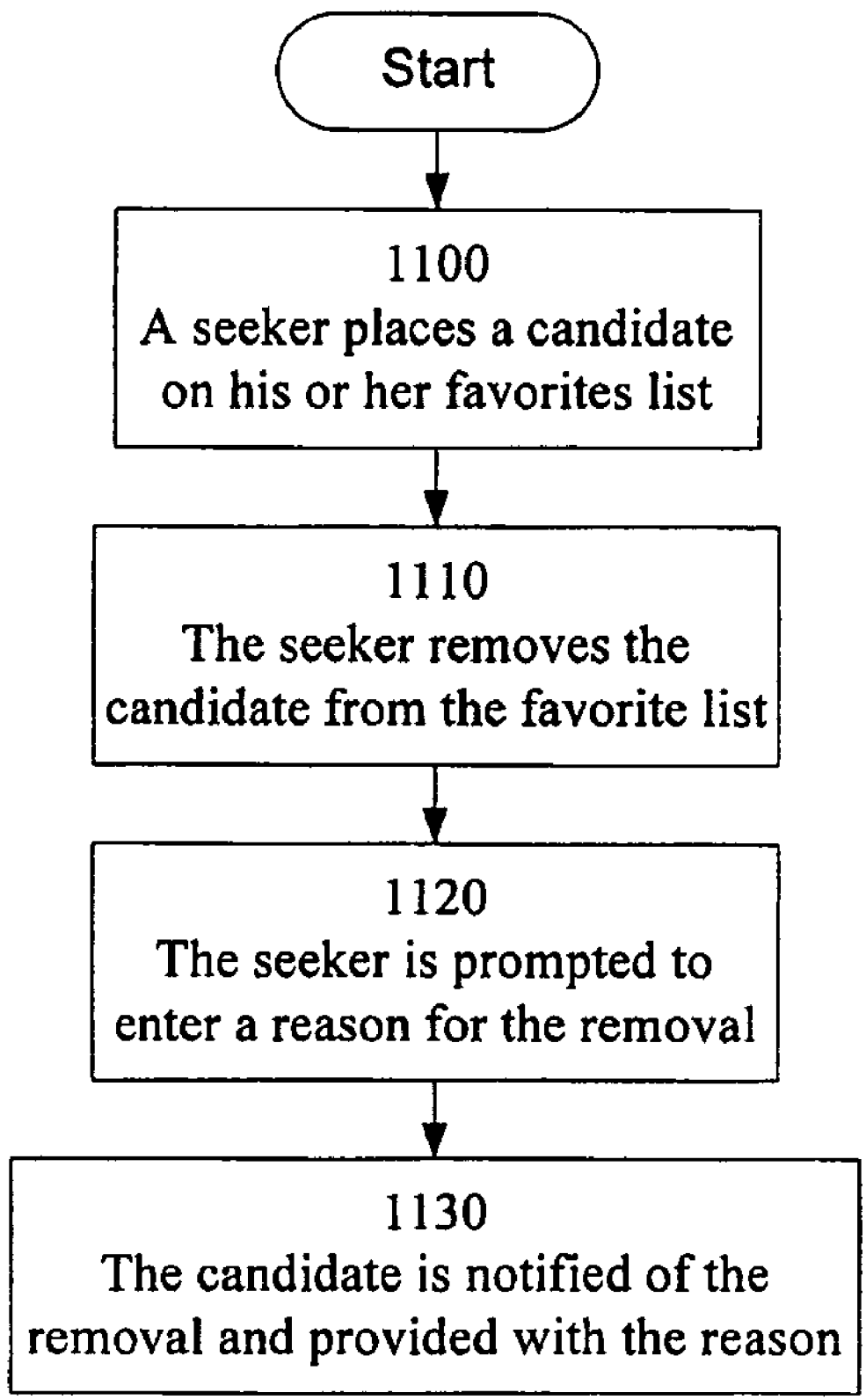
FIG. 11 is a preferred process for providing feedback about removal from a favorites list in accordance with one embodiment of the present invention.

Preferably, as shown in FIG. 11, when a seeker removes a possible match from the seeker's favorites list, the seeker is prompted to enter a reason for the removal (e.g., need to make space on favorites list, salary demand too high, better candidate appeared, etc.). At step 1100, a seeker places a candidate on his or her favorites list. Preferably, the candidate is notified of being placed on the favorites list; however, the system is not required to notify the candidate of being placed on the favorites list. At step 1110, the seeker removes the candidate from the favorite list. At step 1120, the seeker is prompted to enter a reason for the removal. Preferably, the seeker is presented with a list of standard reasons; however, the seeker can be prompted to enter the reason in free text or in any other suitable manner. At step 1130, the candidate is notified of the removal and provided with the reason.

Preferably, a periodic (e.g., weekly) e-mail similar communication is sent to seekers, containing a summary of the current information for a given profile (e.g., preference criteria, matches, etc.); however, an employment system is not required to send such a communication. The e-mail preferably contains a link which enables seekers to jump directly to match-based employment system's user interface for the seeker for more details; however the e-mail can contain any suitable information and is not required to contain a link. Preferably, an alert (e.g., an e-mail, an instant message, a phone call, a notice on the user interface login screen for a seeker, etc.) is sent to a seeker when candidates with a match score above a threshold have indicated interest in the seeker (or a position offered by the seeker). Preferably, the threshold is seeker-specified and/or seeker-adjustable; however, the threshold can be a fixed value set by the system or any other suitable value. Further, the default for the match-based employment system can be to not contact the seeker, requiring the seeker to specifically request being alerted before alerts are sent.

Figure 12:
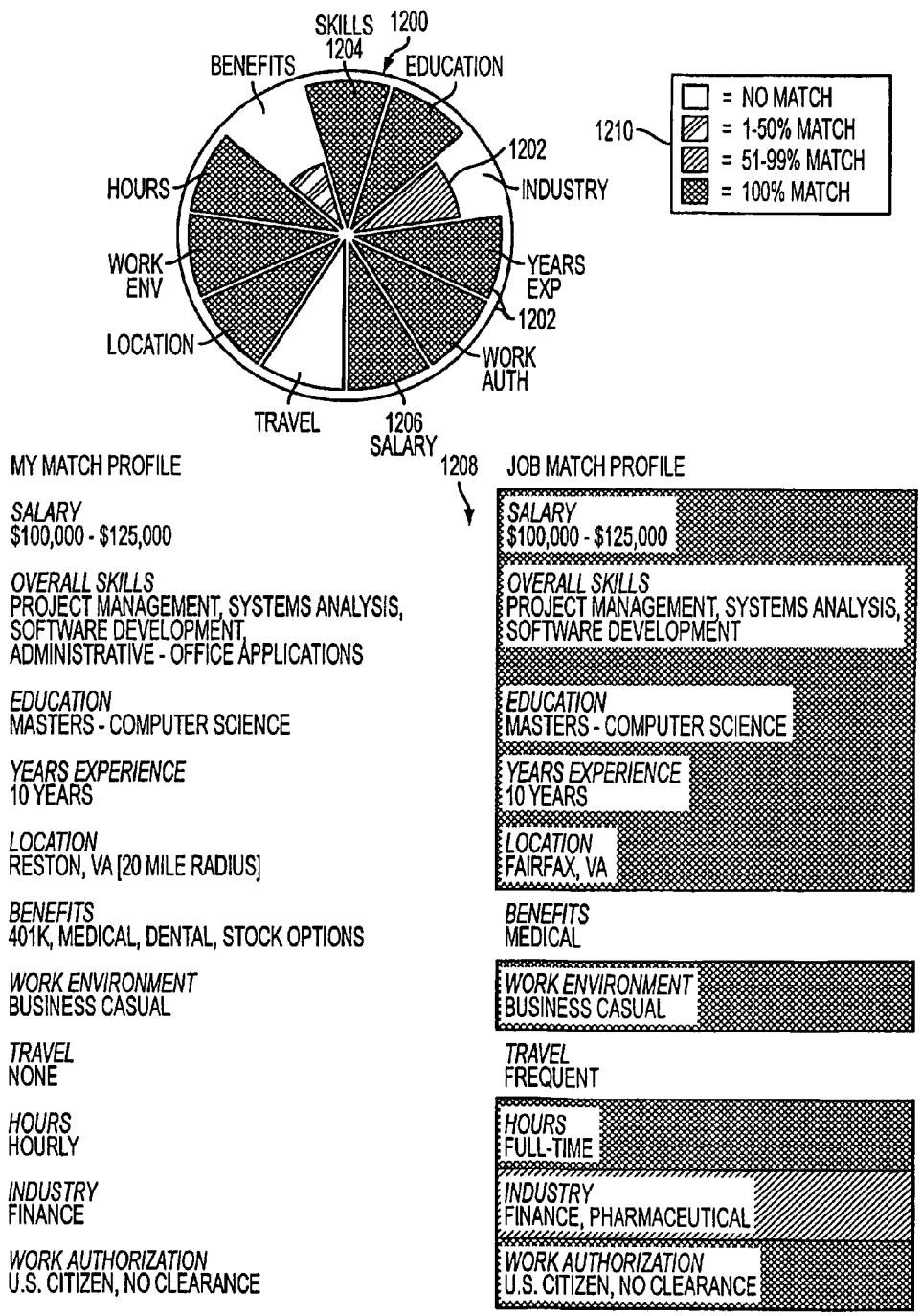
FIG. 12 is a diagram of a graphical depiction of the strength of components of a match score in accordance with one embodiment of the present invention.

As shown in FIG. 12, a graphical depiction of the strength of components of the match score are preferably displayed when a user views a candidate; however, the graphical depiction can be displayed at any other suitable point or not at all, as desired. Components 1202 are displayed as wedges in a pie chart 1200, with component strength being indicated by both the size of the wedge (i.e., the length of the radius) and a color or pattern. Matching elements can be grouped together into one component (e.g., Skills 1204); however, components can also be individual match criteria (e.g., Salary 1206). The components 1202 can also be displayed textually in a list 1208, and preferably the text for each component appears over the color or pattern corresponding to that component's strength. Also, a legend 1210 is preferably provided to better quantify the strengths being indicated by wedge size and/or color or pattern.

Figure 13:
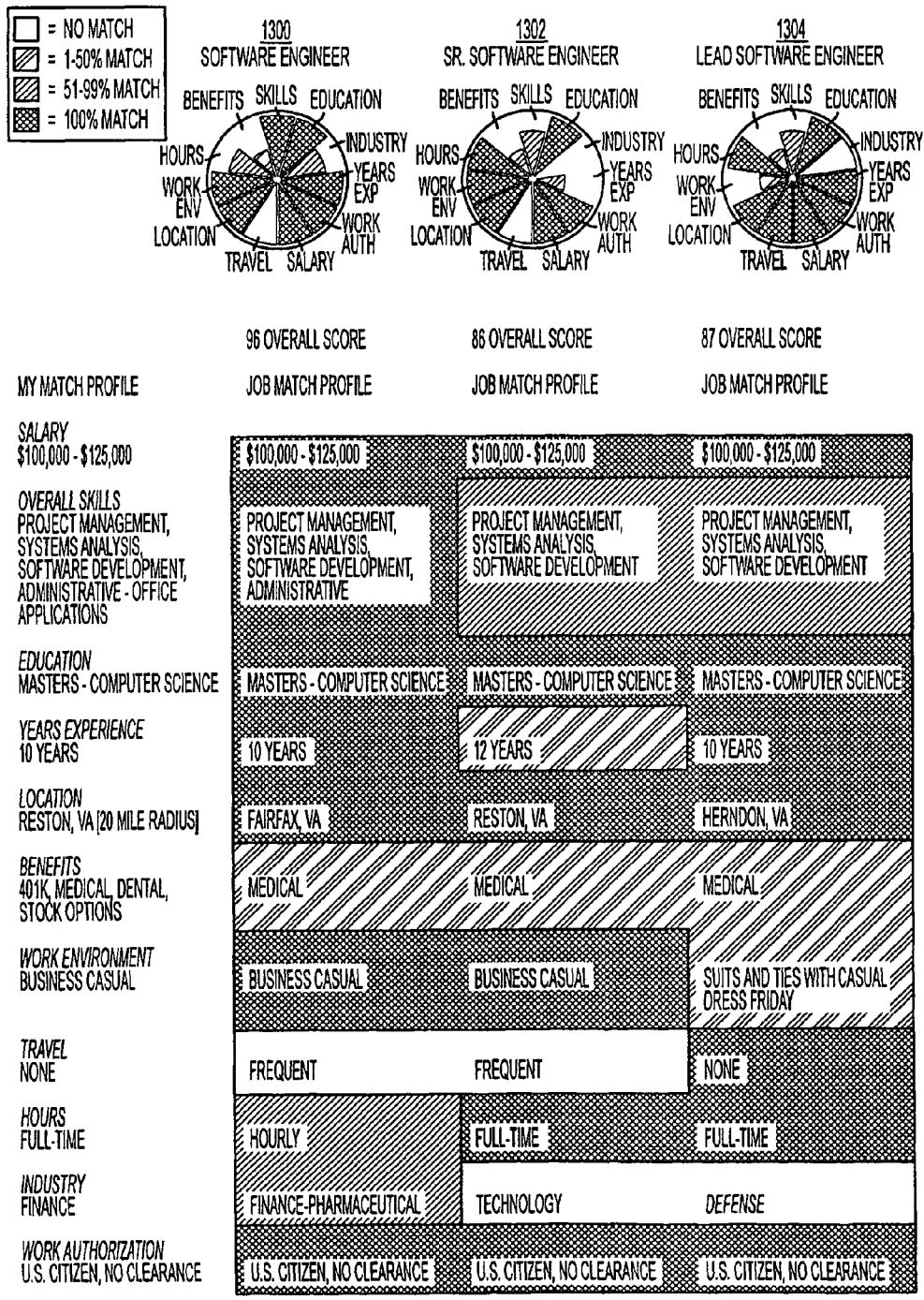
FIG. 13 is a diagram of multiple graphical depictions, such as the one in FIG. 12, being displayed concurrently in accordance with one embodiment of the present invention.

Preferably, as shown in FIG. 13, seekers can compare candidates by displaying side-by-side information similar to the information displayed in FIG. 12 for two or more candidates. Preferably, information for a maximum of three candidates is displayed at one time; however, information for any suitable number of candidates can be displayed at one time. By presenting the information for the Software Engineer position 1300, the Sr. Software Engineer position 1302 and the Lead Software Engineer position 1304 in this manner, the seeker can quickly perceive differences, if any, between the positions.

Seeker Keeper Management

Preferably, seekers (both employee seekers and employment seekers) indicate up to a fixed number of matches (e.g., 20) as keepers or favorites, thus, forming a favorites list (or keepers list); however, employment systems are not required to enable seekers to indicate favorites. Preferably, employee seekers have a favorites list for each of the positions posted by the employee seeker. The indicators, or bookmarks, help the seeker to remember the matches for future reference. Further, the seeker may enter and record notes for matches on the favorites list. In one embodiment, if a match is removed from a favorites list, any notes recorded by the seeker are lost.

If the seeker wishes to bookmark an additional match once the limit on favorites is reached, the seeker must first remove another match (e.g., a less desirable match) from their existing favorites list. Preferably, the favorites limit is configurable by the match-based employment system administrator; however, the favorites limit can be unconfigurable or configurable by any other suitable entity as desired.

In an alternative embodiment in which seekers can have multiple profiles, employment seekers are preferably limited to only one set of favorites, regardless of their number of profiles, to discourage/disable seekers from creating dummy profiles to get more favorites. Further, all favorites display the match score for each preference profile of the seeker. Thus, a seeker can easily compare a favorite's match score between various preference profiles.

Preferably, seekers can only indicate interest in matches that are first placed in their favorites list; however, if desired, the system can enable seekers to indicate interest in matches not on their favorites list. Thus, a seeker is limited in the number of matches for which it can show interest at any one time by the maximum number of favorites allowed on the favorites list.

When a match is removed from the favorites list, the seeker is preferably asked to provide feedback explaining the reason for removing the match (e.g., interest was not returned, space was needed for a better match, etc.) as discussed above. Similarly, if a match is removed from the system (e.g., the employee seeker unposts a position or indicates that job is now filled, the employment seeker accepts another job or ends his or her use of the system, etc.), all seekers who have the match in their favorites list are notified through the alert system. Further, the favorites slot occupied by the match is preferably automatically vacated.

Position Details and Application Process

Preferably, detailed information for a match is only one click (or enter or other input means) away from the displayed match results; however, detailed information can be any suitable number of clicks away from the displayed match results. For example, when an employment seeker is presented with matching positions, the employment seeker can click on a link for a position to retrieve additional details about the position such as the graphical information described above for FIG. 12.

Preferably, employee seekers are not e-mailed when an employment seeker indicates interest in a position posted by the employee seeker; however, if desired, employee seekers can be e-mailed when an employment seeker indicates interest in a position posted by the employee seeker. Preferably, the employment seeker shows up flagged as "interested" if they show up (i.e., are displayed) in the employee seeker's search/match results for that position. Thus, the system avoids the inefficiencies associated with sending notices and/or resumes to employee seekers when an employment seeker is interested. The employee seeker is no longer flooded with unqualified or lesser qualified applicant information. Further, wherever keepers are displayed for the employment seeker, keepers to which the seeker has indicated interest can be marked to so indicate.

Figure 14:
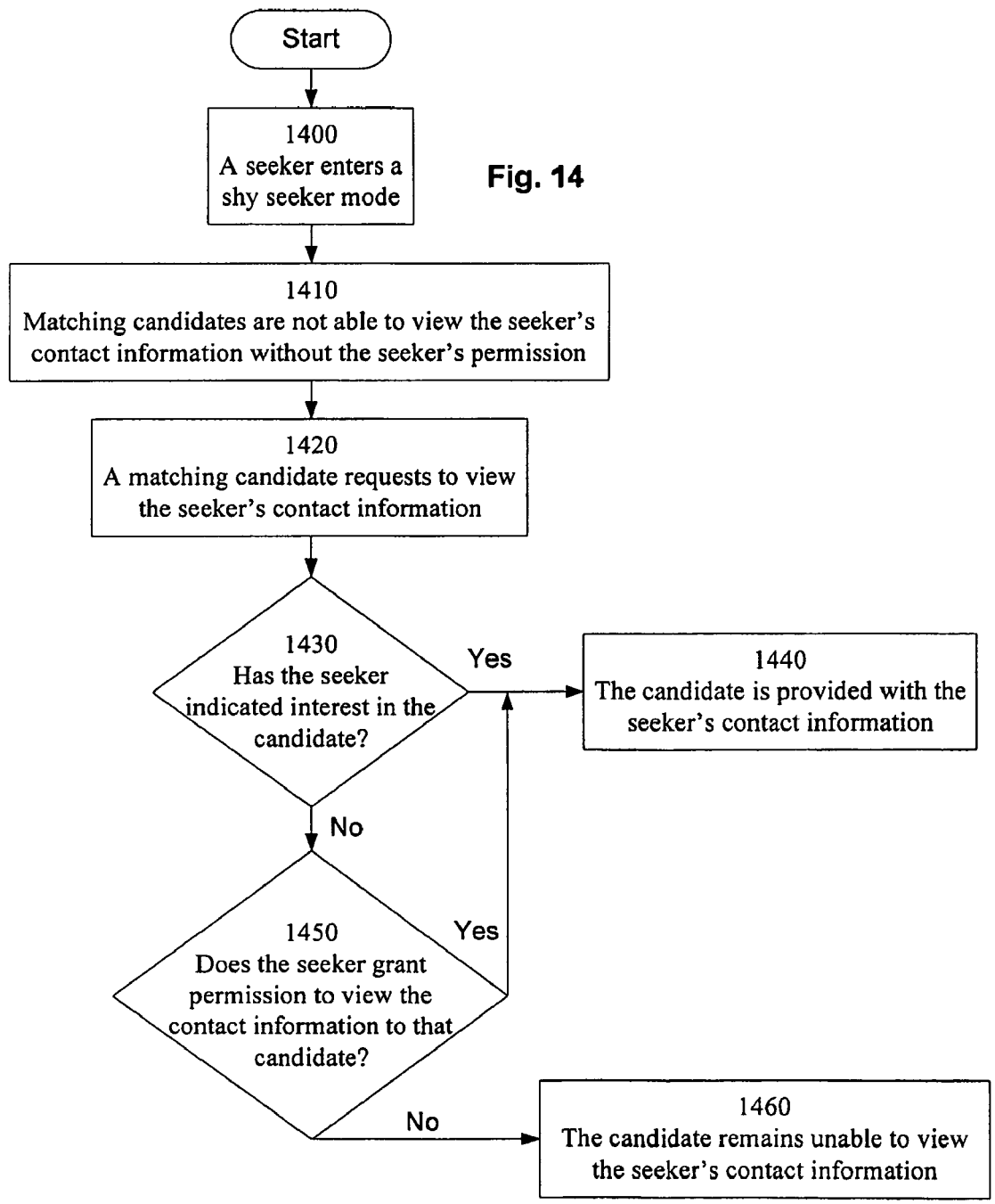
FIG. 14 is a flow diagram of a preferred process for obtaining contact information for a shy seeker in accordance with one embodiment of the present invention.

Preferably, as shown in FIG. 14, the match-based employment system enables a seeker to enter a mode whereby a match (e.g., an employee seeker for a matching position or a matching employment seeker) must be authorized to view the seeker's contact information; however, employment systems are not required to provide a shy seeker option. At step 1400, a seeker enters a shy seeker mode. At step 1410, matching candidates are not able to view the seeker's contact information without the seeker's permission. At step 1420, a matching candidate requests to view the seeker's contact information. At step 1430, it is determined whether the seeker has indicated interest in the candidate. If the seeker has indicated interest in the candidate, at step 1440, the candidate is provided with the seeker's contact information. If not, at step 1450, the seeker is asked whether he or she grants permission to view the contact information to that candidate. If the seeker grants permission, the process continues at step 1440. If not, at step 1460, the candidate remains unable to view the seeker's contact information.

As a result, when an employment seeker (it is expected that shy seekers will typically be employment seekers rather than employee seekers) indicates interest in a position, preferably, this also authorizes the employee seeker that posted the position to view the employment seeker's contact information. If an employment seeker has not indicated interest in any open position posted by an employee seeker, that employee seeker must request authorization to view the employment seeker's contact info. The match-based employment system mediates the transaction, and contact information is only released to the employee seeker if the shy employment seeker (i.e., an employee seeker who does not want his identity and/or use of the system to be generally knowable) authorizes it. Thus, employment seekers can use the system with less fear of being discovered by their present employers.

Employee Seeker Match Profile Collection and Management

Employee seekers are able to create and edit a profile of their company and/or an available position. Preferably, there is only one company profile per employee seeker; however, an employment system can enable a company of have multiple profiles, if desired. The profile can include a breakdown of departments or divisions for which the human resources account (i.e., HR account) entering the profile has hiring oversight, and this information can be used in organizing position profiles.

Employee seekers are able to create, edit, and delete job match profiles. Each job match profile includes the matching criteria specific for the particular available position. Further, employee seekers can preferably create new job match profiles by duplicating existing profiles.

Preferably, an employee seeker enters a substantial amount of information before any matches are performed; however, an employment system can perform matches after an employee seeker enters an initial minimal set of information or any other suitable amount of information, if desired. The employee seeker can be iteratively prompted to provide additional and/or modifying information. Answering iterative data collection questions causes search/matching results to be immediately updated to reflect new match criteria.

Similar to employment seekers, employee seekers can preferably specify an importance level for only their desires and not their attributes; however, if desired the system can enable employee seekers to specify an importance level for any of the match criteria they enter. The importance level can have a default value (e.g., a neutral value), making it unnecessary for an employee seeker to enter an importance level for every match criterion. However, if an employer wishes to raise or lower the relative importance of a criterion in the match, he or she may do so by entering an appropriate importance level.

As described above, there are preferably five levels of granularity for importance choices available; however, the granularity can be limited only by the ability of the system to differentiate between values or to any suitable granularity. It is preferred that all importance levels have positive values; however, if desired, negative importance levels can be used to indicate the importance of a criterion not being matched. Preferably, certain match elements (e.g., "authorized to work in the US") may be associated with another level of importance (a deal-killer or anchor importance level), which may or may not be mutually-exclusive with the above mentioned importance level. When the deal-killer criterion importance level is selected the importance weight becomes an anchor which drags anything that fails the match to the bottom of the listings.

The following example helps differentiate between the importance level and the deal-killer importance level. If an employee seeker assigns a high importance level to "having a top secret security clearance level," an employment seeker who does not match that criteria (i.e., does not have a top secret security clearance level as one of his or her attributes) does not receive an increase in his or her match score for the position, but also does not receive a decrease. The lack of the criterion is essentially neutral. However, if the employee seeker assigns a high deal-killer importance level, the employment seeker's match score would be decreased. The match score can be decreased by subtracting a value or by multiplying by a factor that is equal to or near zero.

Preferably, employee seekers are presented with a user interface, similar to the user interface presented to employment seekers, that enables them to easily navigate and select skills required for their job posting; however, any suitable user interface can be presented. Further, employee seekers can preferably specify a duration of experience or attribute required and an importance of that experience to the job; however, in addition, in combination with or alternatively, the employee seeker can specify how recent the attribute (e.g., skill, education, training, experience, etc.) must be and an importance of recency or any other suitable desires or requirements. As discussed above, recency is preferably automatically figured into matches by adjusting both the employment seeker's experience and the employee seeker's desires for recency; however, recency can be figured into matches in any suitable manner.

Figure 15:
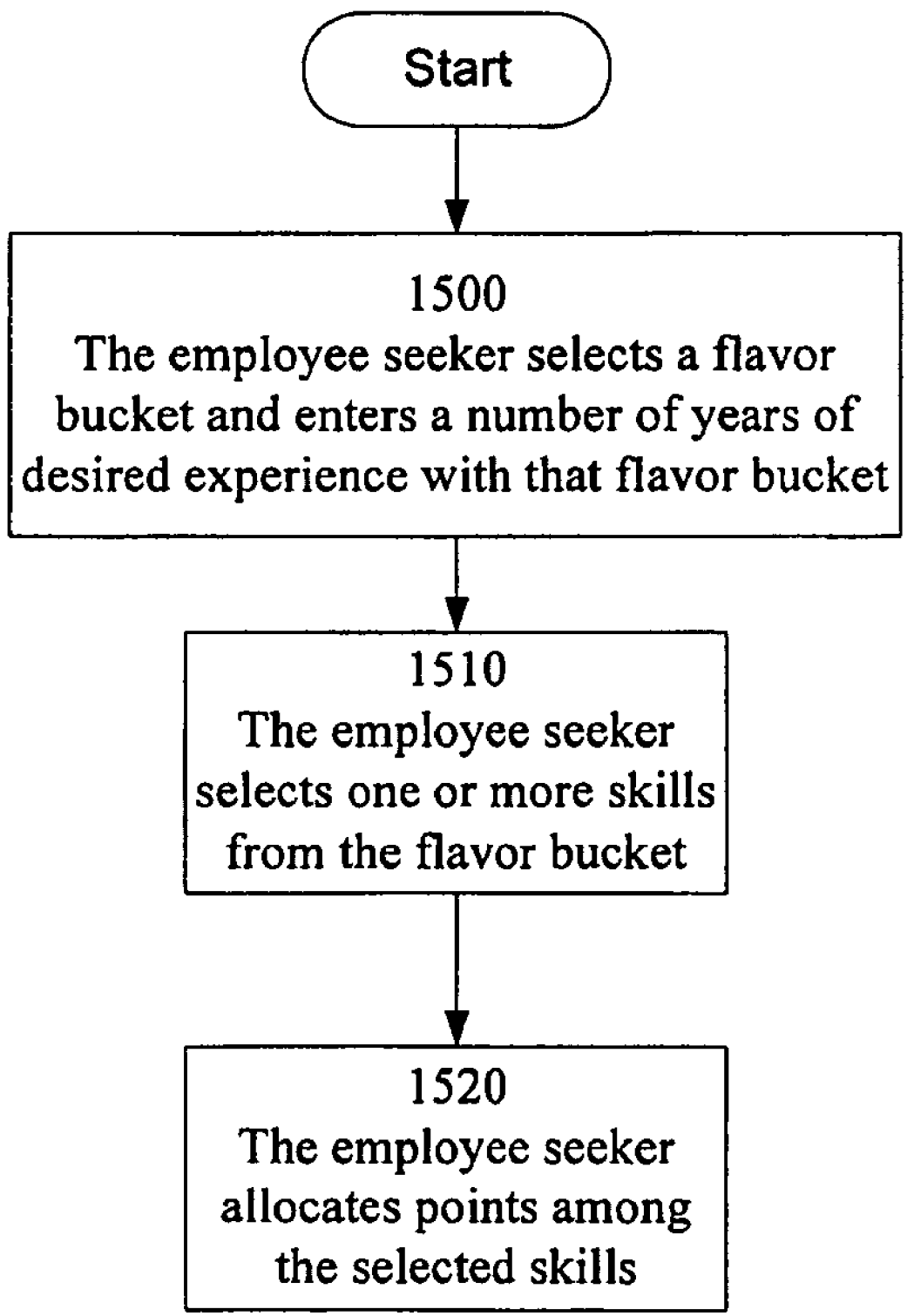
FIG. 15 is a flow diagram of a preferred process for entry of employee seeker desires in accordance with one embodiment of the present invention.

Preferably, as shown in FIG. 15, an employee seeker specifies a number of years of experience desired and specific skills selected from the same hierarchy of skills used by the employment seekers to create their profiles. At step 1500, the employee seeker selects a flavor bucket (e.g., a profession)

and enters a number of years of desired experience with that flavor bucket. At step 1510, the employee seeker selects one or more skills from the flavor bucket. At step 1520, the employee seeker allocates points among the selected skills. Preferably, the number of points available is equal to the number of years experience desired; however the number of points can be any suitable amount. Optionally, the employee seeker can make a skill mandatory (i.e., the anchor or deal-killer described above).

In an alternative embodiment, employers can specify skills/attributes as "nice to have" or "exposure a plus" rather than requiring extensive time on the job. For matching purposes, the recency for such attributes is optionally given no importance for the employee seeker's matching profile.

Preferably, employee seekers can specify a company from which they like to see candidates (e.g., marketing execs from a well-known company with a good marketing program, an innovative competitor, etc.); however, a system is not required to enable employee seekers to specify companies from which they like to see candidates. In an alternate embodiment, a company from which the employee seeker does not want to recruit (e.g., a company that the employee seeker believes trains its employees poorly, a competitor from which the employee seeker has already recruited a large portion of that competitor's employees, etc.) can also be specified. Candidates matching the criterion (i.e., candidates having experience with the specified company) are weighted accordingly and, thus, are differentiated from similar candidates from other companies. In one embodiment, only the most recent work unit is used when matching an employment seeker for former/current employer. In another embodiment, a recency criterion and/or recency importance are also associated with the former/current employer(s) matching criterion or recency is figured into the matching score.

Employer Candidate Details and Contact Process

Preferably, before employee seekers establish a financial trust relationship with the match-based employment system (e.g., by successfully paying some threshold amount for candidate placements, etc.), they are untrusted and they must pay a nominal fee, credited toward placement fees, for candidate contact information; however, payment can be made in any suitable manner. Trusted employers are preferably not required to pay for contact information, and instead are only charged for the placement fee. Further, private-company-board mode employer accounts (i.e., match-based employment systems having only one employee seeker) are preferably trusted initially.

Preferably, new employers may join the system in an untrusted mode with a valid credit card; however, the system can include new employers in any suitable manner. Thus, the employer may purchase contact details as they move towards becoming trusted by the match-based employment system.

Preferably, an employee seeker is able to access detailed candidate information for available candidates (e.g., an employment seeker who matches for a position posted by the employee seeker) within one click/selection of the search/match results list. Candidate details preferably display as much information as possible without revealing contact information for the candidate, and contact information is only available for candidates stored in the favorites list; however, a system can provide contact information for candidates not stored in the favorites list, if desired.

In one embodiment, the match-based employment system preferably provides the employer with a skill summary view of a candidate. If an employer selects a skill in the skill summary view, a list of instances of that skill for the candidate are displayed (e.g., the experience for that skill for each of the candidate's work units containing that skill are displayed). If an employer selects an instance, the associated work unit in the candidate resume is displayed. Thus, employers may quickly examine exactly how the candidate's attributes arose from the candidate's work experience.

Preferably, employers can view contact information for a given candidate under consideration from the favorites list either directly or indirectly. Doing so preferably initiates a purchase transaction for untrusted employers. Trusted employers preferably have free access, but the match-based employment system still records that the trusted employer requested contact info so the relationship can be tracked. If the candidate has indicated that he or she does not want his or her identification information (information typically included in contact information) revealed to unauthorized entities, and if the employer is not on the candidate's authorized list, the match-based employment system mediates the contact process as described above or in any other suitable manner. For example, the candidate may be informed of the employer's identity and that the employer desires their contact information. If the candidate approves the release of his or her contact information, the contact information is released to the employer.

Preferably, the employee seeker is provided an incentive to inform the match-based employment system when a job profile is filled (e.g., the employee seeker has hired one of the matching employment seekers); however, employer systems are not required to offer such an incentive. For example, if an employer informs the match-based employment system of a hire, the system creates an invoice and sends a message to the employee seeker (if they are on the system) and asks them to confirm that they were hired. If both sides confirm, the system rewards the employer by removing the employment seeker's profile from the market (e.g., making the profile inactive and unviewable/unmatchable). The system may also reward the employment seeker by making the position no longer available. Alternatively, the system may provide some financial compensation to the employment seeker.

Hiring Manager Interface

Preferably, employee seekers have an HR administrator that manages overall policies and account details for a company on the match-based employment system; however, if desired, employee seekers are not required to have a single HR administrator perform those tasks. The HR administrator can also approve transactions (e.g., hiring or viewing contact information for untrusted employee seekers). The HR administrator can also grant rights to hiring managers. Preferably, the hiring managers' authority is more limited than the authority of the HR administrator, and hiring managers manage individual job profiles.

The HR administrator can alter company/employee seeker settings, approve transactions, create temporary accounts and assign rights to hiring managers. The HR administrator can also create and delete job/position profiles. Additionally, the HR administrator can function as a hiring manager, enabling it to work with individual job profiles and candidates.

Preferably, a hiring manager is provided a limited user interface and can work only with job profiles assigned to it by the HR administrator; however, if desired, a hiring manager can be provided any suitable interface and responsibilities. A hiring manager can edit profile settings for a position and review candidates. In one embodiment, a hiring manager is not able to delete position profiles, but a hiring manager can perform all candidate/favorites management functions. In one embodiment, a hiring manager can not directly initiate a purchase transaction. For example, if the employee seeker is untrusted, to obtain candidate contact information, a hiring manager can flag the candidates he or she wants to contact and request that the HR administrator perform, or authorize, the purchase.

Human Resource Information Capture and Presentation

In an alternative embodiment, human resources information is determined from an employment system. The employment system can be a match-based employment system or another type of employment system. Human resources information includes, but is not limited to, data about the users of the system (e.g., user attributes and preferences) and/or transaction data (e.g., employers viewing matched employment seekers, employment seekers viewing matched employers, hires, positions being unposted without hires, etc.). The human resources information can be stored in a database which may be analyzed for human resources trends using various data mining/pattern discerning techniques.

Figure 16:
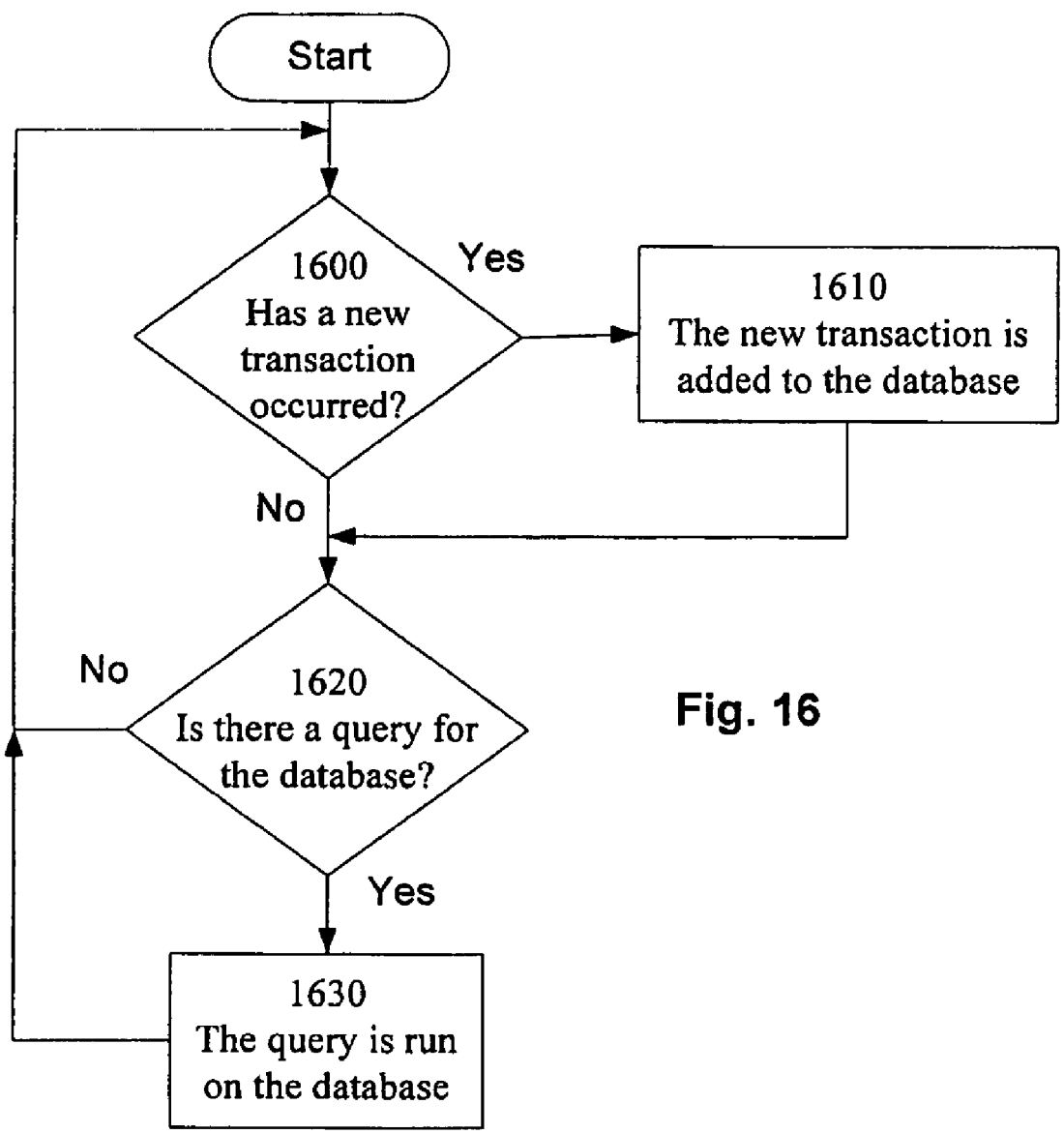
FIG. 16 is a flow diagram of a preferred process for managing an employment system human resources information database in accordance with one embodiment of the present invention.

As shown in FIG. 16, preferably, each transaction (e.g., a profile creation or edit, interest indications, favorite list additions/subtractions, contact information requests, etc.) is stored in the database; however, the database can store any suitable subset of transactions, if desired. The database is preferably a relational database queriable by SQL queries; however, the database can be any suitable database type and can be queried with any suitable database query language.

At step 1600, it is determined whether a new transaction has occurred. A transaction can be, but is not limited to, the addition of a user, a change in the user's profile, the user adding or removing a candidate from a favorites list, the user indicating interest in a candidate and/or the user taking a job or filling a position. If a new transaction has occurred, at step 1610, the new transaction is added to the database and the process continues as step 1620. If not, the process continues at step 1620. At step 1620, it is determined whether there is a query for the database. If there is, at step 1630, the query is run on the database and the process repeats at step 1600. If not, the process repeats at step 1600. It should be noted that any suitable scheduling scheme can be used to handle database additions and queries and that additions are frequently treated as another type of query.

Human resources information (including any information mined or patterns discerned from the human resources information) can be presented to system users upon request. Preferably, users can query the database directly using a database query language; however, the users can also query by selecting a pre-defined query, by submitting a question and having an expert design an appropriate query or in any other suitable manner. Thus, employment seekers can determine which industries, fields and/or geographic location are hiring, what skills, experience and/or other attributes are desired and what level of compensation is typical. Similarly, employers can determine what competitors within their industry are doing with regard to hiring, what attributes employment seekers desire, what compensation levels are typical, and what skills, experience and/or attributes are common or uncommon among employment seekers on the current market.

Near Space Searching in Employment Systems

In an alternate embodiment, when a search is performed in an employment system, one or more near space searches are automatically performed as well. The employment system may be a match-based employment system or another type of employment system. FIGS. 4-6 show the performance and results display of a near space search in a match-based employment system. To perform a near space search, the system introduces an error into the original search specification. For example, if an employment seeker specified that he or she wants a position that is within 25 miles of his or her home, the near space search may expand that limiting condition to be within 50 miles. Preferably, only one search condition is varied per near space search. As a result, the number of searches to be performed grows linearly with the number of search conditions. However, more than one search condition can be varied, in which case the number of searches could grow exponentially with the number of search conditions.

Figure 17:
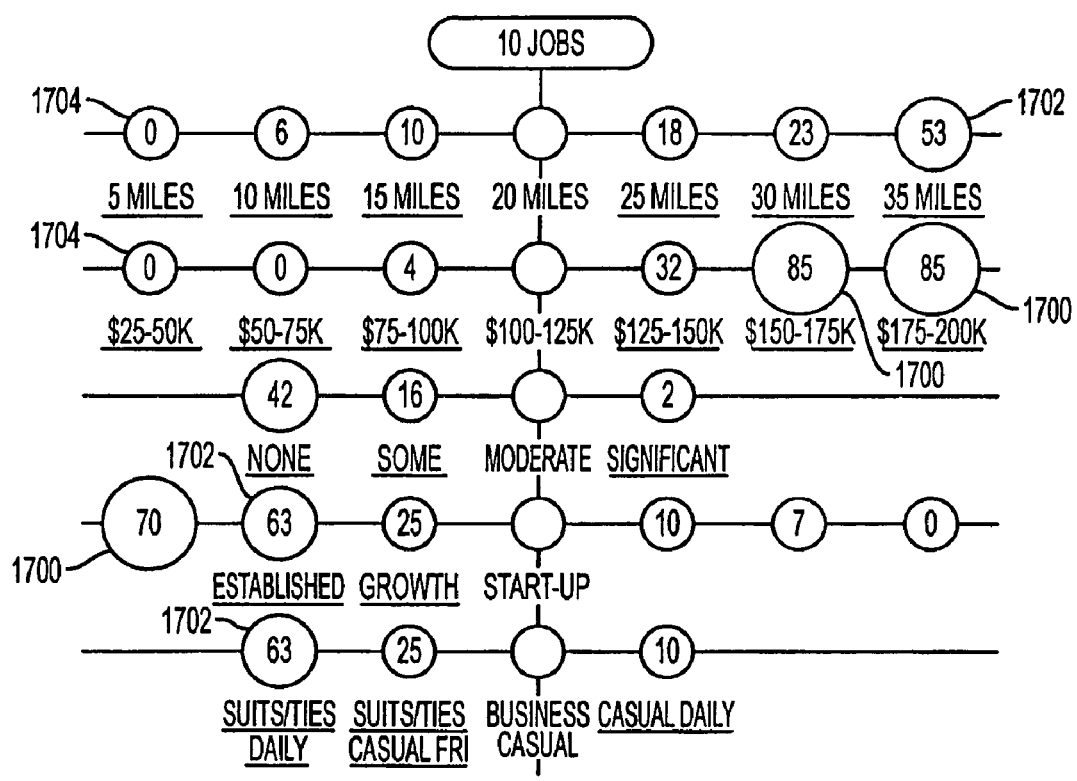
FIG. 17 is a diagram of different search results, such as the results generated by the process of FIG. 4, displayed in parallel lines with larger values corresponding to larger circles in accordance with one embodiment of the present invention.

After the original search and one or more near space searches are performed, information about the results (e.g., size/number of results for each search) is displayed. Preferably, one or more near space searches that are each based upon introducing error into the same search criterion are displayed colinearly; however, the results can be displayed in any suitable manner. If more than one search criterion is varied to produce different colinearly displayed near space results, the results are preferably displayed as parallel lines as shown in FIG. 17; however, the results can be displayed as intersecting lines that intersect at the original search's result information. Preferably, a visual indication other than or in addition to text is provided to distinguish larger results from smaller results; however, employment systems are not required to provide such an indication. As shown in FIG. 17, searches that yield a large number of matches with scores above a threshold (e.g., 90%) are displayed as large circles 1700. Similarly, searches with a medium number of such matches are displayed as medium circles 1702, and searches with a small number of such matches are displayed as small circles 1704.

Recency in Employment Systems

The methods of figuring in recency when searching described above (e.g., in FIG. 3) are not limited to match-based employment systems and substantially similar methods can be used in non-match-based employment systems. Adjusting both desired experience and actual experience for recency and then comparing is the preferred strategy; however, as described above, recency can be figured into the search using any suitable strategy.

For example, in an alternative embodiment, an employment system enables an employment seeker and/or an employee seeker to associate a recency requirement with a search criterion. The employment system can be a match-based employment system or another type of employment system. When searching/matching, the system only counts attributes (or portions of attributes) that satisfy the recency requirement. Thus, an employer may specify that a desired candidate will have four years of musical theater experience within the past seven years. System users associate a time period with attributes/skills/experience contained in their profile, and that time period and the current date are used by the employment system to determine whether (or what portion) of the attribute/skills/experience satisfies the recency requirement.

Audit Trail in Employment Systems

In another alternative embodiment, an employment system records changes made by a user to his or her background information and/or desires. The employment system can be a match-based employment system or another type of employment system. If an employment seeker enters an attribute and later modifies that attribute, the modification is recorded. When an employer views the employment seeker, the employer is able to view the recorded modification. Thus, an employer is made aware of situations in which the employment seeker may be exaggerating/lying about his or her attributes in order to appear more attractive to employers. The change may be innocent, but providing the employer with notice of the change enables the employer to investigate the change further to confirm that the candidate's information is accurate.

Attribute Units in Employment Systems

In still another alternative embodiment, an employment system enables users to enter information about themselves in attribute units. The employment system can be a match-based employment system or another type of employment system. An attribute unit (e.g., a work unit, employment unit, skill unit, employment skill unit, employment exposure skill unit, education background unit, status unit, etc.) is a duration and at least one attribute associated with at least a portion of the duration.

The duration can be entered directly or indirectly (e.g., by specifying a beginning and ending point). If a duration is directly entered, a beginning and/or ending point is preferably still be entered for the duration so that recency calculations can be made; however, employment systems are not required to enable entry of a beginning or ending point. More than one attribute may be associated with an attribute unit. For example, an employment seeker may enter previous job experience by specifying a duration from January of 2001 to November of 2003, and associate a job title of "senior programmer" with 100% of the duration, a responsibility of managing other programmers with 25% of the duration, programming in C++ with 75% of the duration, and UNIX operating system experience with 100% of the duration. However, the preferred method of entering attribute units is illustrated by FIG. 9 in the context of a work unit.

Preferably, a taxonomy of attributes is used to ensure attribute units are correctly and/or precisely entered. For example, if the user is a programmer seeking an employer, the user may be prompted to enter which languages were used in the user's attribute units. Further, sub-categories of attributes may be specified in a hierarchy. For example, a programmer that specifies that he or she programmed in C++ may be prompted to enter the specific platform(s) or compiler(s) used. Also, if a user enters a very specific attribute, the system can also associate related attributes with the duration. For example, if a user enters that he or she programmed in C++ for three years, the employment system may also associate the more general "programming" with the duration. Similarly, in an alternative embodiment, an attribute that shares a common more general ancestor in the hierarchy may be associated with the duration. For example, the duration associated with C++ at 100% may also be associated with C at 95%, C# at 98% and Java at 75%.

Examples of taxonomies for a match-based employment system are found below at Tables A, B and C.

General Purpose Computer

Figure 18:
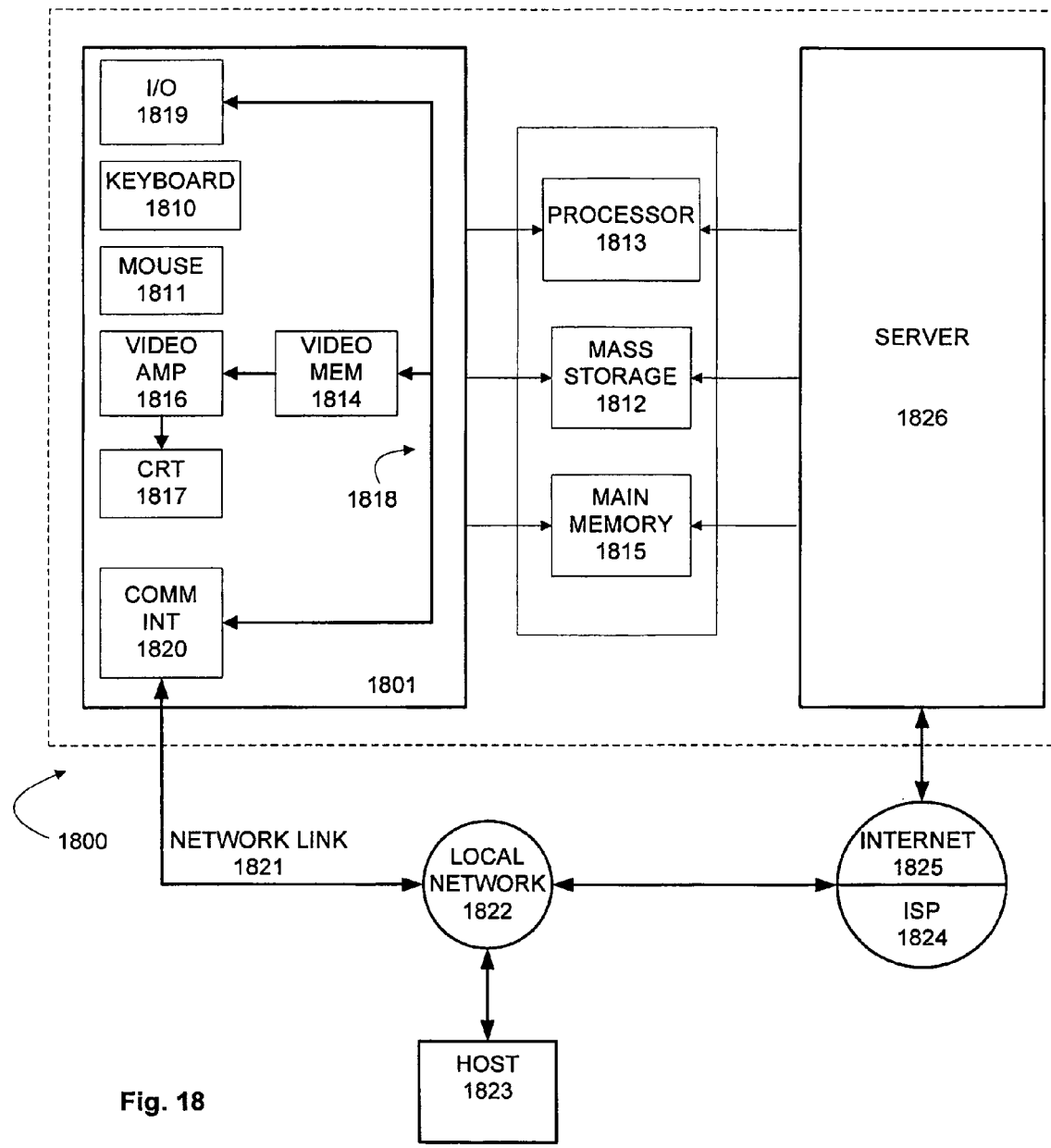
FIG. 18 is a block diagram of a general purpose computer for use in accordance with one embodiment of the present invention.

Embodiments of the present invention can be implemented as computer software in the form of computer readable program code executed in a general purpose computing environment such as environment 1800 illustrated in FIG. 18. A keyboard 1810 and mouse 1811 are coupled to a system bus 1818. The keyboard and mouse are for introducing user input to the computer system and communicating that user input to central processing unit (CPU) 1813. Other suitable input devices may be used in addition to, or in place of, the mouse 1811 and keyboard 1810. I/O (input/output) unit 1819 coupled to bi-directional system bus 1818 represents such I/O elements as a printer, A/V (audio/video) I/O, etc.

Computer 1801 may include a communication interface 1820 coupled to bus 1818. Communication interface 1820 provides a two-way data communication coupling via a network link 1821 to a local network 1822. For example, if communication interface 1820 is an integrated services digital network (ISDN) card or a modem, communication interface 1820 provides a data communication connection to the corresponding type of telephone line, which comprises part of network link 1821. If communication interface 1820 is a local area network (LAN) card, communication interface 1820 provides a data communication connection via network link 1821 to a compatible LAN. Wireless links are also possible. In any such implementation, communication interface 1820 sends and receives electrical, electromagnetic or optical signals which carry digital data streams representing various types of information.

Network link 1821 typically provides data communication through one or more networks to other data devices. For example, network link 1821 may provide a connection through local network 1822 to local server computer 1823 or to data equipment operated by ISP 1824. ISP 1824 in turn provides data communication services through the world wide packet data communication network now commonly referred to as the "Internet" 1825. Local network 1822 and Internet 1825 both use electrical, electromagnetic or optical signals which carry digital data streams. The signals through the various networks and the signals on network link 1821 and through communication interface 1820, which carry the digital data to and from computer 1801, are exemplary forms of carrier waves transporting the information.

Processor 1813 may reside wholly on client computer 1801 or wholly on server 1826 or processor 1813 may have its computational power distributed between computer 1801 and server 1826. Server 1826 symbolically is represented in FIG. 18 as one unit, but server 1826 can also be distributed between multiple "tiers". In one embodiment, server 1826 comprises a middle and back tier where application logic executes in the middle tier and persistent data is obtained in the back tier. In the case where processor 1813 resides wholly on server 1826, the results of the computations performed by processor 1813 are transmitted to computer 1801 via Internet 1825, Internet Service Provider (ISP) 1824, local network 1822 and communication interface 1820. In this way, computer 1801 is able to display the results of the computation to a user in the form of output.

Computer 1801 includes a video memory 1814, main memory 1815 and mass storage 1812, all coupled to bi-directional system bus 1818 along with keyboard 1810, mouse 1811 and processor 1813. As with processor 1813, in various computing environments, main memory 1815 and mass storage 1812, can reside wholly on server 1826 or computer 1801, or they may be distributed between the two.

The mass storage 1812 may include both fixed and removable media, such as magnetic, optical or magnetic optical storage systems or any other available mass storage technology. Bus 1818 may contain, for example, thirty-two address lines for addressing video memory 1814 or main memory 1815. The system bus 1818 also includes, for example, a 32-bit data bus for transferring data between and among the components, such as processor 1813, main memory 1815, video memory 1814 and mass storage 1812. Alternatively, multiplex data/address lines may be used instead of separate data and address lines.

In one embodiment of the invention, the microprocessor is manufactured by Intel, such as the 80X86 or Pentium-type processor. However, any other suitable microprocessor or microcomputer may be utilized. Main memory 1815 is comprised of dynamic random access memory (DRAM). Video memory 1814 is a dual-ported video random access memory. One port of the video memory 1814 is coupled to video amplifier 1816. The video amplifier 1816 is used to drive the cathode ray tube (CRT) raster monitor 1817. Video amplifier 1816 is well known in the art and may be implemented by any suitable apparatus. This circuitry converts pixel data stored in video memory 1814 to a raster signal suitable for use by monitor 1817. Monitor 1817 is a type of monitor suitable for displaying graphic images.

Computer 1801 can send messages and receive data, including program code, through the network(s), network link 1821, and communication interface 1820. In the Internet example, remote server computer 1826 might transmit a requested code for an application program through Internet 1825, ISP 1824, local network 1822 and communication interface 1820. The received code may be executed by processor 1813 as it is received, and/or stored in mass storage 1812, or other non-volatile storage for later execution. In this manner, computer 1801 may obtain application code in the form of a carrier wave. Alternatively, remote server computer 1826 may execute applications using processor 1813, and utilize mass storage 1812, and/or video memory 1815. The results of the execution at server 1826 are then transmitted through Internet 1825, ISP 1824, local network 1822 and communication interface 1820. In this example, computer 1801 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. Embodiments of the present invention can be implemented in any type of computer system or programming or processing environment.

TABLE A

| Professional Group | Profession Skill Bucket | Skill 1 | Skill 2 | Skill3 | Skill 4 |
|---|---|---|---|---|---|
| Customer Service | | | | | |
| | Customer Service Customer Solutions = Tier 1 Call reason resolution | | | | |
| | | Answer product feature questions | | | |
| | | Explain rate/Pricing plans | | | |
| | | Activate new accounts | | | |
| | | Administer change requests | | | |
| | | Issue credit for billing errors = Adjust consumer accounts | | | |
| | | Establish payment arrangements within established guidelines | | | |
| | | Upsell additional products and services | | | |
| | | Carry monthly sales quotas | | | |
| | Customer Resolution | | | | |
| | | Respond to telephone inquiries | | | |
| | | | Phone support | | |
| | | | | 30-40 average calls per day | |
| | | | | 40-50 average calls per day | |
| | | | | 50-60 average calls per day | |
| | | | | 60-70 average calls per day | |
| | | | | 70-80 average calls per day | |
| | | Respond to written inquiries | | | |
| | | Chat room response support | | | |
| | | Issue research = Problem trouble shooting | | | |
| | | | Internal Departments | | |
| | | | External Vendors | | |
| | | | Field Personnel | | |
| | | | Service Delivery Departments | | |
| | | Root cause determination | | | |
| | Technical Support | | | | |
| | | Analyze Network Outages | | | |
| | | Identify Trends and Problem Areas | | | |
| | | | Troubleshoot/replicate issue | | |
| | | | Research/Identify solutions | | |
| | | | Implement or assign resolution responsibility | | |
| | | | Inform customer of resoltuion | | |
| | | Problem resolution communications to customers | | | |
| | | Pre-sale Support | | | |
| | | | Respond to information request about technical product RFP/RFI | | |
| | | | Present technology to customers | | |
| | | | Prepare cuestomer presentations | | |
| | | | Review Cost Information | | |
| | | Post-sale Support | | | |
| | | | Track New Installations = Orders | | |
| | | | Escalate as Necessary to Expidite Installation | | |
| | Call Center Strategic Placement | | | | |
| | | Insource support plan analysis | | | |
| | | Outsource support plan analysis | | | |
| | | | Domestic location research | | |
| | | | Off-shore location research | | |
| | Set Call Center Staffing Strategies = Hiring Strategies | | | | |
| | | Call Center Management | | | |
| | | Customer interacting staff | | | |
| | | Back office processing staff | | | |
| | | Operational support | | | |
| | Call Center Operations | | | | |
| | | Set call routing strategy | | | |

TABLE A-continued

```
        Conduct & Interact with complex scripting
            Customer Attributes
            Call Center Queues
        Provision call routing
        Create networking allocations and routing scripts
            Special planned closings
            Segment transition site moves
            Site openings
            Disaster recovery
        Develop & Maintain Voice Systems Documentation
            IVR Design documents
            Call flows
            Usability lab test results
            Call routing override process & procedures
            Business continuation documentation
        Perform benchmark strategies to improve consumer experience
        Monitor ongoing call allocation
        Recommend routing changes and updates
    Program Management
        Product and marketing program distribution to sales and service channels
            Coordinate with training the development of needed support documents
            Resource allocation of call center sales and service representatives
            Manage product and program compliance against standards and
regulatory requirements
            Facilitate program selection and prioritization
            "Track, measure and report on the progress of projects/programs"
        Ensure best practices procedures
            Identify best practices
            Develop and drive process improvements
                Resource optimization and pipeline management
            Establish and maintain quality and standards
            Consistently reach corporate and center objectives
        Training = Performance Enhancement programs
            Management Training
            Skills assessment
            Skills Training
            Product Training
            Curriculum Development
                Instructional Modules
                Training aid development
                    Handbooks
                    Demonstration models
                    Multi-media visual aids
                    Computer Tutorials
                    Reference Books
                "Web based, e-learning = Multi-media support"
                    Flash
                    Authorware
                    Dreamweaver
                    HTML
                Vendor Management
                Trainer certification
            Schedule Training Classes
            "Training Delivery, Facilitation"
                TTT = Train the trainer
                Classroom delivery
                    Kick-offs
                    Ice-breakers
                    De-briefs
                    Product details
                    Sales processes
            Establish Training Evaluation Criteria
                Customer feedback analysis
                Define evaluation metrics = performance requirements
                Analyze results
                Suggestion performance enhancements
                Feedback to trainers and presenters
            Adult education principals and theories
            Capacity planning
        Productvity Reporting
            Analyze Data
                Average time of outstanding issues
                Average call handling time
                Average calls handled per associte per day
                Incentive payment reporting
Finance
    Finance
        Accounting
        General Accounting
```

TABLE A-continued

```
            Revenue
                Revenue Recognition Management
                    Accrual/GAAP Compliance
                        CPFF = Cost plus fixed fee
                        T&M = Time and Material
                        CIP = Construction in Process
                        Ratably
                        Per Contract
                    Cash Method
                        Calculate Cost of Sales & Gross Margins
                        Maintain Deferred Revenue schedules
                    Order/Contract Management
                        Confirm Delivery of Service
                    Credit & Collections
                        Process credit applications and approve credit limits
                        Collect past due accounts via phone
                        Issue past due account reports to Sales & Customer Service
                    Database Management of calls and collections
                    Billing = Invoicing
                        Set-up Revenue Support Tables
                            Recognition
                            Deferred Schedules
                        Produce invoices and credit memos
                            CPFF = Cost plus fixed fee
                            T&M = Time and Material
                            CIP = Construction in Process
                        Receivables Management
                            Day Sales Outstanding = DSO
                        Research Customer payment discrepancies
                    Merchant Vendor Management
            Expenses
                Accounts Payable = Disbursements
                    Bank liaison
                        Outstanding check list management
                        Positive pay submission
                    Vendor Class Tracking
                        Employees
                        General Vendors
                        Consultants/Contractors
                            Issue 1099s
                    Payable aging analysis
                    Vendor Management = Vendor Invoice Payables
                        Reconcile Procurement Card (P-Card) Charges and review
accuracy
                        Manage corporate American Express account for accuracy
                            Verify purchase prder funds available for payments
                            Code invoives with general ledger accounts
                            Verify accurate/valid charges
                            Enter data into Accounting System
                        Expense Reports = T&E = Travel & Entertainment Expense
                            Code with general ledger accounts
                            Verify receipts
                            Enter data into accounting system
                            Establish & enforce expense reimbursement guidelines
                        Check processing
                Payroll
                    Process time cards
                    Accounting System Data entry
                    Initiate pay checks or Direct Deposit
                    Produce monthly reports supporting payroll expense & liability
accruals
                        Wages = Earnings
                            Commission Payment
                        Bonuses
                        Stock Options
                        Taxes
                            Income taxes
                            Social Security taxes
                            Unemployment
                            Workers compensation
                        Paid time off (PTO) = Vacation
                        Disability
                        Taxable & non-taxable fringe benefits
                            Other Deductions
                        Manage payroll vendor
                        Deduction reconciliation to General Ledger
                Operating Expenses
                    Marketing Expenses = Customer acquisition and retention programs
                        Direct Mail
```

TABLE A-continued

E-mail Campaigns
        Television Advertising
        Print Advertising
        Industry Events = Trade Shows
        Travel
        Office Supplies
     Sales Support
        Quarterly Sales Contest
        Travel
        Office Supplies
     G&A = Administrative = Overhead
        Legal
        Finance
        Benefits
        Travel
        Office Supplies
  Capital Expenditures
     Maintain Fixed Asset schedules and calculations
        Asset Acquisition
        Asset Depreciation
        Asset Transfers
        Asset Disposal
        Net working capital
        Add backs
     Establish and enforce Fixed Asset policies and procedures
  Balance Sheet Accounting
     Cash Receipt Management
        Prepare Daily Deposits
        Apply Cash receipts to customer accounts
     Fixed Assets
     Inventory Management
     Procurement
        Negotiate cost and contract terms
        Approve and Release Purchase Order funding
     Accounts Receivable
        Manage write-off schedules
        Forecast Bad Debt Expense
     Bank Statement Reconciliation
Corporate Accounting
  Tax Reporting and filing
     Prepare and reconcile quarterly and year-end tax reports
        Corporate Sales & Use Tax = Income Taxes
          Federal
          State
          Local
        Property Tax
        Franchise Tax
        Excise Tax
        Payroll Tax
          File Federal Unemployment tax forms = Form 940
          File Quarterly Tax return forms = Form 941 = FICA Tax Rate & Wages
          Federal
          State
          Local
        Benefit Tax = Fringe Benefit Tax
        "Support Federal, State, & Local compliance audits"
        "Review tax implications of Mergers, acquisitions, and divestments"
        Prepare deferred tax schedules
        Prepare Tax plans and present recommendations to Management
        Document policy and procedures for tax department manuals
        Forecast Tax income and liability
        "Prepare analytical studies on historical, forecast, and pro-forma tax data"
        Support Government Tax audit
        File and Maintain Business Licenses
        Intercompany Pricing Study
  Audit Management
     Select External Auditors
     Lead support of external audits
     Coordinate external audit documentation with internal departments
     Perform monthly internal audits
  External Reporting = Investor Relations
     Press Release data support
     Fact Sheet development
     Regulatory Filings
     SEC Filings
        10 - K
        10 - Q TABLE A-continued Board Presentations
   Shareholder Call/Analyst Call preparation
Financial Statement Development
   Balance Sheet Trend & Variance Analysis
   Income Statement Trend & Variance Analysis
   Cash Flow Statement Trend & Variance Analysis
   Profit & Loss Statement Trend & Variance Analysis
   Calculate earnings
   Calculate EBITDA
Compliance Management = Administrative Regulations = Regulations
   FAS = Financial Accounting Standards
   Sarbanes-Oxley = SOX
   Generally Accepted Accounting Principles = GAAP
   FAR = Federal Acquisition Regulations
   DFARS = Defense Acquisition Regulation Supplement
   CAS = Cost Accounting Standards
   TEFRA = Tax Equity Fiscal Reform Act
Equity Analysis
   Capitalization Tables
   Statement of Shareholder Equity
   Retained Earnings
   Fixed Asset Tables
   Warrants
   Earnings per Share
Treasury Management
   Cash Management
     Overnight investing
     Analyze investment alternatives
     Maintain broker relationships
     Develop short and long-term cash forecast models
     Monitor cost effectiveness of treasury functions
       Hedging
       Investments
       Bank fees
       Line of credit
     Establish signing authority and maintain appropriate documentation
   Portfolio Accounting
     Manage portfolio
       Multiple cash accounts
       Co-investments
       REIT
       Real Estate investments
     Yield Analysis
     Provide portfolio data for Financial Statements
     Debt covenant compliance
Auditing
   Lead Audit Engagement
   Scope and plan audits
   Design Test Plans
   Execute Test Plans = Execute Audit Procedures
   Identify Risks
   Document Controls
   Write Reports and Prospective Analysis
   Present Results to Management
   Perform Tax Audit
     Analyze accounting records for tax compliance
     Identify owed penalties and interest
     Prepare audit reports
     Make Sales and Use tax ordinance and regulation recommendations
   Tools
       ACL
       CAAT
Financial Planning = Capital & Operating Budget Preparation
   Prepare annual budgets and quarterly forecast
     Revenue
       Develop based on market and product line offerings
       Forecast revenue in accordance with GAAP/accrual accounting
       Forecast Cash/bookings
       Document assumptions
       Review assumptions and budget targets with functional departments
       Present budget/forecast to executive management
     Operating Expenses
       Analyze revenue and margin requirements
       Forecast expenses in accordance with GAAP/accrual accounting
       Document assumptions
       Review assumptions and budget targets with functional departments
       Present budget/forecast to executive management
     Capital Expenditures
       "Analyze revenue, expense, and margin requirements"

TABLE A-continued

Document assumptions
        Review assumptions and budget targets with functional departments
        Present budget/forecast to executive management
    Business Development
    Merger & Acquisition = Corporate Financial Analysis
      Valuation Modeling
        New Capital Markets
        Working Capital
        Liquidation Profile
        Treasury Plan
        Asset Valuation
      Due Diligence review
        On-site operations review
        Document on-site findings
      Financial Statement Analysis
        Review reporting processes and procedures
        Review supporting documentation/schedules
        Confirm industry reporting regulation compliance
      Quality of earnings analysis
    Financial Analysis
    Financial Reporting = Performance Analysis
      Actual results to Budget/Forecast/Plan Variance Analysis
      Develop cost reduction strategies
      Trend Analysis = Behavioral Reporting
        Cash burn rate
        Revenue performance
        Expense performance
        Seasonality performance analysis
          Website Analytics = Website statistics analysis
            Total and unique visitors
            Path Analysis
            Sales per visit
            Account Management
        Company specific Key Performance Indicators = KPIs
      Sales channel performance analysis
      Call Center Performance Reporting
      Present Results to Executive Management
      Contract Performance Analysis
        Ensure attainment of customer and product margins
        Schedule Delivery compliance
        Receipt and Payment Schedule analysis
      Post Mortem Campaign/Program Analysis
        Actual performance compared to Business Case assumptions
    Business Case Development
      Pricing Analysis
        Review customer Request for Proposal (RFP)
        Recommend strategic pricing initiatives
        Perform market and competitive analysis
        Develop pricing sensitivity models
        Present assumptions and risk assessment
      Programs/Campaign Analysis = Sales & Marketing programs
        Cost/benefit analysis
        Review assumptions with Marketing/Sales
        Approve campaign and programs
      Capital Expenditure Analysis
        Rate of return analysis = Return on Investment Analysis = ROI
Analysis
    Modeling
      Statistical
        Logistic regression
        Decision Tree
        Neural Network (pattern recognition)
      Tools
        ER Win
        Star
        Snowflake
    Risk Management = Financial Operations
      Design & implement processes = Establish and enforce best practices
      Process diagnosis = process improvement
      Review new proposals and assess risk
    Finance System Operations & Database Management = Data warehouse
management
      Project Management
        Requirements gathering
        Design/document workflows
        Planning system support
        Standards
          COBIT = Security & Control practices
          PMBOK = Project Management Body of Knowledge TABLE A-continued Earned Value = Measures project process in monetary terms
    Develop and support data marts
    Data Mining
    Data Analysis
      SAS
      SPSS
    Database administration/Database modeling
      Microsoft SQL Server
      Oracle
      Adabas
      DB2
      FileMaker Pro
      Informix
      Ingres
      Interbase
      Microsoft Access
      Progress
      Sybase Adaptive Server
      FirebirdSQL
      MYSQL
      PostgreSQL
    Report creation
      SQL
      Business Objects Crystal
      ReportSmith
      Access Brio
      Cognos
    Report generation
    Software support
      Epicor
      Microsoft Great Plains
      Microsoft Solomon
      Hyperion
        Essbase
      Cognos
        ognos Cube
      SAP
      Bravo = database integration software
      Khalix - budgeting a& forecasting
      Timberline = real estate & construction accounting
      Adaytum = Enterprise Performance Planning (EPP)
      Cashbook = Accounting System
      Ariba = procurement support
      Lacerte - tax preparation
      Prosystem FX = tax preparation
      ReportSmith
      Microsoft Axapta = ERP solution
      SYSPRO ERP
      Everest
      Microsoft Navision
    Desktop Computer
      Microsoft Office
        Excel
        Access
        Powerpoint
        Word
      Lotus Notes
Human Resources
  Human Resources
    Recruitment/Staffing = Talent Acquisition
      Resource planning = Organizational design = Workforce planning = Needs assessment
        Research
        Forecasting
      Analyze marketplace labor trends to determine impacts to organization
      Competency modeling
        Skills testing
      Succession planning
      Job analysis
      Employee recruitment = Pipeline development
        Advertising
        Recruiter management = External Recruiters
          Open house support
      Interviewing/Screening candidates
      "Employee selection, Pre-employment support/tracking"
        Conduct reference checks
        Conduct background checks
        Negotiate offers
        Obtain physical results

TABLE A-continued

Establish start dates  
    Immigration status checks  
    Obtain security clearance evidence  
    Process employment paperwork  
    Develop offer letter  
    Complete any required testing  
    Coordinating space planning with facilities  
  Psychometrics  
    Intelligence testing  
    Personality testing  
    Vocational testing  
  Develop workforce diversity strategy  
    Develop workforce diversity initiatives  
    Monitor performance against diversity plans  
    Develop external diversity sourcing relationships  
  Regulatory Compliance  
    Support audits  
    Labor law  
    Tax  
    Social Security regulations  
    Federal Regulation  
    State Regulations  
    Workmen's Compensation  
    Affirmative Action  
    Disabilities Act  
    Government Employment Policies  
      FMLA  
      EBO guidelines = Equal Employment Opportunity Commission  
      EEO01 - Employer Information Report  
      VETS - 100 = Federal Contractor Veterans Employment Report  
      FCC 395  
  Documentation Management  
    Applications  
    Non-Disclosure Agreements  
    Resumes  
    Performance Reviews  
  Maintain Employee Statistics  
  Develop and Maintain Employee Handbook  
    "Level of recruitment - select, do not apportion, similar to methodologies in technology"  
        "Executives = C level, VPs, Directors"  
        Professionals = mid-level  
        Campus = entry-level  
        Technical  
        Diversity  
Compensation & Benefits  
  Salary Planning  
    Merit Increase forecasting  
    Cost of living increase analysis  
  Develop and administer employee performance review process  
  Develop Bonus & Incentive plans = Incentive plans = Variable Incentive Plans  
    Sales  
    Non-Sales  
  Develop Reward and Recognition programs  
    Development  
    Implementation  
    Evaluation  
  Manage Stock grants  
  Manage relocation programs  
    "Manage external, outsource vendor"  
    Maintain policies  
  Pension Management  
  Medical Benefit Plan Administration = Healthcare Plan Administration  
    Vendor Management  
      Health  
      Life  
      Dental  
      Vision  
    Contract Negotiation  
    REP Development  
Employee & Labor Relations = Learning & Development = Employee Development  
  Relationship building = interpersonal skills  
  Counseling = Coaching Skills = Leadership coaching  
    Development models & techniques  
    Career Development = Career Management guidance  
  Evaluation Tools  
    Employee Opinion Surveys TABLE A-continued Exit strategy interviews
    Performance Management evaluation tools
  Mentoring program development
  Develop and implement employee performance plans
  Manage employee events
  Manage employee communications
    Develop communication strategy
    Write employee communications
      Own policy handbook
        Content development
        Content review
        Policy interpretation
        Policy enforcement
  Employee retention
    Termination Analysis = Turnover rate analysis
    Program development
  Organizational Development concept knowledge
  Organizational Behavior concept knowledge
HR System Operations
  Project Management
    Requirements gathering
    Design/document workflows
    Planning system support
    Standards
      COBIT = Security & Control practices
      PMBOK = Project Management Body of Knowledge
      Earned Value = Measures project process in monetary terms
    REP Development
  Data collection methods
    Paper questionnaire
    Computer Aided Personal Interview
    Computer Aided Telephone Interview
  Database modeling (point)
  Data Mining
  Data Analysis
  Database administration = System Maintenance (point)
  Report creation
    SQL
    Business Objects Crystal
    ReportSmith
  Report generation
  Software support
    Hiresystems
    Oracle HRIS
    Webi
    Application Tracking System Integration
      Brass Ring
      Taleo
      "Alexus 5, by Alexus International"
      "Brassring Enterprise, by BrassRing Systems, Inc."
      "E*TRACK System, by Virtual Edge, Inc."
      "HireEnterprise, by Hire.com"
      "Hiring Gateway, by Yahoo! Resumix"
      "HodesIQ, by Bernard Hodes Group"
      "HRSmart, by HRSmart"
      "IRecruiter, by iCIMS"
      "Kenexa Recruiter, by Kenexa"
      Lawson
      "Peopleclick XG, by Peopleclick"
      PeopleSoft
      "Recruiting Solutions, by Peoplesoft"
            "Recruitmax, by Recruitmax"
      "Recruitsoft Enterprise Staffing Solution, by Recruitsoft"
      "Webhire Recruiter, by Webhire"
Change Management
  Change readiness assessment
  Assessing organizational risks
  Formulating leadership strategies
  Guide change strategies within functional areas
  Develop communication strategies
  Culture assessment/alignment
  Change acceleration programs
  Measure and report results
Presentation
  Management
  New Hire groups
Asset Management = Site Location
  Market Analysis
    Labor cost TABLE A-continued Available labor pool
    Employment legislation
    Real Estate Management
      Building/Lease contract negotiations
      Space Management
    Facilities Management
  Budget Management
    Recruitment activities
    Training
    Benefits
    Employee Programs
    Labor cost by Department (cost per head)
      Salary
      Fringe Benefits
    Overall
  Training = Performance Enhancement programs
    Management Training
    Skills assessment
    Skills Training
    Product Training
    Curriculum Development
      Instructional Modules
      Training aid development
        Handbooks
        Demonstration models
        Multi-media visual aids
        Computer Tutorials
        Reference Books
      "Web based, e-learning = Multi-media support"
        Flash
        Authorware
        Dreamweaver
        HTML
      Vendor Management
      Trainer certification
    Schedule Training Classes
    "Training Delivery, Facilitation"
      TTT = Train the trainer
      Classroom delivery
    Establish Training Evaluation Criteria
      Customer feedback analysis
      Define evaluation metrics = performance requirements
      Analyze results
      Suggestion performance enhancements
      Feedback to trainers and presenters
    Adult education principals and theories
    Capacity planning
Office Management
  Office Management
    General Administration
      Answering Phones
        Routing Calls
        Taking messages
        Back-up receptionist support
      Receiving and distributing mail and deliveries
      Greeting Visitors
      Copying
      Faxing
      Ordering Office Supplies
      Proof reading documents
      Filter and prioritize department request
      Maintain department contact list
    Space planning
      Coordinate moves
      Assign workstations
    Presentation development
      Prepare/build in Powerpoint
      Distribute as needed
    Documentation support
      Maintaining Correspondence
        Forms
        Letters
        Spreadsheets
      Maintain Documentation archive
        Hard copy
        Online Database Management
    Human Resources Support
      Tracking employee attendance and vacation
      Submit Payroll TABLE A-continued

```
    Prepare for new hire start
        Order required equipment
        Identify space
        Set-up phone
        Obtain required system access
    Asset collection from former employees
Accounting Support
    Order/Data entry
    Generate invoices
    Create Purchase Order request
    Manage budget
    Track Accounts Receivable
    Track Accounts Payable
        Code Invoices
        Review invoices for accuracy
        Obtain proper invoice payment approvals
        Process invoices for payment
    Department Asset Inventory Management
Business Travel
    Make arrangements
    Prepare travel and expense reports
Office Management
    Ensuring office is OSHA compliant
        Kitchen
        Conference Rooms
    Manage facilities vendors
        Cleaning
        Security
        Utilities
    Maintain Office Equipment
Calendar Management
    Schedule internal meetings
    Schedule Interviews
    Schedule other external appointments
    Coordinate site work
Meeting Coordination
    Ensure conference room includes appropriate equipment
    Provide beverages
    Coordinate food when appropriate
    Obtain call-in numbers for conference calls
    Document meeting follow-up and actions
Event Support
    Plan Employee Events
    Plan conferences
    Plan conventions
    Manage Vendors
    Project Manage event
Training Support
    Research course availability
    Arrange courses
Desktop Computer Skills
    Microsoft
        Outlook
        Word
        Excel
        Powerpoint
        Access
    QuickBooks
Items handled outside of apportionment
Level Support
    "CEO/President,"
    "COO, CFO, Executive Vice President"
    Functional Group Head
        Functional Group Staff
    Functional Area
        Executive Offices
        Sales
        Marketing
        Finance
        HR
        Engineering
Technology
    Technology
        Profession = Software Engineering
        Project Leader = Project Management in the Software Engineering profession?
        Development Methodologies (Need to determine best location for this subject)
            CMMI
            Extreme Programming
            Six Sigma
```

TABLE A-continued

ISO 900
Waterfall
RAD—Rapid application development
JAD—Joint application development
Project Planning = Systems Business Analysis
  Buy versus build analysis
  Risk assessment
  Cost benefit analysis
    CASE Tools
  Write business proposals
Project Management
  Develop Project Roadmap = Develop Milestones
    Microsoft One Note
    Microsoft Project
    Quick Books
    SureTrak
    Act!
  Manage Project Roadmap = Manage Milestones
  Requirements Gathering and Analysis
  Translate concepts into functional requirements
  Write technical requirements
    Develop and maintain training manuals
    Write procedure manauls
    Write software simulations
    Develop Use Cases
  Systems Design
    Develop Workflow/Business rule development
    System Interaction Analysis
    Establish System Configuration
    Establish System Performance
    Design Documentation
      System Diagrams
        CASE Tools
      Installation Guidelines
        CASE Tools
      System Builds
        CASE Tools
    Determine Security Needs
      Conduct security audits and risk analysis
        Application level vulnerability testing
        Analyze security logs and respond to incidents
      Security code reviews
      Recommend and enforce security directives
      Discover unexpected threat scenarios
      Integrate and manage information security technology
    Design Application Framework
    Database Design = Database Architecture
      Data Modeling
        Erwin
        Oracle Design
      Data Warehousing
        "Extract, Transform, Load (ETL)"
        Star Schema
        On-line Analytical Processing (OLAP)
          Microstrategy
      Relational Database
        Microsoft SQL Server
        Oracle
        Adabas
        DB2
        FileMaker Pro
        Informix
        Ingres
        Interbase
        Microsoft Access
        Progress
        Sybase Adaptive Server
        FirebirdSQL
        MYSQL
        PostgreSQL
      Hierarchical Database
        IMS
      OOD = Object Oriented Database Management Systems
        ObjectStore
        Versant
      Embedded Database
        Berkeley DB
        HSQLDB TABLE A-continued Development/Implementation
  Programming Language
    Object Oriented Programming Language
      C++
      Small Talk
      Imaging Expression
      C #
      J #
      VB.Net
      Java
        J2SE
          JDBC
          Swing
          Java Beans
        J2ME
        J2EE
          JSP
          Servlets
          JMS
          EJB
    C
    PHP
    Visual Basic
    HTML
      DHTML
      XHTML
    XML
      XPath
      XSD—XML Schema Definition
      XSLT
    Active X
      ADO
    Python
    Fortran
    Cobol
    SQR
    EXLT
    Bash
  Scripting Language
    Shell
    Perl
    REXX
    OWK
    Java Script
  RPG
  ABAP
  Tools
    FileNET
    PowerBuilder
    DataFlex
    Tasking M16C
    Intel
    Agile
Database Development = Production Database (?)
  Relational Database
    Microsoft SQL Server
    Oracle
    Adabas
    DB2
    FileMaker Pro
    Informix
    Ingres
    Interbase
    Microsoft Access
    Progress
    Sybase Adaptive Server
    FirebirdSQL
    MYSQL
    PostgreSQL
  Hierarchical Database
    IMS
  OOD = Object Oriented Database Management Systems
    ObjectStore
    Versant
  Embedded Database
    Berkeley DB
    HSQLDB
OS = Operating System
  Unix TABLE A-continued AIX
A/UX
ArchBSD
BSD/OS
Coherent
Darwin
Digital Unix
ESIX
FreeBSD
Helios
Interactive Unix
LynxOS
MachTen
Minix
NetBSD
QNX
Reliant Unix
SINIX
SunOS
Topix
Ultrix
Unixware/Univel
Linux
MAC OSX
Solaris
MAC OS
  MAC OSX
Netware
Sun
  Solaris
MVS—Multiple Virtual Storage
Windows
  2000
  2003
  XP
  NT
  98
Novell
VMS
VAX
  AS-400
Networks
  Hardware
    Routers
      Cisco ICM
      Cisco 7500
      Cisco 7200
      Cisco 3700
      Cisco 3600
      Cisco 2600
      Cisco 2500
      Avaya
    Switches
      Cisco ICM
      Cisco Catalyst 5000
      Cisco Catalyst 6500
      Cisco Catalyst 6000
      Cisco Catalyst 5500
      Cisco Catalyst 4000
      Cisco Catalyst 3500
      Cisco Catalyst 2900
      Cisco Catalyst 3548
      Spanning Tree
      Avaya
    Gateways
    Bridges
    Servers
      Remote Access Servers
      Terminal Servers
      Domain Servers
      Application and Device servers
        Windows 2003
          Citrix MetaFrame
          Exchange 2003
        Web server
    Hubs
      Cisco
      Avaya
    NIC TABLE A-continued

```
      Cisco
      Avaya
      Ethernet Boards
   CSU/DSU
   Printers
   Environments
      LAN
         Ethernet
         Token Ring
         WiFi
         SAN (?)
         802.11
         NAT—Network Address Translation (?)
         Netware 6 (Novell LAN OS)
         VLAN = Virtual Local Area Network
      WAN
         T1
         T3
         WiMAX
         FDDI
         OC3
         OC12
         OC48
         Sonet
         ISDN
         DSL
         Docsis
         FrameRelay
         SAN
      CAN
      VPN
         PPTP—Point-to-Point Tunneling Protocol
      HAN
   Client/Server = Computer Networks
         MS Windows NT
         MS Windows 2000
         SQL-7
         IIS Server
         Windows XP
         Oracle
         NFS = Network File System
      Telecommunications = Telephony
         Data
         Voice
         Video Conferencing
         PBX
         IP PBX
         Unified messaging
         Polycom
         IP Video conferencing
         Frame Relay
         ISDN
         DS3
         VoIP
         Signaling Protocols
            SIP = Session Initiated Protocol
            H.323
            MGCP
            NCS
            TGCP SIP
            SIP-T
            ISTP
            CMSS
         Signaling interoperable
            SS7
            BRI = Basic Rate Interface
         Voice codec
            G.711
            G.729
         Video conferencing
         Video streaming
      Echelon = LonWorks networks
      Network Protocols
         Internet Protocols
            TCP/IP
            UDP/IP
            IP multicast
            IPSec = Internet Protocol Security
            ARP
```

TABLE A-continued

DNS
    SNMP
    SMTP = Simple Mail Transfer Protocol
    ESTMP = Extended Simple Mail Transfer Protocol
    ICMP
    IPv6
    IPSEC
    HTTP
    SSL
    FTP
    PPP—Point-to-point protocol
    SDLC = Synchronous data link control
    HDLC = High-level data link control
    H.323
    POP3 = Post Office Protocol 3
  IP Routing Protocol
    OSPF
    RIP = Routing Information Protocol
    RIP2
    ODR
    EIGRP = Enhanced Interior Gateway Routing Protocol
    IGRP = Internet Gateway Routing Protocol
    BGP = Border Gateway Protocol
  ATM = Asynchronous Transfer Mode
  IPX = Internetwork Packet eXchange
  DHCP = Dynamic Host Configuration Protocol
  MGCP = Media Gateway Control Protocol
  LDAP = Lightweight Directory Access Protocol
  NNTP = Network News Transfer Protocol
  OSI Model
  EIGRP
  WINS
  MPLS
  AppleTalk
  LocalTalk
  HSRP = Hot Standby Router Protocol
  IPX
  NetBeui
  WAP—Wireless Application Protocols
    Bluetooth
  PCI
  PCI-X
  Samba
  TLS—Transport Layer Security
Network Management Software
  Firewalls
    Enterprise
    Home
    Cisco PIX
    HP Openview
    Checkpoint
    Nokia
  IBM Tivoli
  Lucent VitalSuite
  CA Unicenter
  Concord Communications eHealth
Security
  PKI—Public Key Infrastructure
  Windows 2000
Application Framework
  .NET
    ADO.NET
    ASP.NET
    .NET Compac framework
  J2EE
    Weblogic (?) = BEA Weblogic
Testing = Quality Assurance = Integration Testing
  Test Plan Development
  Test script creation
    Win Runner
    JUnit
    Load Runner
    Test Director
  Execute certification Test = System Testing
  Load Testing
    Load Runner
  Regression Testing
Implementation = Deployment
  Installation

TABLE A-continued

Configuring
   System checks in production
Operations Management
   System Maintenance = System Administration
   Performance Measurement/Monitoring
   System Backup
   System Recovery
   Capacity Planning
   Enterprise Resource Planning
   Load Balancing
   Database Administration
     Installation
     Configuration
     Data loading
     Data replication practices
     Data distribution
     RDBMS backup & recovery
     Connectivity
       ODBC = Open database connectivity
       JDBC = Java database connectivity
User Interface Design = UI Design = UI Designer
   Conceptual Design
   Information Architecture = Site Architecture
     Site Map development
     Page Flow development
   Wireframe development
     Visio
   Style sheet development
     CSS—Cascading Style Sheet
       CSS1—Cascading Style Sheet Level 1
       CSS2—Cascading Style Sheet Level 2
   Should we point to programming languages from here as well?)
   Visual Design
     PageMaker
     Illustrator
     Flash
     Macromedia - Fireworks
     Cold Fusion
     Macromedia DreamWeaver
     Photoshop
     Fireworks
     Visual Studio (here or in development?)
     VSS = Visual Source Safe (placement?)
   Content Management (placement?)
     MCMS = Microsoft Content Management Server
     Interwoven
     Documentum
     Plumtree
     BEA Weblogic(?)
Help Desk Support
   Networks (point to network section)
   Work stations
   OS (point to OS section)
   Applications
     MS Windows
     MS Office
     Lotus Notes
   Proprietary Software
   Personal Communication Devices
     PDAs
     Cell Phones
   Schedule Office moves
   Phone Support
     30-40 average calls per day
     40-50 average calls per day
     50-60 average calls per day
     60-70 average calls per day
     70-80 average calls per day
   Procurement
     Hardware
     Software
     Wireless Equipment
   Servers
     RAS—Remote Access Server
     SMS—Systems Management Server
   Vendor negotiations
Systems Operation
   Project Management (Point)
   Database Design = Database Architecture (Point)

TABLE A-continued

Development (Database Development & Programming Languages)
    Implement code
    Testing (Point?)
    Document Business processes
    Database Administration (Point)
      Querying
        Access Brio
        Cognos
        Business Objects
    Report Creation
      SQL
      Crystal
    Report Generation
    Data Analysis
      SPSS
      SAS
    System Support
      Finance & Accounting
        Epicon
        Great Plains
        Solomon
        Hperion
        Cognos
      Human Resources
        Kronos
        IVIS
        Paychex
      Applicant Tracking Systems
        Brass Ring
        Taleo
        "Alexus 5, by Alexus International"
        "Brassring Enterprise, by BrassRing Systems, Inc."
        "E*TRACK System, by Virtual Edge, Inc."
        "HireEnterprise, by Hire.com"
        "Hiring Gateway, by Yahoo! Resumix"
        "HodesIQ, by Bernard Hodes Group"
        "HRSmart, by HRSmart"
        "IRecruiter, by iCIMS"
        "Kenexa Recruiter, by Kenexa"
        "Peopleclick XG, by Peopleclick"
        "Recruiting Solutions, by Peoplesoft"
        "Recruitmax, by Recruitmax"
        "Recruitsoft Enterprise Staffing Solution, by Recruitsoft"
        "Webhire Recruiter, by Webhire"
      Sales & Marketing
        Saleforce.com
      CRM
        Siebel
        PeopleSoft
Network Engineering
Network Design/Architecture = Network Topologies
    Documentation
      Diagrams
      Standard operating procedures = SOP
      Work instructions
    Upgrade and replacement analysis
    Network System Design
      Capacity planning
      Create detailed designs
      Multi-vendor & multi-protocol internet working design experience
      Carrier class environment
      Attend technical planning and review meetings with project team
      Network design
        Schematics
        Site/equipment
        Configurations
        Service spreadsheet tables
        Technical overview write-ups
        Cost optimization studies
        Circuit layout record = CLR
        Design layout record = DLR
        Review policies and procedures and recommend improvements
      Improve performance and sustainability of network designs
      Track project activities
      Technical review of maintenance activities
        Responsible for integrity of site architecture
        Ensure virtual team is knowledgeable of client site configuration and applications
        Integrate product portfolio with third party hardware and software TABLE A-continued

```
    Control costs
Network Development
  Environments
    LAN
      Ethernet
      Token Ring
      WiFi
      SAN
      802.11
      NAT = Network Address Translation
      Netware 6 (Novell LAN OS)
      VLAN = Virtual Local Area Network
    WAN
      T1
      T3
      WiMAX
      FDDI
      OC3
      OC12
      OC48
      Sonet
      ISDN
      DSL
      Docsis
      FrameRelay
      SAN
    CAN
    VPN
      PPTP—Point-to-Point Tunneling Protocol
    HAN
    Client/Server = Computer Networks
      MS Windows NT
      MS Windows 2000
      SQL-7
      IIS Server
      Windows XP
      Oracle
    Global Networks
    Telecommunications = Telephony
      Data
      Voice
      Video Conferencing
      BX
      PBX
      IP PBX
      IVR Systems
      Unified messaging
      Polycom
      IP Video conferencing
      Frame Relay
      ISDN
      DS3
      VoIP
        Signaling Protocols
          SIP = Session Initiated Protocol
          H.323
          MGCP
          NCS
          TGCP SIP
          SIP-T
          ISTP
          CMSS
        Signaling interoperable
          SS7
          BRI = Basic Rate Interface
        Voice codec
          G.711
          G.729
        Video streaming
    Echelon = LonWorks networks
Network Installation and Integration
  Hardware Installation
    Routers
      Cisco ICM
      Cisco 7500
      Cisco 7200
      Cisco 3700
      Cisco 3600
      Cisco 2600
```

TABLE A-continued

```
    Cisco 2500
    Avaya
  Switches
    Cisco ICM
    Cisco Catalyst 5000
    Cisco Catalyst 6500
    Cisco Catalyst 6000
    Cisco Catalyst 5500
    Cisco Catalyst 4000
    Cisco Catalyst 3500
    Cisco Catalyst 2900
    Cisco Catalyst 3548
    Spanning Tree
    Avaya
  Gateways
  Bridges
  Servers
    Remote Access Servers
    Terminal Servers
    Domain Servers
    Application and Device servers
        Windows 2003
          Citrix MetaFrame
          Exchange 2003
      Web server
  Hubs
    Cisco
    Avaya
  NIC
    Cisco
    Avaya
    Ethernet Boards
  CSU/DSU
  Multiplexers
    Asynchronous/SONET
    T1
    DS1
    DS3
    E1
  Digtal loop carrier
    SLC 96
    Series 05
    Litespan
    FTTP
  Printers
Network Protocols = Configuration
  Internet Protocols
    TCP/IP
    UDP/IP
    IP multicast
    IPSec = Internet Protocol Security
    ARP
    DNS
    SNMP
    SMTP = Simple Mail Transfer Protocol
    ESTMP = Extended Simple Mail Transfer Protocol
    ICMP
    IPv6
    IPSEC
    HTTP
    SSL
    FTP
    PPP = Point-to-point protocol
    SDLC = Synchronous data link control
    HDLC = High-level data link control
    H.323
    POP3 = Post Office Protocol 3
  IP Routing Protocol
    OSPF
    RIP = Routing Information Protocol
    RIP2
    ODR
    EIGRP = Enhanced Interior Gateway Routing Protocol
    IGRP = Internet Gateway Routing Protocol
    BGP = Border Gateway Protocol
  Telecommunications Transport Standards
    B82s
    AMI
    STS-1
```

TABLE A-continued

```
         T-1
         T-3
         OC-N
         TR008
         TR303
         D4
         2B1O
         BRI
         PRI
         ESF
         SF
         Uni-directional rings
         Bi-directional rings
      Mixing Equipment
         D4
         M13
         IDLC
      ATM = Asynchronous Transfer Mode
      IPX = Internetwork Packet eXchange
      DHCP = Dynamic Host Configuration Protocol
      MGCP = Media Gateway Control Protocol
      LDAP = Lightweight Directory Access Protocol
      NNTP = Network News Transfer Protocol
      OSI Model
      EIGRP
      WINS
      MPLS
      AppleTalk
      LocalTalk
      HSRP = Hot Standby Router Protocol
      IPX
      NetBeui
      WAP = Wireless Application Protocols
         Bluetooth
      PCI
      PCI-X
      Samba
      TLS = Transport Layer Security
   Scripting Languages
      PERL
      Shell
      Python
   Network Management Software
      Firewalls
         Enterprise
         Home
         Cisco PIX
         HP Openview
         Checkpoint
         Nokia
      IBM Tivoli
      Lucent VitalSuite
      CA Unicenter
      Concord Communications eHealth
Security
   Develop network intrusion detection system
      System Watch
      Alert Console
      Security Agent
   Implement network intrusion detection system
      Anomoly identification
      Threat mitigation
   PKI = Public Key Infrastructure
   Windows 2000
Testing
   Proof of concept
   Performance testing
   Management tools
      NetScout
   Diagnostic tools
   Certify production ready
   Troubleshooting
      Build complex test labs
      Execute test plans
   Develip in depth test procedures and concepts
Network Maintenance
   Anti-virus programs
   Monitoring
   Load balancing
```

TABLE A-continued

```
        Cisco CSS
        Radware WSD
      Replication Solutions
      Web caching
      Transaction monitoring
      Network compression
      Automatic failover
      Traffic management
      Network surveillance
      Issue triaging
      Circuit testing and repair
      Router configuration management
      Hardware replacement
    Network Administration
      Domain name registration
      IP address assignment
      Log monitoring
      DNS Administration
      Infrastructure port assignment and patching
      Racking hardware
      Manage system back-up
      Network recovery
      Redundant network connectivity and operation
      Add and delete users
    Customer Service = CS
      Open trouble tickets
      Track trouble tickets
        Resolve trouble tickets
        Collect & evaluate customer requirements
        Implement customer rule sets within requirements
        Accept new customer sites
        Decommission customer sites
      Act as a point of escalation for customer
      Maintain regular client communication
        Lead technical customer meetings
    Project Management
      Develop Project Roadmap = Develop Milestones
        Microsoft One Note
        Microsoft Project
        Quick Books
        SureTrak
        Act!
      Manage Project Roadmap = Manage Milestones
      Requirements Gathering and Analysis
      Translate concepts into functional requirements
      Write technical requirements
      Develop use cases
    Telecommunications Engineer
      Network Access Designs
        Traditional Land Lines
        DSL
        VOIP
        Wireless
        Internet
        Interactive Voice Response = IVR
          Voice Recording
      Concept
        Proof-of-Concept
        Prototype
      Build Telecom Networks
        Network Protocols and Technologies = Routing Protocols = Fiber Optic
Transport Systems
        Physical Media = Hardware = Devices = Encoding
          ISDN
          PDH
            T-carrier
          RS-232
          SDH
          SONET
        Data Link Layer = Data Transfer
          ARP
          Ethernet
          FDDI
          HDLC
          PPP
          Token Ring
        Network Layer = Router = Flow Control = Segementation
          X.25
          Frame relay
```

TABLE A-continued

```
ATM
MPLS
Signalling System 7 = SS7 = C7 = CCIS7
ICMP
IP
  IPv4
  IPv6
IPX
Routing Protocols
  EGP
  BGP
  EIGRP
  IGRP
  IS-IS
  RIP
  OSPF
Transport Layer = Data Transfer to End Users
  SPX
  TCP
  UDP
  SCTP
  RTP
Presentation Layer = Delivery = Formatting of Application
  HTTP/HTML
  ASN.1
  XML
  TDI
  SNMP
  FTP
  Telnet
  SMTP
Application Services
  TCP/IP
  SIP
  FTP
  HTTP
  SNMP
  SMTP
  Telnet
  XMPP
    Jabber
Programming Languages
  JAVA
  J2EE
  C
  C#
  C++
  XML/XSL
  HTML
  VB.NET
Vendor Systems
  Avaya
    PBX
    Definity
    G3R
    Multi-Vantage
    Genesys CTI
    Intuity
    Switching
    Telephone Equipment
  AT&T
    Route-It
    VPN
      Network Based
      Premise Based
    VoIP
  Cisco
    Call Manager
    Unity
    Conferenceing/Meetingplace
    ICM Routing & Sorting
    Switches
    LAN/WAN
  Aspect
    Uniphi Suite
    IVR
    Call Center
      PSTN
      IP
```

TABLE A-continued

```
    Nortel
      PBX
        Meridian
        Norstar
      Switching
      VoIP
    Lucent
      VoIP
      Optical Networking
    NEC
      Aspire
      Electra Elite IPK
      DS1000/2000
      Infoset408
      i-Series
      IP-PBX
      Switch/Router
    Toshiba
      Strata
      IVR
      Voice Processing
    Fujitsu
      Mobile/Wireless Networks
      Switching
      Routers
    Vodavi
      Starplus
    SiemensAG
      Rolm
    Mitel
      Telephones
      Peripherals
    Ericsson
      Mobile Core Products
    Panasonic
      Telephones
    Asterisk
      PBX
  Commercial Telephony Interfaces
    Dialogic
    Aculab
    Pika Technologies
    MCI
      ACES
      ICON
      MECCA
      F&E
      SiteVu
      INM
      Tarantella
Installations = Implementation
  Equipment Configuration
  Card and/or Port Requirements
  Power
  Cabling
  Floor Space
  Rack Placement
Testing
  Evaluation
    Product Verification
    Build Complex Test Labs
  Remote Circuit Testing Equipment
    Digital Lightwave
    Eastern Research
    Acterna
Maintenance
  Enhancement Coordination
    Large Scale Moves
    System Upgrades
    Installations = Implementation
      Equipment Configuration
      Card and/or Port Requirements
      Power
      Cabling
      Floor Space
      Rack Placement
  Internal Client Services
    Open Trouble Tickets
    Track Trouble Tickets
```

TABLE A-continued

```
            Take Tickets to Resolution
            Troubleshooting Tools
               Vendor Specific Solutions
               Log Files
               Home Grown Scripted Solutions
            Security Techniques
               Intrusion Detection
               Anomaly Identification
               Threat Mitigation
               Corporate Security Standards
         Project Management
            Develop Project Roadmap = Develop Milestones
            Manage Project Roadmap = Manage Milestones
            Requirements Gathering and Analysis
            Translate concepts into functional requirements
            Write Technical Requirements
            Develop Use Cases
            Budget Responsibility
Sales
   Sales
      Prospecting = New Business
         Business (B2B) = Commerical Accounts
         Consumer (B2C)
         Global Accounts
         Government (B2G)
         Non-profit
         Hospitals
         Resellers
      Sales Type
         Lead Generation
         Presales
         "Inside = TeleSale, TeleMarketing, Call Center Sales"
         "Direct = Outside, National Accounts"
         Inbound
         Business Development
      Sales Cycle
         "Transactional sales - Short sales cycle = High volume, low price"
         "Consultative - Complex sales, longer sales cycle"
      Annual Quota
         $100K
         $200K
         $250K
         $300K
         $400K
         $500K
         $750K
         $1M
         $2M
         $3M
      Quota Attainment
         90%
         95%
         100%
         105%
         110%
         115%+
      Account Management = Existing Customers
         Maintain client relationship/satisfaction
            Obtain product feedback
            Resolve customer/product issues
         Renew current product/service
            Monthly revenue/bookings quota
            Monthly contract renewal units quota
      Presentations
         Large groups
         C Level Executives
         "Executives = VPs, Directors"
         Purchasing = Procurement
      Contract Management
         Proposal preparation
         On-going management of customer contractual agreements
      Territory Management = Pipeline Management
         Sales Forecasting = pipeline forecast
         Business Plan Development = Strategic plan development
         Prepare Account Status Reports
      Manage Customer Account Team
         Sales
         Service
         Technical support
```

TABLE A-continued

Training = Performance Enhancement programs
  Needs Assessments
  Define Program Objectives
  Curriculum Development
    Instructional Modules = Instructor's guide
    Participant's guide
    Case Studies
    Exercises
    Presentations
    Training aid development
      Handbooks
      Demonstration models
      Multi-media visual aids
      Computer Tutorials
      Reference Books
    "Web based, e-learning = Multi-media support"
      Flash
      Authorware
      Dreamweaver
      HTML
    Vendor Management
    Trainer certification
  Schedule Training Classes
  "Training Delivery, Facilitation"
    Classroom delivery
      Kick-offs
      Ice-breakers
      De-briefs
      Product details
      Sales processes
    Online Delivery
    TTT = Train the trainer
  Establish Training Evaluation Criteria
    Customer feedback analysis
    Define evaluation metrics = performance requirements
    Analyze results
    Suggestion performance enhancements
    Feedback to trainers and presenters
  Adult education principals and theories
  Capacity planning

TABLE B

Technology Taxonomy Layout
  Profession = Software Engineering
  Project Leader = Project Management in the Software Engineering profession?
  Development Methodologies (Need to determine best location for this subject)
    CMMI
    Extreme Programming
    Six Sigma
    ISO 900
    Waterfall
    RAD—Rapid application development
    JAD—Joint application development
  Project Planning = Systems Business Analysis
    Buy versus build analysis
    Risk assessment
    Cost benefit analysis
      CASE Tools
    Write business proposals
  Project Management
    Develop Project Roadmap = Develop Milestones
      Microsoft One Note
      Microsoft Project
      Quick Books
      SureTrak
      Act!
    Manage Project Roadmap = Manage Milestones
    Requirements Gathering and Analysis
    Translate concepts into functional requirements
    Write technical requirements
      Develop and maintain training manuals
      Write procedure manauls TABLE B-continued Write software simulations
    Develop Use Cases
  Systems Design
    Develop Workflow/Business rule development
    System Interaction Analysis
    Establish System Configuration
    Establish System Performance
    Design Documentation
      System Diagrams
        CASE Tools
      Installation Guidelines
        CASE Tools
      System Builds
        CASE Tools
    Determine Security Needs
      Conduct security audits and risk analysis
        Application level vulnerability testing
        Analyze security logs and respond to incidents
      Security code reviews
      Recommend and enforce security directives
      Discover unexpected threat scenarios
      Integrate and manage information security technology
    Design Application Framework
    Database Design = Database Architecture
      Data Modeling
        Erwin
        Oracle Design
      Data Warehousing
        "Extract, Transform, Load (ETL)"
        Star Schema
        On-line Analytical Processing (OLAP)
          Microstrategy

TABLE B-continued

Relational Database
        Microsoft SQL Server
        Oracle
        Adabas
        DB2
        FileMaker Pro
        Informix
        Ingres
        Interbase
        Microsoft Access
        Progress
        Sybase Adaptive Server
        FirebirdSQL
        MYSQL
        PostgreSQL
    Hierarchical Database
        IMS
    OOD = Object Oriented Database Management Systems
        ObjectStore
        Versant
    Embedded Database
        Berkeley DB
        HSQLDB
Development/Implementation
    Programming Language
        Object Oriented Programming Language
            C++
            Small Talk
            Imaging Expression
            C #
            J #
            VB.Net
            Java
                J2SE
                    JDBC
                    Swing
                    Java Beans
                J2ME
                J2EE
                    JSP
                    Servlets
                    JMS
                    EJB
            C
            PHP
            Visual Basic
            HTML
                DHTML
                XHTML
            XML
                XPath
                XSD—XML Schema Definition
                XSLT
            Active X
                ADO
            Python
            Fortran
            Cobol
            SQR
            EXLT
            Bash
        Scripting Language
            Shell
            Perl
            REXX
            OWK
            Java Script
        RPG
        ABAP
    Tools
        FileNET
        PowerBuilder
        DataFlex
        Tasking M16C
        Intel
        Agile
Database Development = Production Database (?)
    Relational Database
        Microsoft SQL Server
        Oracle
        Adabas
        DB2
        FileMaker Pro
        Informix
        Ingres
        Interbase
        Microsoft Access
        Progress
        Sybase Adaptive Server
        FirebirdSQL
        MYSQL
        PostgreSQL
    Hierarchical Database
        IMS
    OOD = Object Oriented Database Management Systems
        ObjectStore
        Versant
    Embedded Database
        Berkeley DB
        HSQLDB
OS = Operating System
    Unix
        AIX
        A/UX
        ArchBSD
        BSD/OS
        Coherent
        Darwin
        Digital Unix
        ESIX
        FreeBSD
        Helios
        Interactive Unix
        LynxOS
        MachTen
        Minix
        NetBSD
        QNX
        Reliant Unix
        SINIX
        SunOS
        Topix
        Ultrix
        Unixware/Univel
        Linux
        MAC OSX
        Solaris
    MAC OS
        MAC OSX
    Netware
    Sun
        Solaris
    MVS—Multiple Virtual Storage
    Windows
        2000
        2003
        XP
        NT
        98
    Novell
    VMS
    VAX
    AS-400
Networks
    Hardware
        Routers
            Cisco ICM
            Cisco 7500
            Cisco 7200
            Cisco 3700
            Cisco 3600
            Cisco 2600
            Cisco 2500
            Avaya
        Switches
            Cisco ICM
            Cisco Catalyst 5000
            Cisco Catalyst 6500

TABLE B-continued

Cisco Catalyst 6000
Cisco Catalyst 5500
Cisco Catalyst 4000
Cisco Catalyst 3500
Cisco Catalyst 2900
Cisco Catalyst 3548
Spanning Tree
Avaya
Gateways
Bridges
Servers
  Remote Access Servers
  Terminal Servers
  Domain Servers
  Application and Device servers
    Windows 2003
    Citrix MetaFrame
    Exchange 2003
    Web server
Hubs
  Cisco
  Avaya
NIC
  Cisco
  Avaya
  Ethernet Boards
CSU/DSU
Printers
Environments
  LAN
    Ethernet
    Token Ring
    WiFi
    SAN (?)
    802.11
    NAT—Network Address Translation (?)
    Netware 6 (Novell LAN OS)
    VLAN = Virtual Local Area Network
  WAN
    T1
    T3
    WiMAX
    FDDI
    OC3
    OC12
    OC48
    Sonet
    ISDN
    DSL
    Docsis
    FrameRelay
    SAN
  CAN
  VPN
    PPTP—Point-to-Point Tunneling Protocol
  HAN
Client/Server = Computer Networks
  MS Windows NT
  MS Windows 2000
  SQL-7
  IIS Server
  Windows XP
  Oracle
  NFS = Network File System
  Telecommunications = Telephony
    Data
    Voice
    Video Conferencing
    PBX
    IP PBX
    Unified messaging
    Polycom
    IP Video conferencing
    Frame Relay
    ISDN
    DS3
    VoIP
    Signaling Protocols
      SIP = Session Initiated Protocol
      H.323
      MGCP
      NCS
      TGCP SIP
      SIP-T
      ISTP
      CMSS
    Signaling interoperable
      SS7
      BRI = Basic Rate Interface
    Voice codec
      G.711
      G.729
    Video conferencing
    Video streaming
Echelon = LonWorks networks
Network Protocols
  Internet Protocols
    TCP/IP
    UDP/IP
    IP multicast
    IPSec = Internet Protocol Security
    ARP
    DNS
    SNMP
    SMTP = Simple Mail Transfer Protocol
    ESTMP = Extended Simple Mail Transfer Protocol
    ICMP
    IPv6
    IPSEC
    HTTP
    SSL
    FTP
    PPP—Point-to-point protocol
    SDLC = Synchronous data link control
    HDLC = High-level data link control
    H.323
    POP3 = Post Office Protocol 3
  IP Routing Protocol
    OSPF
    RIP = Routing Information Protocol
    RIP2
    ODR
    EIGRP = Enhanced Interior Gateway Routing Protocol
    IGRP = Internet Gateway Routing Protocol
    BGP = Border Gateway Protocol
  ATM = Asynchronous Transfer Mode
  IPX = Internetwork Packet eXchange
  DHCP = Dynamic Host Configuration Protocol
  MGCP = Media Gateway Control Protocol
  LDAP = Lightweight Directory Access Protocol
  NNTP = Network News Transfer Protocol
  OSI Model
  EIGRP
  WINS
  MPLS
  AppleTalk
  LocalTalk
  HSRP = Hot Standby Router Protocol
  IPX
  NetBeui
  WAP—Wireless Application Protocols
    Bluetooth
  PCI
  PCI-X
  Samba
  TLS—Transport Layer Security
Network Management Software
  Firewalls
    Enterprise
    Home
    Cisco PIX
  HP Openview
  Checkpoint
  Nokia
  IBM Tivoli
  Lucent VitalSuite
  CA Unicenter
  Concord Communications eHealth TABLE B-continued

- Security
  - PKI—Public Key Infrastructure
  - Windows 2000
- Application Framework
  - .NET
    - ADO.NET
    - ASP.NET
    - .NET Compac framework
  - J2EE
  - Weblogic (?) = BEA Weblogic
- Testing = Quality Assurance = Integration Testing
  - Test Plan Development
  - Test script creation
    - Win Runner
    - JUnit
    - Load Runner
    - Test Director
  - Execute certification Test = System Testing
  - Load Testing
    - Load Runner
  - Regression Testing
- Implementation = Deployment
  - Installation
  - Configuring
  - System checks in production
- Operations Management
  - System Maintenance = System Administration
  - Performance Measurement/Monitoring
  - System Backup
  - System Recovery
  - Capacity Planning
  - Enterprise Resource Planning
  - Load Balancing
  - Database Administration
    - Installation
    - Configuration
    - Data loading
    - Data replication practices
    - Data distribution
    - RDBMS backup & recovery
    - Connectivity
      - ODBC = Open database connectivity
      - JDBC = Java database connectivity
- User Interface Design = UI Design = UI Designer
  - Conceptual Design
  - Information Architecture = Site Architecture
    - Site Map development
    - Page Flow development
  - Wireframe development
    - Visio
  - Style sheet development
    - CSS—Cascading Style Sheet
      - CSS1—Cascading Style Sheet Level 1
      - CSS2—Cascading Style Sheet Level 2
  - Should we point to programming languages from here as well?)
  - Visual Design
    - PageMaker
    - Illustrator
    - Flash
    - Macromedia - Fireworks
    - Cold Fusion
    - Macromedia DreamWeaver
    - Photoshop
    - Fireworks
    - Visual Studio (here or in development?)
    - VSS = Visual Source Safe (placement?)
  - Content Management (placement?)
    - MCMS = Microsoft Content Management Server
    - Interwoven
    - Documentum
    - Plumtree
    - BEA Weblogic(?)
- Help Desk Support
  - Networks (point to network section)
  - Work stations
  - OS (point to OS section)
  - Applications
    - MS Windows
    - MS Office
    - Lotus Notes
    - Proprietary Software
  - Personal Communication Devices
    - PDAs
    - Cell Phones
  - Schedule Office moves
  - Phone Support
    - 30-40 average calls per day
    - 40-50 average calls per day
    - 50-60 average calls per day
    - 60-70 average calls per day
    - 70-80 average calls per day
  - Procurement
    - Hardware
    - Software
    - Wireless Equipment
  - Servers
    - RAS—Remote Access Server
    - SMS—Systems Management Server
  - Vendor negotiations
- Systems Operation
  - Project Management (Point)
  - Database Design = Database Architecture (Point)
  - Development (Database Development & Programming Languages)
  - Implement code
  - Testing (Point?)
  - Document Business processes
  - Database Administration (Point)
    - Querying
      - Access Brio
      - Cognos
      - Business Objects
    - Report Creation
      - SQL
      - Crystal
    - Report Generation
    - Data Analysis
      - SPSS
      - SAS
  - System Support
    - Finance & Accounting
      - Epicon
      - Great Plains
      - Solomon
      - Hperion
      - Cognos
    - Human Resources
      - Kronos
      - IVIS
      - Paychex
    - Applicant Tracking Systems
      - Brass Ring
      - Taleo
      - "Alexus 5, by Alexus International"
      - "Brassring Enterprise, by BrassRing Systems, Inc."
      - "E*TRACK System, by Virtual Edge, Inc."
      - "HireEnterprise, by Hire.com"
      - "Hiring Gateway, by Yahoo! Resumix"
      - "HodesIQ, by Bernard Hodes Group"
      - "HRSmart, by HRSmart"
      - "IRecruiter, by iCIMS"
      - "Kenexa Recruiter, by Kenexa"
      - "Peopleclick XG, by Peopleclick"
      - "Recruiting Solutions, by Peoplesoft"
      - "Recruitmax, by Recruitmax"
      - "Recruitsoft Enterprise Staffing Solution, by Recruitsoft"
      - "Webhire Recruiter, by Webhire"
    - Sales & Marketing
      - Saleforce.com
    - CRM
      - Siebel
      - PeopleSoft
  - Questions:
  - Sharepoint (Portal Server)
  - SSH—Secure Shell
  - OCR or other complex pattern recognition
  - Windows SDK and Win32 API
  - Network Engineering
    - Network Design/Architecture = Network Topologies TABLE B-continued Documentation
    Diagrams
        Standard operating procedures = SOP
    Work instructions
    Upgrade and replacement analysis
Network System Design
    Capacity planning
    Create detailed designs
    Multi-vendor & multi-protocol internet working design experience
    Carrier class environment
    Attend technical planning and review meetings with project team
    Network design
        Schematics
        Site/equipment
        Configurations
        Service spreadsheet tables
        Technical overview write-ups
        Cost optimization studies
        Circuit layout record = CLR
        Design layout record = DLR
        Review policies and procedures and recommend improvements
    Improve performance and sustainability of network designs
    Track project activities
    Technical review of maintenance activities
        Responsible for integrity of site architecture
        Ensure virtual team is knowledgeable of client site configuration and applications
        Integrate product portfolio with third party hardware and software
        Control costs
Network Development
    Environments
        LAN
            Ethernet
            Token Ring
            WiFi
            SAN
            802.11
            NAT = Network Address Translation
            Netware 6 (Novell LAN OS)
            VLAN = Virtual Local Area Network
        WAN
            T1
            T3
            WiMAX
            FDDI
            OC3
            OC12
            OC48
            Sonet
            ISDN
            DSL
            Docsis
            FrameRelay
            SAN
        CAN
        VPN
            PPTP—Point-to-Point Tunneling Protocol
        HAN
        Client/Server = Computer Networks
            MS Windows NT
            MS Windows 2000
            SQL-7
            IIS Server
            Windows XP
            Oracle
    Global Networks
        Telecommunications = Telephony
            Data
            Voice
            Video Conferencing
            BX
            PBX
            IP PBX
            IVR Systems
            Unified messaging
            Polycom
            IP Video conferencing
            Frame Relay
            ISDN
            DS3
            VoIP
            Signaling Protocols
                SIP = Session Initiated Protocol
                H.323
                MGCP
                NCS
                TGCP SIP
                SIP-T
                ISTP
                CMSS
            Signaling interoperable
                SS7
                BRI = Basic Rate Interface
            Voice codec
                G.711
                G.729
            Video streaming
            Echelon = LonWorks networks
Network Installation and Integration
    Hardware Installation
        Routers
            Cisco ICM
            Cisco 7500
            Cisco 7200
            Cisco 3700
            Cisco 3600
            Cisco 2600
            Cisco 2500
            Avaya
        Switches
            Cisco ICM
            Cisco Catalyst 5000
            Cisco Catalyst 6500
            Cisco Catalyst 6000
            Cisco Catalyst 5500
            Cisco Catalyst 4000
            Cisco Catalyst 3500
            Cisco Catalyst 2900
            Cisco Catalyst 3548
            Spanning Tree
            Avaya
        Gateways
        Bridges
        Servers
            Remote Access Servers
            Terminal Servers
            Domain Servers
            Application and Device servers
                Windows 2003
                    Citrix MetaFrame
                    Exchange 2003
                Web server
        Hubs
            Cisco
            Avaya
        NIC
            Cisco
            Avaya
            Ethernet Boards
        CSU/DSU
        Multiplexers
            Asynchronous/SONET
            T1
            DS1
            DS3
            E1
        Digtal loop carrier
            SLC 96
            Series 05
            Litespan
            FTTP
        Printers
    Network Protocols = Configuration
        Internet Protocols
            TCP/IP
            UDP/IP
            IP multicast TABLE B-continued IPSec = Internet Protocol Security
ARP
DNS
SNMP
SMTP = Simple Mail Transfer Protocol
ESTMP = Extended Simple Mail Transfer Protocol
ICMP
IPv6
IPSEC
HTTP
SSL
FTP
PPP = Point-to-point protocol
SDLC = Synchronous data link control
HDLC = High-level data link control
H.323
POP3 = Post Office Protocol 3
IP Routing Protocol
  OSPF
  RIP = Routing Information Protocol
  RIP2
  ODR
  EIGRP = Enhanced Interior Gateway Routing Protocol
  IGRP = Internet Gateway Routing Protocol
  BGP = Border Gateway Protocol
Telecommunications Transport Standards
  B82s
  AMI
  STS-1
  T-1
  T-3
  OC-N
  TR008
  TR303
  D4
  2B1O
  BRI
  PRI
  ESF
  SF
  Uni-directional rings
  Bi-directional rings
Mixing Equipment
  D4
  M13
  IDLC
ATM = Asynchronous Transfer Mode
IPX = Internetwork Packet eXchange
DHCP = Dynamic Host Configuration Protocol
MGCP = Media Gateway Control Protocol
LDAP = Lightweight Directory Access Protocol
NNTP = Network News Transfer Protocol
OSI Model
EIGRP
WINS
MPLS
AppleTalk
LocalTalk
HSRP = Hot Standby Router Protocol
IPX
NetBeui
WAP = Wireless Application Protocols
  Bluetooth
PCI
PCI-X
Samba
TLS = Transport Layer Security
Scripting Languages
  PERL
  Shell
  Python
Network Management Software
  Firewalls
    Enterprise
    Home
    Cisco PIX
    HP Openview
    Checkpoint
    Nokia
    IBM Tivoli
    Lucent VitalSuite
    CA Unicenter
    Concord Communications eHealth
Security
  Develop network intrusion detection system
    System Watch
    Alert Console
    Security Agent
  Implement network intrusion detection system
    Anomoly identification
    Threat mitigation
  PKI = Public Key Infrastructure
  Windows 2000
Testing
  Proof of concept
  Performance testing
  Management tools
    NetScout
  Diagnostic tools
  Certify production ready
  Troubleshooting
    Build complex test labs
    Execute test plans
  Develip in depth test procedures and concepts
Network Maintenance
  Anti-virus programs
  Monitoring
  Load balancing
    Cisco CSS
    Radware WSD
  Replication Solutions
  Web caching
  Transaction monitoring
  Network compression
  Automatic failover
  Traffic management
  Network surveillance
  Issue triaging
  Circuit testing and repair
  Router configuration management
  Hardware replacement
Network Administration
  Domain name registration
  IP address assignment
  Log monitoring
  DNS Administration
  Infrastructure port assignment and patching
  Racking hardware
  Manage system back-up
  Network recovery
  Redundant network connectivity and operation
  Add and delete users
Customer Service = CS
  Open trouble tickets
  Track trouble tickets
    Resolve trouble tickets
    Collect & evaluate customer requirements
    Implement customer rule sets within requirements
    Accept new customer sites
    Decommission customer sites
  Act as a point of escalation for customer
  Maintain regular client communication
    Lead technical customer meetings
Project Management
  Develop Project Roadmap = Develop Milestones
    Microsoft One Note
    Microsoft Project
    Quick Books
    SureTrak
    Act!
  Manage Project Roadmap = Manage Milestones
  Requirements Gathering and Analysis
    Translate concepts into functional requirements
    Write technical requirements
    Develop use cases
Telecommunications Engineer
  Network Access Designs
    Traditional Land Lines TABLE B-continued DSL
VOIP
Wireless
Internet
Interactive Voice Response = IVR
  Voice Recording
Concept
  Proof-of-Concept
  Prototype
Build Telecom Networks
  Network Protocols and Technologies = Routing Protocols =
Fiber Optic Transport Systems
  Physical Media = Hardware = Devices = Encoding
    ISDN
    PDH
      T-carrier
    RS-232
    SDH
    SONET
  Data Link Layer = Data Transfer
    ARP
    Ethernet
    FDDI
    HDLC
    PPP
    Token Ring
  Network Layer = Router = Flow Control = Segementation
    X.25
    Frame relay
    ATM
    MPLS
    Signalling System 7 = SS7 = C7 = CCIS7
    ICMP
    IP
      IPv4
      IPv6
    IPX
    Routing Protocols
      EGP
      BGP
      EIGRP
      IGRP
      IS-IS
      RIP
      OSPF
  Transport Layer = Data Transfer to End Users
    SPX
    TCP
    UDP
    SCTP
    RTP
  Presentation Layer = Delivery = Formatting of Application
    HTTP/HTML
    ASN.1
    XML
    TDI
    SNMP
    FTP
    Telnet
    SMTP
  Application Services
    TCP/IP
    SIP
    FTP
    HTTP
    SNMP
    SMTP
    Telnet
    XMPP
      Jabber
  Programming Languages
    JAVA
    J2EE
    C
    C#
    C++
    XML/XSL
    HTML
    VB.NET TABLE B-continued Vendor Systems
  Avaya
    PBX
    Definity
    G3R
    Multi-Vantage
    Genesys CTI
    Intuity
    Switching
    Telephone Equipment
  AT&T
    Route-It
    VPN
      Network Based
      Premise Based
    VoIP
  Cisco
    Call Manager
    Unity
    Conferenceing/Meetingplace
    ICM Routing & Sorting
    Switches
    LAN/WAN
  Aspect
    Uniphi Suite
    IVR
    Call Center
      PSTN
      IP
  Nortel
    PBX
      Meridian
      Norstar
    Switching
    VoIP
  Lucent
    VoIP
    Optical Networking
  NEC
    Aspire
    Electra Elite IPK
    DS1000/2000
    Infoset408
    i-Series
    IP-PBX
    Switch/Router
  Toshiba
    Strata
    IVR
    Voice Processing
  Fujitsu
    Mobile/Wireless Networks
    Switching
    Routers
  Vodavi
    Starplus
  SiemensAG
    Rolm
  Mitel
    Telephones
    Peripherals
  Ericsson
    Mobile Core Products
  Panasonic
    Telephones
  Asterisk
    PBX
  Commercial Telephony Interfaces
    Dialogic
    Aculab
    Pika Technologies
  MCI
    ACES
    ICON
    MECCA
    F&E
    SiteVu
    INM
    Tarantella

TABLE B-continued

Installations = Implementation
  Equipment Configuration
  Card and/or Port Requirements
  Power
  Cabling
  Floor Space
  Rack Placement
Testing
  Evaluation
    Product Verification
    Build Complex Test Labs
  Remote Circuit Testing Equipment
    Digital Lightwave
    Eastern Research
    Acterna
Maintenance
  Enhancement Coordination
    Large Scale Moves
    System Upgrades
    Installations = Implementation
      Equipment Configuration
      Card and/or Port Requirements
      Power
      Cabling
      Floor Space
      Rack Placement
  Internal Client Services
    Open Trouble Tickets
    Track Trouble Tickets
    Take Tickets to Resolution
  Troubleshooting Tools
    Vendor Specific Solutions
    Log Files
    Home Grown Scripted Solutions
  Security Techniques
    Intrusion Detection
    Anomaly Identification
    Threat Mitigation
    Corporate Security Standards
Project Management
  Develop Project Roadmap = Develop Milestones
  Manage Project Roadmap = Manage Milestones
  Requirements Gathering and Analysis
  Translate concepts into functional requirements
  Write Technical Requirements
  Develop Use Cases
  Budget Responsibility

TABLE C

Professional Group    Profession Skill Bucket    Skill 1 Skill 2 Skill3 Skill 4
Customer Service
  Customer Service Customer Solutions = Tier 1 Call reason resolution
    Answer product feature questions
    Explain rate/Pricing plans
    Activate new accounts
    Administer change requests
    Issue credit for billing errors = Adjust consumer accounts
    Establish payment arrangements within established guidelines
    Upsell additional products and services
      Carry monthly sales quotas
    Customer Resolution
      Respond to telephone inquiries
        Phone support
          30-40 average calls per day
          40-50 average calls per day
          50-60 average calls per day
          60-70 average calls per day
          70-80 average calls per day
      Respond to written inquiries
      Chat room response support
      Issue research = Problem trouble shooting
        Internal Departments
        External Vendors
        Field Personnel
        Service Delivery Departments
      Root cause determination
    Technical Support
      Analyze Network Outages
      Identify Trends and Problem Areas
        Troubleshoot/replicate issue
        Research/Identify solutions
        Implement or assign resolution responsibility
        Inform customer of resoltuion
      Problem resolution communications to customers
      Pre-sale Support
        Respond to information request about technical product RFP/RFI
        Present technology to customers
        Prepare cuestomer presentations
        Review Cost Information
      Post-sale Support
        Track New Installations = Orders
        Escalate as Necessary to Expidite Installation
    Call Center Strategic Placement
      Insource support plan analysis
      Outsource support plan analysis
        Domestic location research
        Off-shore location research TABLE C-continued Set Call Center Staffing Strategies = Hiring Strategies
   Call Center Management
   Customer interacting staff
   Back office processing staff
   Operational support
Call Center Operations
   Set call routing strategy = Workflow management
     Conduct & Interact with complex scripting
       Customer Attributes
       Call Center Queues
     Provision call routing
     Create networking allocations and routing scripts
       Special planned closings
       Segment transition site moves
       Site openings
       Disaster recovery
   Develop & Maintain Voice Systems Documentation
     IVR Design documents
     Call flows
     Usability lab test results
     Call routing override process & procedures
     Business continuation documentation
   Perform benchmark strategies to improve consumer experience
   Monitor ongoing call allocation
   Recommend routing changes and updates
Program Management
   Product and marketing program distribution to sales and service channels
     Coordinate with training the development of needed support documents
     Resource allocation of call center sales and service representatives
     Manage product and program compliance against standards and regulatory requirements
     Facilitate program selection and prioritization
     "Track, measure and report on the progress of projects/programs"
   Ensure best practices procedures
     Identify best practices
     Develop and drive process improvements
       Resource optimization and pipeline management
     Establish and maintain quality and standards
     Consistently reach corporate and center objectives
   Training = Performance Enhancement programs
     Management Training
     Skills assessment
     Skills Training
     Product Training
     Curriculum Development
       Instructional Modules
       Training aid development
         Handbooks
         Demonstration models
         Multi-media visual aids
         Computer Tutorials
         Reference Books
       "Web based, e-learning = Multi-media support"
         Flash
         Authorware
         Dreamweaver
         HTML
       Vendor Management
       Trainer certification
     Schedule Training Classes
     "Training Delivery, Facilitation"
       TTT = Train the trainer
       Classroom delivery
         Kick-offs
         Ice-breakers
         De-briefs
         Product details
         Sales processes
     Establish Training Evaluation Criteria
       Customer feedback analysis
       Define evaluation metrics = performance requirements
       Analyze results
       Suggestion performance enhancements
       Feedback to trainers and presenters
     Adult education principals and theories
     Capacity planning
   Productvity Reporting
     Analyze Data
       Average time of outstanding issues TABLE C-continued

```
                Average call handling time
                Average calls handled per associte per day
                Incentive payment reporting
Finance
  Accounting
    General Accounting
      Revenue
        Revenue Recognition Management
          Accrual/GAAP Compliance
            CPFF = Cost plus fixed fee
            T&M = Time and Material
            CIP = Construction in Process
            Ratably
            Per Contract
          Cash Method
            Calculate Cost of Sales & Gross Margins
            Maintain Deferred Revenue schedules
          Order/Contract Management
            Confirm Delivery of Service
          Credit & Collections
            Process credit applications and approve credit limits
            Collect past due accounts via phone
            Issue past due account reports to Sales & Customer Service
            Database Management of calls and collections
          Billing = Invoicing
            Set-up Revenue Support Tables
              Recognition
              Deferred Schedules
            Produce invoices and credit memos
              CPFF = Cost plus fixed fee
              T&M = Time and Material
              CIP = Construction in Process
          Receivables Management
            Day Sales Outstanding = DSO
          Research Customer payment discrepancies
        Merchant Vendor Management
      Expenses
        Accounts Payable = Disbursements
          Bank liaison
            Outstanding check list management
            Positive pay submission
          Vendor Class Tracking
            Employees
            General Vendors
            Consultants/Contractors
              Issue 1099s
          Payable aging analysis
          Vendor Management = Vendor Invoice Payables
            Reconcile Procurement Card (P-Card) Charges and review
accuracy
            Manage corporate American Express account for accuracy
              Verify purchase prder funds available for payments
              Code invoives with general ledger accounts
              Verify accurate/valid charges
              Enter data into Accounting System
            Expense Reports = T&E = Travel & Entertainment Expense
              Code with general ledger accounts
              Verify receipts
              Enter data into accounting system
              Establish & enforce expense reimbursement guidelines
            Check processing
        Payroll
          Process time cards
          Accounting System Data entry
          Initiate pay checks or Direct Deposit
          Produce monthly reports supporting payroll expense & liability
accruals
            Wages = Earnings
              Commission Payment
            Bonuses
            Stock Options
            Taxes
                Income taxes
                Social Security taxes
                Unemployment
                Workers compensation
            Paid time off (PTO) = Vacation
            Disability
            Taxable & non-taxable fringe benefits
```

TABLE C-continued

Other Deductions
      Manage payroll vendor
      Deduction reconciliation to General Ledger
    Operating Expenses
      Marketing Expenses = Customer acquisition and retention programs
        Direct Mail
        E-mail Campaigns
        Television Advertising
        Print Advertising
        Industry Events = Trade Shows
        Travel
        Office Supplies
      Sales Support
        Quarterly Sales Contest
        Travel
        Office Supplies
      G&A = Administrative = Overhead
        Legal
        Finance
        Benefits
        Travel
        Office Supplies
    Capital Expenditures
      Maintain Fixed Asset schedules and calculations
        Asset Acquisition
        Asset Depreciation
        Asset Transfers
        Asset Disposal
        Net working capital
        Add backs
      Establish and enforce Fixed Asset policies and procedures
    Balance Sheet Accounting
      Cash Receipt Management
        Prepare Daily Deposits
        Apply Cash receipts to customer accounts
      Fixed Assets
      Inventory Management
      Procurement
        Negotiate cost and contract terms
        Approve and Release Purchase Order funding
      Accounts Receivable
        Manage write-off schedules
        Forecast Bad Debt Expense
      Bank Statement Reconciliation
  Corporate Accounting
    Tax Reporting and filing
      Prepare and reconcile quarterly and year-end tax reports
        Corporate Sales & Use Tax = Income Taxes
          Federal
          State
          Local
        Property Tax
        Franchise Tax
        Excise Tax
        Payroll Tax
          File Federal Unemployment tax forms = Form 940
          File Quarterly Tax return forms = Form 941 = FICA Tax Rate &
Wages
          Federal
          State
          Local
        Benefit Tax = Fringe Benefit Tax
      "Support Federal, State, & Local compliance audits"
      "Review tax implications of Mergers, acquisitions, and divestments"
      Prepare deferred tax schedules
      Prepare Tax plans and present recommendations to Management
      Document policy and procedures for tax department manuals
      Forecast Tax income and liability
      "Prepare analytical studies on historical, forecast, and pro-forma tax data"
      Support Government Tax audit
      File and Maintain Business Licenses
      Intercompany Pricing Study
    Audit Management
      Select External Auditors
      Lead support of external audits
      Coordinate external audit documentation with internal departments
      Perform monthly internal audits
    External Reporting = Investor Relations
      Press Release data support TABLE C-continued

```
Fact Sheet development
Regulatory Filings
SEC Filings
   10 - K
   10 - Q
Board Presentations
Shareholder Call/Analyst Call preparation
Financial Statement Development
   Balance Sheet Trend & Variance Analysis
   Income Statement Trend & Variance Analysis
   Cash Flow Statement Trend & Variance Analysis
   Profit & Loss Statement Trend & Variance Analysis
   Calculate earnings
   Calculate EBITDA
Compliance Management = Administrative Regulations = Regulations
   FAS = Financial Accounting Standards
   Sarbanes-Oxley = SOX
   Generally Accepted Accounting Principles = GAAP
   FAR = Federal Acquisition Regulations
   DFARS = Defense Acquisition Regulation Supplement
   CAS = Cost Accounting Standards
   TEFRA = Tax Equity Fiscal Reform Act
Equity Analysis
   Capitalization Tables
   Statement of Shareholder Equity
   Retained Earnings
   Fixed Asset Tables
   Warrants
   Earnings per Share
Treasury Management
   Cash Management
      Overnight investing
      Analyze investment alternatives
      Maintain broker relationships
      Develop short and long-term cash forecast models
      Monitor cost effectiveness of treasury functions
         Hedging
         Investments
         Bank fees
         Line of credit
      Establish signing authority and maintain appropriate documentation
   Portfolio Accounting
      Manage portfolio
         Multiple cash accounts
         Co-investments
         REIT
         Real Estate investments
      Yield Analysis
      Provide portfolio data for Financial Statements
      Debt covenant compliance
   General Accounting
      Lead Audit Engagement
      Scope and plan audits
      Design Test Plans
      Execute Test Plans = Execute Audit Procedures
      Identify Risks
      Document Controls
      Write Reports and Prospective Analysis
      Present Results to Management
      Perform Tax Audit
         Analyze accounting records for tax compliance
         Identify owed penalties and interest
         Prepare audit reports
         Make Sales and Use tax ordinance and regulation recommendations
      Tools
         ACL
         CAAT
Financial Planning = Capital & Operating Budget Preparation
   Prepare annual budgets and quarterly forecast
      Revenue
         Develop based on market and product line offerings
         Forecast revenue in accordance with GAAP/accrual accounting
         Forecast Cash/bookings
         Document assumptions
         Review assumptions and budget targets with functional departments
         Present budget/forecast to executive management
      Operating Expenses
         Analyze revenue and margin requirements
         Forecast expenses in accordance with GAAP/accrual accounting
```

TABLE C-continued

Document assumptions
   Review assumptions and budget targets with functional departments
   Present budget/forecast to executive management
  Capital Expenditures
   "Analyze revenue, expense, and margin requirements"
   Document assumptions
   Review assumptions and budget targets with functional departments
   Present budget/forecast to executive management
 Business Development
  Merger & Acquisition = Corporate Financial Analysis
  Valuation Modeling
   New Capital Markets
   Working Capital
   Liquidation Profile
   Treasury Plan
   Asset Valuation
  Due Diligence review
   On-site operations review
   Document on-site findings
  Financial Statement Analysis
   Review reporting processes and procedures
   Review supporting documentation/schedules
   Confirm industry reporting regulation compliance
  Quality of earnings analysis
 Financial Analysis
 Financial Reporting = Performance Analysis
   Actual results to Budget/Forecast/Plan Variance Analysis
   Develop cost reduction strategies
   Trend Analysis = Behavioral Reporting
    Cash burn rate
    Revenue performance
    Expense performance
    Seasonality performance analysis
     Website Analytics = Website statistics analysis
      Total and unique visitors
      Path Analysis
      Sales per visit
      Account Management
     Company specific Key Performance Indicators = KPIs
   Sales channel performance analysis
   Call Center Performance Reporting
   Present Results to Executive Management
   Contract Performance Analysis
    Ensure attainment of customer and product margins
    Schedule Delivery compliance
    Receipt and Payment Schedule analysis
   Post Mortem Campaign/Program Analysis
    Actual performance compared to Business Case assumptions
  Business Case Development
   Pricing Analysis
    Review customer Request for Proposal (RFP)
    Recommend strategic pricing initiatives
    Perform market and competitive analysis
    Develop pricing sensitivity models
    Present assumptions and risk assessment
   Programs/Campaign Analysis = Sales & Marketing programs
    Cost/benefit analysis
    Review assumptions with Marketing/Sales
    Approve campaign and programs
   Capital Expenditure Analysis
    Rate of return analysis = Return on Investment Analysis = ROI
Analysis
  Modeling
   Statistical
    Logistic regression
    Decision Tree
    Neural Network (pattern recognition)
   Tools
    ERWin
    Star
    Snowflake
 Risk Management = Financial Operations
  Design & implement processes = Establish and enforce best practices
  Process diagnosis = process improvement
  Review new proposals and assess risk
 Finance System Operations & Database Management = Data warehouse
management
  Project Management
   Requirements gathering

TABLE C-continued

Design/document workflows
    Planning system support
    Standards
        COBIT = Security & Control practices
        PMBOK = Project Management Body of Knowledge
        Earned Value = Measures project process in monetary terms
    Develop and support data marts
    Data Mining
    Data Analysis
        SAS
        SPSS
    Database administration/Database modeling
      Microsoft SQL Server
      Oracle
      Adabas
      DB2
      FileMaker Pro
      Informix
      Ingres
      Interbase
      Microsoft Access
      Progress
      Sybase Adaptive Server
      FirebirdSQL
      MYSQL
      PostgreSQL
    Report creation
        SQL
      Business Objects Crystal
      ReportSmith
      Access Brio
      Cognos
    Report generation
    Software support
        Epicor
      Microsoft Great Plains
      Microsoft Solomon
      Hyperion
        Essbase
      Cognos
        Cognos Cube
      SAP
      Bravo = database integration software
      Khalix - budgeting a& forecasting
      Timberline = real estate & construction accounting
      Adaytum = Enterprise Performance Planning (EPP)
      Cashbook = Accounting System
      Ariba = procurement support
      Lacerte - tax preparation
      Prosystem FX = tax preparation
      ReportSmith
      Microsoft Axapta = ERP solution
      SYSPRO ERP
      Everest
      Microsoft Navision
    Desktop Computer
      Microsoft Office
        Excel
        Access
        Powerpoint
        Word
      Lotus Notes
Human Resources
  Human Resources
    Recruitment/Staffing = Talent Acquisition
      Resource planning = Organizational design = Workforce planning = Needs assessment
        Research
        Forecasting
      Analyze marketplace labor trends to determine impacts to organization
      Competency modeling
        Skills testing
      Succession planning
      Job analysis
      Employee recruitment = Pipeline development
        Advertising
        Recruiter management = External Recruiters
          Open house support
      Interviewing/Screening candidates TABLE C-continued "Employee selection, Pre-employment support/tracking"
    Conduct reference checks
    Conduct background checks
    Negotiate offers
    Obtain physical results
    Establish start dates
    Immigration status checks
    Obtain security clearance evidence
    Process employment paperwork
    Develop offer letter
    Complete any required testing
    Coordinating space planning with facilities
Psychometrics
    Intelligence testing
    Personality testing
    Vocational testing
Develop workforce diversity strategy
    Develop workforce diversity initiatives
    Monitor performance against diversity plans
    Develop external diversity sourcing relationships
Regulatory Compliance
    Support audits
    Labor law
    Tax
    Social Security regulations
    Federal Regulation
    State Regulations
    Workmen's Compensation
    Affirmative Action
    Disabilities Act
    Government Employment Policies
        FMLA
        EEO guidelines = Equal Employment Opportunity Commission
        EEO01 - Employer Information Report
        VETS - 100 = Federal Contractor Veterans Employment Report
        FCC 395
Documentation Management
    Applications
    Non-Disclosure Agreements
    Resumes
    Performance Reviews
Maintain Employee Statistics
Develop and Maintain Employee Handbook
    "Level of recruitment - select, do not apportion, similar to methodologies in technology"
        "Executives = C level, VPs, Directors"
        Professionals = mid-level
        Campus = entry-level
        Technical
        Diversity
Compensation & Benefits
    Salary Planning
        Merit Increase forecasting
        Cost of living increase analysis
    Develop and administer employee performance review process
    Develop Bonus & Incentive plans = Incentive plans = Variable Incentive Plans
        Sales
        Non-Sales
    Develop Reward and Recognition programs
        Development
        Implementation
        Evaluation
    Manage Stock grants
    Manage relocation programs
        "Manage external, outsource vendor"
        Maintain policies
    Pension Management
    Medical Benefit Plan Administration = Healthcare Plan Administration
        Vendor Management
            Health
            Life
            Dental
            Vision
        Contract Negotiation
        RFP Development
Employee & Labor Relations = Learning & Development = Employee Development
    Relationship building = interpersonal skills TABLE C-continued

```
Counseling = Coaching Skills = Leadership coaching
   Development models & techniques
   Career Development = Career Management guidance
Evaluation Tools
   Employee Opinion Surveys
   Exit strategy interviews
   Performance Management evaluation tools
Mentoring program development
Develop and implement employee performance plans
Manage employee events
Manage employee communications
   Develop communication strategy
   Write employee communications
      Own policy handbook
         Content development
         Content review
         Policy interpretation
         Policy enforcement
Employee retention
   Termination Analysis = Turnover rate analysis
   Program development
Organizational Development concept knowledge
Organizational Behavior concept knowledge
HR System Operations
   Project Management
      Requirements gathering
      Design/document workflows
      Planning system support
      Standards
         COBIT = Security & Control practices
         PMBOK = Project Management Body of Knowledge
         Earned Value = Measures project process in monetary terms
      RFP Development
   Data collection methods
         Paper questionnaire
         Computer Aided Personal Interview
         Computer Aided Telephone Interview
   Database modeling (point)
   Data Mining
   Data Analysis
   Database administration = System Maintenance (point)
   Report creation
         SQL
         Business Objects Crystal
         ReportSmith
   Report generation
   Software support
      Hiresystems
      Oracle HRIS
      Webi
      Application Tracking System Integration
         Brass Ring
         Taleo
         "Alexus 5, by Alexus International"
         "Brassring Enterprise, by BrassRing Systems, Inc."
         "E*TRACK System, by Virtual Edge, Inc."
         "HireEnterprise, by Hire.com"
         "Hiring Gateway, by Yahoo! Resumix"
         "HodesIQ, by Bernard Hodes Group"
         "HRSmart, by HRSmart"
         "IRecruiter, by iCIMS"
         "Kenexa Recruiter, by Kenexa"
         Lawson
         "Peopleclick XG, by Peopleclick"
         PeopleSoft
         "Recruiting Solutions, by Peoplesoft"
         "Recruitmax, by Recruitmax"
         "Recruitsoft Enterprise Staffing Solution, by Recruitsoft"
         "Webhire Recruiter, by Webhire"
Change Management
   Change readiness assessment
   Assessing organizational risks
   Formulating leadership strategies
   Guide change strategies within functional areas
   Develop communication strategies
   Culture assessment/alignment
   Change acceleration programs
   Measure and report results
```

TABLE C-continued

```
Presentation
   Management
   New Hire groups
Asset Management = Site Location
   Market Analysis
      Labor cost
      Available labor pool
      Employment legislation
      Real Estate Management
   Building/Lease contract negotiations
      Space Management
   Facilities Management
Budget Management
   Recruitment activities
   Training
   Benefits
   Employee Programs
   Labor cost by Department (cost per head)
      Salary
      Fringe Benefits
   Overall
Training = Performance Enhancement programs
   Management Training
   Skills assessment
   Skills Training
   Product Training
   Curriculum Development
      Instructional Modules
      Training aid development
         Handbooks
         Demonstration models
         Multi-media visual aids
         Computer Tutorials
         Reference Books
      "Web based, e-learning = Multi-media support"
         Flash
         Authorware
         Dreamweaver
         HTML
      Vendor Management
      Trainer certification
   Schedule Training Classes
   "Training Delivery, Facilitation"
      TTT = Train the trainer
      Classroom delivery
   Establish Training Evaluation Criteria
      Customer feedback analysis
      Define evaluation metrics = performance requirements
      Analyze results
      Suggestion performance enhancements
      Feedback to trainers and presenters
   Adult education principals and theories
   Capacity planning
Office Management
   Office Management
      General Administration
         Answering Phones
            Routing Calls
            Taking messages
            Back-up receptionist support
         Receiving and distributing mail and deliveries
         Greeting Visitors
         Copying
         Faxing
         Ordering Office Supplies
         Proof reading documents
         Filter and prioritize department request
         Maintain department contact list
      Space planning
         Coordinate moves
         Assign workstations
      Presentation development
         Prepare/build in Powerpoint
         Distribute as needed
      Documentation support
         Maintaining Correspondence
            Forms
            Letters
            Spreadsheets
```

TABLE C-continued

```
   Maintain Documentation archive
      Hard copy
      Online Database Management
   Human Resources Support
      Tracking employee attendance and vacation
      Submit Payroll
      Prepare for new hire start
         Order required equipment
         Identify space
         Set-up phone
         Obtain required system access
      Asset collection from former employees
   Accounting Support
      Order/Data entry
      Generate invoices
      Create Purchase Order request
      Manage budget
      Track Accounts Receivable
      Track Accounts Payable
         Code Invoices
         Review invoices for accuracy
         Obtain proper invoice payment approvals
         Process invoices for payment
      Department Asset Inventory Management
   Business Travel
      Make arrangements
      Prepare travel and expense reports
   Office Management
      Ensuring office is OSHA compliant
         Kitchen
         Conference Rooms
      Manage facilities vendors
         Cleaning
         Security
         Utilities
      Maintain Office Equipment
   Calendar Management
      Schedule internal meetings
      Schedule Interviews
      Schedule other external appointments
      Coordinate site work
   Meeting Coordination
      Ensure conference room includes appropriate equipment
      Provide beverages
      Coordinate food when appropriate
      Obtain call-in numbers for conference calls
      Document meeting follow-up and actions
   Event Support
      Plan Employee Events
      Plan conferences
      Plan conventions
      Manage Vendors
      Project Manage event
   Training Support
      Research course availability
      Arrange courses
   Desktop Computer Skills
      Microsoft
         Outlook
         Word
         Excel
         Powerpoint
         Access
      QuickBooks
   Items handled outside of apportionment
   Level Support
      "CEO/President,"
      "COO, CFO, Executive Vice President"
      Functional Group Head
      Functional Group Staff
   Functional Area
      Executive Offices
      Sales
      Marketing
      Finance
      HR
      Engineering
Technology
   Software Engineering
```

TABLE C-continued

```
Development Methodologies
  CMMI
  Extreme Programming
  Six Sigma
  ISO 900
  Waterfall
  RAD—Rapid application development
  JAD—Joint application development
Project Planning = Systems Business Analysis
  Buy versus build analysis
  Risk assessment
  Cost benefit analysis
    CASE Tools
  Write business proposals
Project Management
  Develop Project Roadmap = Develop Milestones
    Microsoft Project
    SureTrak
    Project KickStart                        ADD
    Welcom Open Plan                              ADD
    Primavera Project Planner                          ADD
    PlanView Portfolio Manager Software                         ADD
  Manage Project Roadmap = Manage Milestones
    Microsoft Project                        ADD
    SureTrak                    ADD
    Project KickStart                  ADD
    Welcom Open Plan                  ADD
    Primavera Project Planner               ADD
    PlanView Portfolio Manager Software                  ADD
Requirements Gathering                                   ADD
  Write Functional Requirements                    ADD
  Write technical requirements
  Develop Use Cases
Documentation and Training                         ADD
  Develop and maintain training manuals                  ADD
  Write procedure manauls                  ADD
  Write software simulations               ADD
Systems Design
  Develop Workflow/Business rule development
  System Interaction Analysis
  Establish System Configuration                      ????
  Establish System Performance                        ????
  Design Documentation
    System Diagrams
      CASE Tools
    Installation Guidelines
      CASE Tools
    System Builds
      CASE Tools            ADD
  Determine Security Needs
  Design Application Framework
  Database Design = Database Architecture
    Data Modeling
      Erwin
      Oracle Design
    Data Warehousing
      "Extract, Transform, Load (ETL)"
      Star Schema
      On-line Analytical Processing (OLAP)
        Microstrategy              ????
    Relational Database
      Microsoft SQL Server
      Oracle
      Adabas
      DB2
      FileMaker Pro
      Informix
      Ingres
      Interbase
      Microsoft Access
      Progress
      Sybase Adaptive Server
      FirebirdSQL
      MYSQL
      PostgreSQL
    Hierarchical Database
      IMS
    OOD = Object Oriented Database Management Systems
      ObjectStore
```

TABLE C-continued

```
    Versant
    Embedded Database
      Berkeley DB
      HSQLDB
Development/Implementation
  Programming Language
    Object Oriented Programming Language
      C++
      Small Talk
      Imaging Expression
      C #
      J #
      VB.Net
      Java
        J2SE
          JDBC
          Swing
          Java Beans
        J2ME
        J2EE
          JSP
          Servlets
          JMS
          EJB
      C
      PHP
      Visual Basic
      HTML
        DHTML
        XHTML
      XML
        XPath
        XSD—XML Schema Definition
        XSLT
      Active X
        ADO
      Python
      Fortran
      Cobol
      SQR
      EXLT
      Bash
    Scripting Language
      Shell
      Perl
      REXX
      OWK
      Java Script
    RPG
    ABAP
    Tools
      FileNET
      PowerBuilder
      DataFlex
      Tasking M16C
      Intel
      Agile
    Application Framework                       ADD
      .NET                     ADD
        ADO.NET                ADD
        ASP.NET                ADD
        .NET Compac framework                   ADD
      J2EE                     ADD
        Weblogic = BEA Weblogic                 ADD
        WebSphere              ADD
        Oracle 9iAS            ADD
    Relational Database            Make these all part of
development
      Microsoft SQL Server
      Oracle
      Adabas
      DB2
      FileMaker Pro
      Informix
      Ingres
      Interbase
      Microsoft Access
      Progress
      Sybase Adaptive Server
```

TABLE C-continued

```
    FirebirdSQL
    MYSQL
    PostgreSQL
  Hierarchical Database
    IMS
  OOD = Object Oriented Database Management Systems
    Object Store
    Versant
  Embedded Database
    Berkeley DB
    HSQLDB
  OS = Operating System              Make this a skill under
the development skill bucket
    Unix
      AIX
      A/UX
      ArchBSD
      BSD/OS
      Coherent
      Darwin
      Digital Unix
      ESIX
      FreeBSD
      Helios
      Interactive Unix
      LynxOS
      MachTen
      Minix
      NetBSD
      QNX
      Reliant Unix
      SINIX
      SunOS
      Topix
      Ultrix
      Unixware/Univel
      Linux
      MAC OSX
      Solaris
    MAC OS
      MAC OSX
    Novell Netware
    Sun
      Solaris
    MVS—Multiple Virtual Storage
    Windows
      2000
      2003
      XP
      NT
      98
    VMS
    VAX
    AS-400
  Networks
    Hardware
      Routers
        Cisco ICM
        Cisco 7500
        Cisco 7200
        Cisco 3700
        Cisco 3600
        Cisco 2600
        Cisco 2500
        Avaya
      Switches
        Cisco ICM
        Cisco Catalyst 5000
        Cisco Catalyst 6500
        Cisco Catalyst 6000
        Cisco Catalyst 5500
        Cisco Catalyst 4000
        Cisco Catalyst 3500
        Cisco Catalyst 2900
        Cisco Catalyst 3548
        Spanning Tree
        Avaya
      Gateways                       ???? Need Details?
      Bridges                        ???? Need Details?
```

TABLE C-continued

```
Servers
    Remote Access Servers
    Terminal Servers
    Domain Servers
    Application and Device servers
        Windows 2003
            Citrix MetaFrame
            Exchange 2003
        Web server
Hubs
    Cisco
    Avaya
NIC
    Cisco
    Avaya
    Ethernet Boards
CSU/DSU                     ???? Need Details?
Printers                    ???? Need Details?
Environments
    LAN
        Ethernet
        Token Ring
        WiFi
        SAN
        802.11
        NAT—Network Address Translation
        Netware 6 (Novell LAN OS)
        VLAN = Virtual Local Area Network
    WAN
        T1
        T3
        WiMAX
        FDDI
        OC3
        OC12
        OC48
        Sonet
        ISDN
        DSL
        Docsis
        FrameRelay
        SAN
    CAN
    VPN
        PPTP—Point-to-Point Tunneling Protocol
    HAN
    Client/Server = Computer Networks              ADD
        MS Windows NT
        MS Windows 2000
        SQL-7
        IIS Server
        Windows XP
        Oracle
        NFS = Network File System
    Telecommunications = Telephony "MOVE
THIS up to Skill level 1, under the network skill bucket"
        Data                MOVE THESE up to skill level 2
        Voice               MOVE THESE up to skill level 2
        Video Conferencing          MOVE THESE up to skill
level 2
        PBX                 MOVE THESE up to skill level 2
        IP PBX              MOVE THESE up to skill level 2
        Unified messaging           MOVE THESE up to skill
level 2
        Polycom             MOVE THESE up to skill level 2
        IP Video conferencing           MOVE THESE up to
skill level 2
        Frame Relay         MOVE THESE up to skill level 2
        ISDN                MOVE THESE up to skill level 2
        DS3                 MOVE THESE up to skill level 2
        VoIP                MOVE THESE up to skill level 2
        Signaling Protocols         MOVE THESE up to skill
level 2
        SIP = Session Initiated Protocol            MOVE THESE
up to skill level 3
            H.323           MOVE THESE up to skill level 3
            MGCP            MOVE THESE up to skill level 3
            NCS             MOVE THESE up to skill level 3
            TGCP SIP            MOVE THESE up to skill level 3
```

TABLE C-continued

| | |
|---|---|
| SIP-T | MOVE THESE up to skill level 3 |
| ISTP | MOVE THESE up to skill level 3 |
| CMSS | MOVE THESE up to skill level 3 |
| Signaling interoperable | MOVE THESE up to skill level 2 |
| SS7 | MOVE THESE up to skill level 3 |
| BRI = Basic Rate Interface | MOVE THESE up to skill level 3 |
| Voice codec | MOVE THESE up to skill level 2 |
| G.711 | MOVE THESE up to skill level 3 |
| G.729 | MOVE THESE up to skill level 3 |
| Video conferencing | MOVE THESE up to skill level 2 |
| Video streaming | MOVE THESE up to skill level 2 |
| Echelon = LonWorks networks | |
| Network Protocols | "MOVE This up to level 1, attache to Network skill bucket" |
| Internet Protocols | MOVE THESE up to skill level 2 |
| TCP/IP | MOVE THESE up to skill level 3 |
| UDP/IP | MOVE THESE up to skill level 3 |
| IP multicast | MOVE THESE up to skill level 3 |
| IPSec = Internet Protocol Security | MOVE THESE up to skill level 3 |
| ARP | MOVE THESE up to skill level 3 |
| DNS | MOVE THESE up to skill level 3 |
| SNMP | MOVE THESE up to skill level 3 |
| SMTP = Simple Mail Transfer Protocol | MOVE THESE up to skill level 3 |
| ESTMP = Extended Simple Mail Transfer Protocol | MOVE THESE up to skill level 3 |
| ICMP | MOVE THESE up to skill level 3 |
| IPv6 | MOVE THESE up to skill level 3 |
| IPSEC | MOVE THESE up to skill level 3 |
| HTTP | MOVE THESE up to skill level 3 |
| SSL | MOVE THESE up to skill level 3 |
| FTP | MOVE THESE up to skill level 3 |
| PPP—Point-to-point protocol | MOVE THESE up to skill level 3 |
| SDLC = Synchronous data link control | MOVE THESE up to skill level 3 |
| HDLC = High-level data link control | MOVE THESE up to skill level 3 |
| H.323 | MOVE THESE up to skill level 3 |
| POP3 = Post Office Protocol 3 | MOVE THESE up to skill level 3 |
| IP Routing Protocol | MOVE THESE up to skill level 2 |
| OSPF | MOVE THESE up to skill level 3 |
| RIP = Routing Information Protocol | MOVE THESE up to skill level 3 |
| RIP2 | MOVE THESE up to skill level 3 |
| ODR | MOVE THESE up to skill level 3 |
| EIGRP = Enhanced Interior Gateway Routing Protocol | MOVE THESE up to skill level 3 |
| IGRP = Internet Gateway Routing Protocol | MOVE THESE up to skill level 3 |
| BGP = Border Gateway Protocol | MOVE THESE up to skill level 3 |
| ATM = Asynchronous Transfer Mode | MOVE THESE up to skill level 2 |
| IPX = Internetwork Packet eXchange | MOVE THESE up to skill level 2 |
| DHCP = Dynamic Host Configuration Protocol | MOVE THESE up to skill level 2 |
| MGCP = Media Gateway Control Protocol | MOVE THESE up to skill level 2 |
| LDAP = Lightweight Directory Access Protocol | MOVE THESE up to skill level 2 |
| NNTP = Network News Transfer Protocol | MOVE THESE up to skill level 2 |
| OSI Model | MOVE THESE up to skill level 2 |
| EIGRP | MOVE THESE up to skill level 2 |
| WINS | MOVE THESE up to skill level 2 |
| MPLS | MOVE THESE up to skill level 2 |
| AppleTalk | MOVE THESE up to skill level 2 |
| LocalTalk | MOVE THESE up to skill level 2 |
| HSRP = Hot Standby Router Protocol | MOVE |

TABLE C-continued

```
THESE up to skill level 2
    IPX                                MOVE THESE up to skill level 2
    NetBeui                            MOVE THESE up to skill level 2
    WAP—Wireless Application Protocols                          MOVE
THESE up to skill level 2
    Bluetooth                          MOVE THESE up to skill level 3
    PCI                                MOVE THESE up to skill level 2
    PCI-X                              MOVE THESE up to skill level 2
    Samba                              MOVE THESE up to skill level 2
       TLS—Transport Layer Security                    MOVE THESE
up to skill level 2
    Network Management Software "              MOVE This
up to level 1, attache to Network skill bucket"
       Firewalls                       MOVE THESE up to skill level 2
          Enterprise                   MOVE THESE up to skill level 3
          Home                         MOVE THESE up to skill level 3
          Cisco PIX                    MOVE THESE up to skill level 3
          HP Openview                     MOVE THESE up to skill level 3
          Checkpoint                      MOVE THESE up to skill level 3
          Nokia                        MOVE THESE up to skill level 3
       IBM Tivoli                         MOVE THESE up to skill level 2
       Lucent VitalSuite                    MOVE THESE up to skill
level 2
       CA Unicenter                    MOVE THESE up to skill level 2
       Concord Communications eHealth                       MOVE
THESE up to skill level 2
    Security
       PKI—Public Key Infrastructure
       Windows 2000
  Testing = Quality Assurance = Integration Testing
    Test Plan Development
    Test script creation
       Win Runner
       JUnit
       Load Runner
       Test Director
    Execute certification Test = System Testing
    Load Testing
       Load Runner
    Regression Testing
    Security Testing = Security Audit                     ADD
       Conduct security audits and risk analysis            ADD
          Application level vulnerability testing            ADD
             Analyze security logs and respond to incidents
  ADD
       Security code reviews                       ADD
       Recommend and enforce security directives
  ADD
       Discover unexpected threat scenarios              ADD
       Integrate and manage information security technology
       ADD
  Implementation = Deployment                     Change to just
Deployment
    Installation
    Configuring
    System checks in production
  Operations Management
    System Maintenance = System Administration
    Performance Measurement/Monitoring
    System Backup
    System Recovery
    Capacity Planning
    Enterprise Resource Planning
    Load Balancing
    Database Administration
       Installation
       Configuration
       Data loading
       Data replication practices
       Data distribution
       RDBMS backup & recovery
       Connectivity
          ODBC = Open database connectivity
          JDBC = Java database connectivity
  User Interface Design = UI Design = UI Designer
    Conceptual Design
    Information Architecture = Site Architecture
       Site Map development
       Page Flow development
```

TABLE C-continued

|  |  |
|---|---|
| Wireframe development | |
|   Visio | |
|   Illustrator | ADD |
|   Powerpoint | ADD |
|   Style sheet development | |
| Visual Design | |
|   Visual Design Tools | ADD |
|   PageMaker | |
|   Illustrator | |
|   Flash | |
|   Macromedia - Fireworks | |
|   Cold Fusion | |
|   Macromedia DreamWeaver | |
|   Photoshop | |
|   Visual Studio | |
|   VSS = Visual Source Safe | |
|   Content Management | |
|     MCMS = Microsoft Content Management Server | |
|     Interwoven | |
|     Documentum | |
|     Plumtree | |
| Help Desk Support | |
|   OS = Operating system | |
|     Unix | |
|       AIX | |
|       A/UX | |
|       ArchBSD | |
|       BSD/OS | |
|       Coherent | |
|       Darwin | |
|       Digital Unix | |
|       ESIX | |
|       FreeBSD | |
|       Helios | |
|       Interactive Unix | |
|       LynxOS | |
|       MachTen | |
|       Minix | |
|       NetBSD | |
|       QNX | |
|       Reliant Unix | |
|       SINIX | |
|       SunOS | |
|       Topix | |
|       Ultrix | |
|       Unixware/Univel | |
|       Linux | |
|       MAC OSX | |
|       Solaris | |
|     MAC OS | |
|       MAC OSX | |
|     Novell Netware | ADD |
|     Sun | |
|       Solaris | |
|     MVS—Multiple Virtual Storage | |
|     Windows | |
|       2000 | |
|       2003 | |
|       XP | |
|       NT | |
|       98 | |
|     VMS | |
|     VAX | |
|     AS-400 | |
|   Applications | |
|     MS Windows | |
|     MS Office | |
|     Lotus Notes | |
|   Proprietary Software | |
|     Personal Communication Devices | Make a skill under Help Desk Support |
|       PDAs | MOVE THESE down to skill level 2 |
|       Cell Phones | MOVE THESE down to skill level 2 |
|     Schedule Office moves | Make a skill under Help Desk Support |
|     Phone Support | Make a skill under Help Desk Support |
|     Procurement | |

TABLE C-continued

Hardware
    Software
    Wireless Equipment
  Servers
    RAS—Remote Access Server
    SMS—Systems Management Server
  Vendor negotiations
Systems Operation
  Querying
    Access Brio
    Cognos
    Business Objects
  Report Creation
    SQL
    Crystal
  Report Generation
  Data Analysis
    SPSS
    SAS
  System Support
    Finance & Accounting
      Epicon
      Great Plains
      Solomon
      Hperion
      Cognos
    Human Resources
      Kronos
      IVIS
      Paychex
    Applicant Tracking Systems
      Brass Ring
      Taleo
      "Alexus 5, by Alexus International"
      "Brassring Enterprise, by BrassRing Systems, Inc."
      "E*TRACK System, by Virtual Edge, Inc."
      "HireEnterprise, by Hire.com"
      "Hiring Gateway, by Yahoo! Resumix"
      "HodesIQ, by Bernard Hodes Group"
      "HRSmart, by HRSmart"
      "IRecruiter, by iCIMS"
      "Kenexa Recruiter, by Kenexa"
      "Peopleclick XG, by Peopleclick"
      "Recruiting Solutions, by Peoplesoft"
      "Recruitmax, by Recruitmax"
      "Recruitsoft Enterprise Staffing Solution, by Recruitsoft"
      "Webhire Recruiter, by Webhire"
    Sales & Marketing
      Saleforce.com
  CRM
    Siebel
    PeopleSoft
    Microsoft CRM                      ADD
Network Engineering
  Network Design/Architecture = Network Topologies
    Documentation
      Diagrams
      Standard operating procedures = SOP
      Work instructions
    Upgrade and replacement analysis
  Network System Design
    Capacity planning
    Create detailed designs
    Multi-vendor & multi-protocol internet working design experience
        SHORTEN
    Carrier class environment
    Attend technical planning and review meetings with project team
        SHORTEN
    Network design
      Schematics
      Site/equipment
      Configurations
      Service spreadsheet tables
      Technical overview write-ups
      Cost optimization studies
      Circuit layout record = CLR
      Design layout record = DLR
      Review policies and procedures and recommend improvements
        SHORTEN TABLE C-continued

```
    Improve performance and sustainability of network designs
        SHORTEN
    Track project activities
    Technical review of maintenance activities
SHORTEN
        Responsible for integrity of site architecture
SHORTEN
        Ensure virtual team is knowledgeable of client site configuration and
applications                           SHORTEN
        Integrate product portfolio with third party hardware and software
            SHORTEN
        Control costs
    Network Development
        Environments
            LAN
                Ethernet
                Token Ring
                WiFi
                SAN
                802.11
                NAT = Network Address Translation
                Netware 6 (Novell LAN OS)
            VLAN = Virtual Local Area Network
            WAN
                T1
                T3
                WiMAX
                FDDI
                OC3
                OC12
                OC48
                Sonet
                ISDN
                DSL
                Docsis
                FrameRelay
                SAN
            CAN
            VPN
                PPTP—Point-to-Point Tunneling Protocol
            HAN
            Client/Server = Computer Networks
                MS Windows NT
                MS Windows 2000
                SQL-7
                IIS Server
                Windows XP
                Oracle
            Global Networks
            Telecommunications = Telephony
                Data
                Voice
                Video Conferencing
                BX
                PBX
                IP PBX
                IVR Systems
                Unified messaging
                Polycom
                IP Video conferencing
                Frame Relay
                ISDN
                DS3
                VoIP
                Signaling Protocols
                    SIP = Session Initiated Protocol
                    H.323
                    MGCP
                    NCS
                    TGCP SIP
                    SIP-T
                    ISTP
                    CMSS
                Signaling interoperable
                    SS7
                    BRI = Basic Rate Interface
                Voice codec
                    G.711
                    G.729
```

TABLE C-continued

Video streaming
  Echelon = LonWorks networks
Network Installation and Integration
  Hardware Installation
    Routers
      Cisco ICM
      Cisco 7500
      Cisco 7200
      Cisco 3700
      Cisco 3600
      Cisco 2600
      Cisco 2500
      Avaya
    Switches
      Cisco ICM
      Cisco Catalyst 5000
      Cisco Catalyst 6500
      Cisco Catalyst 6000
      Cisco Catalyst 5500
      Cisco Catalyst 4000
      Cisco Catalyst 3500
      Cisco Catalyst 2900
      Cisco Catalyst 3548
      Spanning Tree
      Avaya
    Gateways
    Bridges
    Servers
      Remote Access Servers
      Terminal Servers
      Domain Servers
      Application and Device servers
        Windows 2003
          Citrix MetaFrame
          Exchange 2003
        Web server
    Hubs
      Cisco
      Avaya
    NIC
      Cisco
      Avaya
      Ethernet Boards
    CSU/DSU
    Multiplexers
      Asynchronous/SONET
      T1
      DS1
      DS3
      E1
    Digtal loop carrier
      SLC 96
      Series 05
      Litespan
      FTTP
    Printers
  Network Protocols = Configuration
    Internet Protocols
      TCP/IP
      UDP/IP
      IP multicast
      IPSec = Internet Protocol Security
      ARP
      DNS
      SNMP
      SMTP = Simple Mail Transfer Protocol
      ESTMP = Extended Simple Mail Transfer Protocol
      ICMP
      IPv6
      IPSEC
      HTTP
      SSL
      FTP
      PPP = Point-to-point protocol
      SDLC = Synchronous data link control
      HDLC = High-level data link control
      H.323
      POP3 = Post Office Protocol 3

TABLE C-continued

```
IP Routing Protocol
   OSPF
   RIP = Routing Information Protocol
   RIP2
   ODR
   EIGRP = Enhanced Interior Gateway Routing Protocol
   IGRP = Internet Gateway Routing Protocol
   BGP = Border Gateway Protocol
Telecommunications Transport Standards
   B82s
   AMI
   STS-1
   T-1
   T-3
   OC-N
   TR008
   TR303
   D4
   2B1O
   BRI
   PRI
   ESF
   SF
   Uni-directional rings
   Bi-directional rings
Mixing Equipment
   D4
   M13
   IDLC
ATM = Asynchronous Transfer Mode
IPX = Internetwork Packet eXchange
DHCP = Dynamic Host Configuration Protocol
MGCP = Media Gateway Control Protocol
LDAP = Lightweight Directory Access Protocol
NNTP = Network News Transfer Protocol
OSI Model
EIGRP
WINS
MPLS
AppleTalk
LocalTalk
HSRP = Hot Standby Router Protocol
IPX
NetBeui
WAP = Wireless Application Protocols
   Bluetooth
PCI
PCI-X
Samba
TLS = Transport Layer Security
Scripting Languages
   PERL
   Shell
   Python
Network Management Software
   Firewalls
      Enterprise
      Home
      Cisco PIX
      HP Openview
      Checkpoint
      Nokia
   IBM Tivoli
   Lucent VitalSuite
   CA Unicenter
   Concord Communications eHealth
Security
   Develop network intrusion detection system
      System Watch
      Alert Console
      Security Agent
   Implement network intrusion detection system
      Anomoly identification
      Threat mitigation
   PKI = Public Key Infrastructure
   Windows 2000
Testing
   Proof of concept
   Performance testing
```

TABLE C-continued

```
    Management tools
       NetScout
    Diagnostic tools
    Certify production ready
    Troubleshooting
       Build complex test labs
       Execute test plans
    Develpp in depth test procedures and concepts
  Network Maintenance
    Anti-virus programs
    Monitoring
    Load balancing
       Cisco CSS
       Radware WSD
    Replication Solutions
    Web caching
    Transaction monitoring
    Network compression
    Automatic failover
    Traffic management
    Network surveillance
    Issue triaging
    Circuit testing and repair
    Router configuration management
    Hardware replacement
  Network Administration
    Domain name registration
    IP address assignment
    Log monitoring
    DNS Administration
    Infrastructure port assignment and patching
    Racking hardware
    Manage system back-up
    Network recovery
    Redundant network connectivity and operation
    Add and REMOVE users
  Customer Service = CS
    Open trouble tickets
    Track trouble tickets
       Resolve trouble tickets
       Collect & evaluate customer requirements
       Implement customer rule sets within requirements
       Accept new customer sites
       Decommission customer sites
    Act as a point of escalation for customer
    Maintain regular client communication
       Lead technical customer meetings
  Project Management
    Develop Project Roadmap = Develop Milestones
       Microsoft Project
       SureTrak
    Project KickStart                        ADD
    Welcom Open Plan                            ADD
    Primavera Project Planner                      ADD
    PlanView Portfolio Manager Software                  ADD
    Manage Project Roadmap = Manage Milestones
       Microsoft Project              ADD
       SureTrak             ADD
    Project KickStart              ADD
    Welcom Open Plan                 ADD
    Primavera Project Planner             ADD
    PlanView Portfolio Manager Software              ADD
    Requirements Gathering and Analysis
    Translate concepts into functional requirements
    Write technical requirements
    Develop use cases
Telecommunications Engineer
  Network Access Designs
    Traditional Land Lines
    DSL
    VOIP
    Wireless
    Internet
    Interactive Voice Response = IVR
       Voice Recording
  Concept
    Proof-of-Concept
    Prototype
```

TABLE C-continued

Build Telecom Networks
    Network Protocols and Technologies = Routing Protocols = Fiber Optic
Transport Systems
    Physical Media = Hardware = Devices = Encoding
      ISDN
      PDH
        T-carrier
      RS-232
      SDH
      SONET
    Data Link Layer = Data Transfer
      ARP
      Ethernet
      FDDI
      HDLC
      PPP
      Token Ring
    Network Layer = Router = Flow Control = Segementation
      X.25
      Frame relay
      ATM
      MPLS
      Signalling System 7 = SS7 = C7 = CCIS7
      ICMP
      IP
        IPv4
        IPv6
      IPX
      Routing Protocols
        EGP
        BGP
        EIGRP
        IGRP
        IS-IS
        RIP
        OSPF
    Transport Layer = Data Transfer to End Users
      SPX
      TCP
      UDP
      SCTP
      RTP
    Presentation Layer = Delivery = Formatting of Application
      HTTP/HTML
      ASN.1
      XML
      TDI
      SNMP
      FTP
      Telnet
      SMTP
    Application Services
      TCP/IP
      SIP
      FTP
      HTTP
      SNMP
      SMTP
      Telnet
      XMPP
        Jabber
    Programming Languages
      JAVA
      J2EE
      C
      C#
      C++
      XML/XSL
      HTML
      VB.NET
    Vendor Systems
      Avaya
        PBX
        Definity
        G3R
        Multi-Vantage
        Genesys CTI
        Intuity
        Switching TABLE C-continued

```
    Telephone Equipment
  AT&T
    Route-It
    VPN
      Network Based
      Premise Based
    VoIP
  Cisco
    Call Manager
    Unity
    Conferenceing/Meetingplace
    ICM Routing & Sorting
    Switches
    LAN/WAN
  Aspect
    Uniphi Suite
    IVR
    Call Center
      PSTN
      IP
  Nortel
    PBX
      Meridian
      Norstar
    Switching
    VoIP
  Lucent
    VoIP
    Optical Networking
  NEC
    Aspire
    Electra Elite IPK
    DS1000/2000
    Infoset408
    i-Series
    IP-PBX
    Switch/Router
  Toshiba
    Strata
    IVR
    Voice Processing
  Fujitsu
    Mobile/Wireless Networks
    Switching
    Routers
  Vodavi
    Starplus
  SiemensAG
    Rolm
  Mitel
    Telephones
    Peripherals
  Ericsson
    Mobile Core Products
  Panasonic
    Telephones
  Asterisk
    PBX
  Commercial Telephony Interfaces
    Dialogic
    Aculab
    Pika Technologies
    MCI
      ACES
      ICON
      MECCA
      F&E
      SiteVu
      INM
      Tarantella
Installations = Implementation
  Equipment Configuration
  Card and/or Port Requirements
  Power
  Cabling
  Floor Space
  Rack Placement
Testing
  Evaluation
```

TABLE C-continued

```
    Product Verification
    Build Complex Test Labs
  Remote Circuit Testing Equipment
    Digital Lightwave
    Eastern Research
    Acterna
Maintenance
  Enhancement Coordination
    Large Scale Moves
    System Upgrades
    Installations = Implementation
      Equipment Configuration
      Card and/or Port Requirements
      Power
      Cabling
      Floor Space
      Rack Placement
  Internal Client Services
    Open Trouble Tickets
    Track Trouble Tickets
    Take Tickets to Resolution
  Troubleshooting Tools
    Vendor Specific Solutions
    Log Files
    Home Grown Scripted Solutions
  Security Techniques
    Intrusion Detection
    Anomaly Identification
    Threat Mitigation
    Corporate Security Standards
Project Management
  Develop Project Roadmap = Develop Milestones
  Manage Project Roadmap = Manage Milestones
  Requirements Gathering and Analysis
  Translate concepts into functional requirements
  Write Technical Requirements
  Develop Use Cases
  Budget Responsibility
Sales
  Sales
    Prospecting = New Business
      Business (B2B) = Commerical Accounts
      Consumer (B2C)
      Global Accounts
      Government (B2G)
      Non-profit
      Hospitals
      Resellers
    Sales Type
      Lead Generation
      Presales
      "Inside = TeleSale, TeleMarketing, Call Center Sales"
      "Direct = Outside, National Accounts"
      Inbound
      Business Development
    Sales Cycle
      "Transactional sales - Short sales cycle = High volume, low price"
      "Consultative - Complex sales, longer sales cycle"
    Annual Quota
      $100K
      $200K
      $250K
      $300K
      $400K
      $500K
      $750K
      $1M
      $2M
      $3M
    Quota Attainment
      90%
      95%
      100%
      105%
      110%
      115%+
    Account Management = Existing Customers
      Maintain client relationship/satisfaction
        Obtain product feedback
```

TABLE C-continued

```
      Resolve customer/product issues
    Renew current product/service
      Monthly revenue/bookings quota
      Monthly contract renewal units quota
  Presentations
    Large groups
    C Level Executives
    "Executives = VPs, Directors"
    Purchasing = Procurement
  Contract Management
    Proposal preparation
    On-going management of customer contractual agreements
  Territory Management = Pipeline Management
    Sales Forecasting = pipeline forecast
    Business Plan Development = Strategic plan development
    Prepare Account Status Reports
  Manage Customer Account Team
    Sales
    Service
    Technical support
  Training = Performance Enhancement programs
    Needs Assessments
    Define Program Objectives
      Curriculum Development
      Instructional Modules = Instructor's guide
      Participant's guide
      Case Studies
      Exercises
      Presentations
        Training aid development
        Handbooks
        Demonstration models
        Multi-media visual aids
        Computer Tutorials
        Reference Books
      "Web based, e-learning = Multi-media support"
        Flash
        Authorware
        Dreamweaver
        HTML
      Vendor Management
      Trainer certification
    Schedule Training Classes
    "Training Delivery, Facilitation"
      Classroom delivery
        Kick-offs
        Ice-breakers
        De-briefs
        Product details
        Sales processes
      Online Delivery
      TTT = Train the trainer
    Establish Training Evaluation Criteria
      Customer feedback analysis
      Define evaluation metrics = performance requirements
      Analyze results
      Suggestion performance enhancements
      Feedback to trainers and presenters
    Adult education principals and theories
    Capacity planning
Marketing
  Brand Management
    Establish corporate identity
      Design logo look and feel
      Develop logo usage guidelines
      Establish branding guidelines
    Maintain Corporate Identity
      Enforce branding guidelines
      Enforce style guides
    Conduct Brand Audits
      Profit and loss
      Operating budget
  Product Management
      Strategic planning
        Develop product roadmaps
      Define Customer Segmentation
      Define research needs
        Brand perception testing
        Customer satisfaction
```

TABLE C-continued

```
     Product concept testing
     Product positioning testing
     Communication/Advertising effectiveness
   Gather and analyze data from third-party audience research sources
     Gartner
     Forrester
     Jupiter
     Nielsen//NetRatings
     comScore
     Media Metrix
     @Plan
     ComScore
   Define business requirements
   Define product messaging and positioning
   Define product functionality
   Set pricing strategy
   Define distribution channel strategy
     Outbound
     Telemarketing
     Customer service
     Direct sales force
     Inbound sales calls
     Partners & affiliates
   Design product promotions
   Profit & loss responsibility
   Conduct competitive analysis = Intelligence
Market Research
   Coordinate research needs across organization
     Product concept
     Product and company messaging
     Customer satisfaction efforts
   Identify local threats and opportunities
   Provide high-level insights and supporting rationale
   Ensure integrity of the research process
   Publish and distribute research findings
   Scope and project research project timelines
   Determine Appropriate Research Method
     Qualitative research
       Focus groups
       Telephone
       Internet
       Data collection methods = Skills
       Measurement instruments
       Data analysis
       Communicate research results
       Benchmarking
     Quantitative research
       Sampling
         Telephone
         Internet
       Data collection methods = Skills
       Measurement instruments
       Data analysis
       Communicate research results
   Manage recurring surveys
     Statistical analysis & report generation
     Present results
       Users
       Executive presentations
   Moderate Research Sessions
     Focus Groups
     One-on-Ones
     Usability
   Research Management
     Manage external research vendors
     Manage research facilities
     Manage research moderators
Marketing Communications
   Customer communications
     Account information = Account set-up = Account activation
     Set product upsell strategies
       E-mail
       Direct mail
       Invoicing = Billing
     Write copy
       Invoice/Billing
       Inserts
       Buckslips
       Messaging
```

TABLE C-continued

```
   Edit copy
   Manage external agencies
   Manage in-house production
 Acquisition marketing = Lead generation
   Campaign management
      Direct mail
      E-mail
      Keyword online buys
      Television
      Online banner ads
   Manage external agencies
   Manage in-house production
   Event/Trade Show
      Prepare and ship materials/equipment
      Contact trade organizations
      Coordinate housing/hotels
      Maintain show schedules
      Attract attendees
      Design presentations and demonstrations
      Post-show assessments
      Budget and event metrics
      Pre-show publicity
   Sales literature/Brochures
   Research content needs
   Write copy
   Produce data sheets
   Provide photo and art direction
   Manage literature distribution
      Automated request process
      Manual distribution
Advertising
  Media planning
         Consumer profile research
     Competitive spending analysis
     Define media strategy parameters
     Post buy analysis
     Create effective media plans
     Refine campaign strategy
     Manage media budget
        Media buy
        Review proposals
        Approve campaign development proposals
        Approve media spending proposals
  Media Creative Development
     TV Advertising
     Radio
     Print
        Trade magazines
        Newspapers
     E-mail
     Direct Mail
     Internet/Online
        Keyword buys
        Online media = Banner ads
     Outdoor
     Manage external advertising agency
     Manage in-house production
Computer Skills
  Microsoft Office
  Excel
  QuarkXPress
  HTML
  Website Development Software
     PageMaker
     Illustrator
     Flash
     Macromedia - Fireworks
     Cold Fusion
     Macromedia DreamWeaver
     Photoshop
     Fireworks
     Visual Studio
     VSS = Visual Source Safe
  Channel Management = Program Management
     Consumer
        Sales
           Inbound sales
           Outbound sales = Telemarketing
        Customer service
```

TABLE C-continued

```
Business = B2B
  Customer service
  Outside sales = Direct sales
  Design incentive programs
  Develop alternative award strategies & programs
  Develop performance indicators to measure ROI
  Determine plan ROI
  Establish work flow processes to support programs
  Ensure program compliance with state and federal regulations
  Model & assess results of plan features
     Track actual incentive payments to incentive plan budgets
Training = Performance enhancement programs
  Management training
  Skills assessment
  Skills training
  Product training
  Curriculum development
     Instructional modules
     Training aid development
       Handbooks
       Demonstration models
       Multi-media visual aids
       Computer tutorials
       Reference books
       "Web based, e-learning = Multi-media support"
          Flash
          Authorware
          Dreamweaver
          HTML
     Vendor management
     Trainer certification
   Schedule training classes
   "Training delivery, Facilitation"
     TTT = Train the trainer
     Classroom delivery
       Kick-offs
       Ice-breakers
       De-briefs
       Product details
       Sales processes
   Establish Training Evaluation Criteria
     Customer feedback analysis
     Define evaluation metrics = performance requirements
     Analyze results
     Suggestion performance enhancements
     Feedback to trainers and presenters
   Adult education principals and theories
   Capacity planning
  Website Design
   Develop design concepts
   Build website from approved concept
   Define site architecture
   Provide ongoing design support
   Content Review
Partnership marketing = Affiliate marketing
  Online
   Develop online acquisition programs
     Drive efficient traffic
     Customer acquisition
     Convert traffic to sales
     P&L or ROI campaign management responsibility
   Report results to management
  Web media management
   Search engine optimization techniques
   Act as liaison with affiliate network provider
   Create tracking URLs
   Monitor competitive activity
     Report web activity results
Database Marketing
  Develop database strategies
   Acquiring customers
   Retaining customers
  Develop statistical models
   List selection
   Testing
   Research
  Conduct analyses and research
   Drivers of response and payment
   Test design = Campaign creative
```

TABLE C-continued

```
        Interpretation of results
    Public Relations
        Conduct Media Training
            Presentations
            Interviews
            Media tours
            Press activities
        Manage Corporate Communications
            Set media strategy
                Product announcements
                Investor relations messaging
                Community relations
                Change management issues
            Execute media strategy campaigns/tactics
            Identify interview opportunities
            Schedule & conduct interviews
            Identify speaking engagements
                Spokesperson research & identification
                Contract negotiation
            Manage spokesperson
            Respond to Media Inquiries
            Manage external press release distribution
                Manage press coverage distribution internally
            Manage International press coverage
            Identify & develop customer references
            Prepare messages and themes
                Product publicity
            Change management
            Crisis management
        Write Press Materials
            News releases
            White papers
            Executive speeches
            Contributed articles
            FAQ's = Frequently Asked Questions
            Pitch letters
            Messaging documents
                Customer messaging
                Investor relations messaging
            Case studies
            Web content
            Press kit materials
            Executive biographies
            Fact Sheets
            Case histories
        Establish and maintain editorial contacts
            Identify editorial opportunities
            Vertical trade publications
            Technology publications
            Business publications
            Regional press outlets
            National press outlets
            Investor relations
        Employee communications
            Develop internal communication approach
                Audience analysis
                Communications plan
                Communications vehicles
            Creation and implementation of internal website
            Creation and implementation of employee newsletters
            Establish two-way feedback means
            Determine core communications metrics
            Develop ways to measure impact effectiveness
            Develops internal Human Resources communications materials
            Increase face-to-face communications by managers
```

It should be understood that various aspects of the present invention may be implemented in non-employment systems, whether matching or non-matching, including but not limited to dating systems, real estate systems, knowledge bases, financial systems and search engines.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method of operating an employment system comprising:

receiving an attribute of an employment seeker;

associating said employment seeker and an employee seeker;

receiving a change made to said attribute at a computer; and causing the computer to notify said employee seeker of said change.

2. The method of claim 1 wherein said attribute is work history information.

3. The method of claim 1 wherein said attribute is skill information.

4. The method of claim 1 wherein said attribute is education history information.

5. A method of operating an employment system comprising:

receiving an attribute of an employment seeker;

associating said employment seeker and an employee seeker;

causing a computer to associate a history with said attribute, said history including any changes made to the attribute on the employment system; and causing the computer to present said history to said employee seeker.

6. A method of operating an employment system comprising:

enabling an employment seeker to enter a first match profile;

enabling an employee seeker to specify a second match profile;

causing a computer to generate a match score, said match score is determined by matching desires from said first match profile with attributes of said second match profile and matching desires from said second match profile with attributes of said first match profile, wherein the desires of the profiles are disproportionately weighted to generate the match score;

receiving a change in an attribute at a computer; and causing the computer to notify said employee seeker of said change.

7. A method of operating an employment system comprising:

collecting a plurality of employment seeker profiles;

collecting a plurality of employee seeker profiles;

causing a computer to bi-directionally match said employment seeker profiles and said employee seeker profiles based in part on a disproportionate weighting between the employee seeker profiles and the employment seeker profiles;

displaying at least a portion of the bi-directional matching results to at least one employment seeker and an employee seeker;

receiving a change in an employment seeker profile at a computer; and causing the computer to notify an employee seeker of said change.

8. The method of claim 7, wherein said displaying includes:

ordering the bi-directional matching results based on a bi-directional match score; and displaying at least a portion of the bi-directional matching results according to the ordering.

9. The method of claim 7, wherein approximately 70% of any matching score in the bi-directional matching results depends upon the quality of the match between employee seeker desires and employment seeker attributes and approximately 30% of the matching score depends upon the quality of the match between employment seeker desires and employee seeker attributes.

10. An employment system comprising:

a storage device operable to store an attribute of an employment seeker;

an association unit operable to associate said employment seeker and an employee seeker; and a notification unit operable to notify said employee seeker of a change to said attribute, if said change occurs.

11. The employment system of claim 10 wherein said attribute is work history information.

12. The employment system of claim 10 wherein said attribute is skill information.

13. The employment system of claim 10 wherein said attribute is education history information.

14. An employment system comprising:

a storage device operable to store an attribute of an employment seeker;

a first association unit operable to associate said employment seeker and an employee seeker;

a second association unit operable to associate a history with said attribute, said history including any changes made to the attribute on the employment system; and a display unit operable to display said history to said employee seeker.

15. An employment system comprising:

a storage unit operable to store a first match profile and a second match profile;

a processor operable to generate a match score, said match score is determined by matching desires from said first match profile with attributes of said second match profile and matching desires from said second match profile with attributes of said first match profile, wherein the desires of the profiles are disproportionately weighted to generate the match score, the processor operable to receive a change in an attribute; and a notification unit operable to notify an employee seeker of said change.

16. An employment system comprising:

a storage unit operable to store a plurality of employment seeker profiles and a plurality of employee seeker profiles;

a processor operable to bi-directionally match said employment seeker profiles and said employee seeker profiles based in part on a disproportionate weighting between the employee seeker profiles and the employment seeker profiles;

a display unit operable to display at least a portion of the bi-directional matching results to at least one employer seeker and an employee seeker, the processor operable to receive a change in a profile; and a notification unit operable to notify said employee seeker of said change.

17. The employment system of claim 16, wherein said processor is also operable to order the bi-directional matching results based on a bi-directional match score, and wherein said display unit is also operable to display at least a portion of the bi-directional matching results according to the ordering.

18. The employment system of claim 16, wherein approximately 70% of any matching score in the bi-directional matching results depends upon the quality of the match between employee seeker desires and employment seeker attributes and approximately 30% of the matching score depends upon the quality of the match between employment seeker desires and employee seeker attributes.

19. A computer program product comprising:
a computer usable medium having computer readable program code embodied therein configured to operate an employment system, said computer program product comprising:
computer readable code configured to cause a computer to receive an attribute of an employment seeker;
computer readable code configured to cause a computer to associate said employment seeker and an employee seeker;
computer readable code configured to cause a computer to receive a change made to said attribute; and
computer readable code configured to cause a computer to notify said employee seeker of said change.

20. The computer program product of claim 19 wherein said attribute is work history information.

21. The computer program product of claim 19 wherein said attribute is skill information.

22. The computer program product of claim 19 wherein said attribute is education history information.

23. A computer program product comprising:
a computer usable medium having computer readable program code embodied therein configured to operate an employment system, said computer program product comprising:
computer readable code configured to cause a computer to receive an attribute of an employment seeker;
computer readable code configured to cause a computer to associate said employment seeker and an employee seeker;
computer readable code configured to cause a computer to associate a history with said attribute, said history including any changes made to the attribute on the employment system; and
computer readable code configured to cause a computer to present said history to said employee seeker.

24. A computer program product comprising:
a computer usable medium having computer readable program code embodied therein configured to operate an employment system, said computer program product comprising:
computer readable code configured to cause a computer to enable an employment seeker to enter a first match profile;
computer readable code configured to cause a computer to enable an employee seeker to specify a second match profile; and
computer readable code configured to cause a computer to generate a match score, said match score is determined by matching desires from said first match profile with attributes of said second match profile and matching desires from said second match profile with attributes of said first match profile, wherein the desires of the profiles are disproportionately weighted to generate the match score;
computer readable code configured to cause a computer to receive a change in an attribute; and
computer readable code configured to notify the employee seeker of said change.

25. A computer program product comprising:
a computer usable medium having computer readable program code embodied therein configured to operate an employment system, said computer program product comprising:
computer readable code configured to cause a computer to collect a plurality of employment seeker profiles;
computer readable code configured to cause a computer to collect a plurality of employee seeker profiles;
computer readable code configured to cause a computer to bi-directionally match said employer seeker profiles and said employee seeker profiles based in part on a disproportionate weighting between the employee seeker profiles and the employment seeker profiles;
computer readable code configured to cause a computer to display at least a portion of the bi-directional matching results to at least one employer seeker or at least one employee seeker;
computer readable code configured to cause a computer to receive a change made to a profile; and
computer readable code configured to cause a computer to notify an employee seeker of a change made to a profile.

26. The computer program product of claim 25, wherein said computer readable code configured to cause a computer to display includes:
computer readable code configured to cause a computer to order the bi-directional matching results based on a bi-directional match score; and
computer readable code configured to cause a computer to display at least a portion of the bi-directional matching results according to the ordering.

27. The computer program product of claim 25, wherein approximately 70% of any matching score in the bi-directional matching results depends upon the quality of the match between employee seeker desires and employment seeker attributes and approximately 30% of the matching score depends upon the quality of the match between employment seeker desires and employee seeker attributes.

\* \* \* \* \*